United States Patent
Narroschke et al.

(10) Patent No.: US 9,232,236 B2
(45) Date of Patent: Jan. 5, 2016

(54) VIDEO CODING METHOD, VIDEO DECODING METHOD, VIDEO CODING APPARATUS, AND VIDEO DECODING APPARATUS THAT USE FILTERS FOR FILTERING SIGNALS

(75) Inventors: Matthias Narroschke, Rodgau-Dudenhofen (DE); Thomas Wedi, Gross-Umstadt (DE); Steffen Wittmann, Moerfelden-Walldorf (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1096 days.

(21) Appl. No.: 13/260,642

(22) PCT Filed: Apr. 2, 2010

(86) PCT No.: PCT/JP2010/002431
§ 371 (c)(1),
(2), (4) Date: Sep. 27, 2011

(87) PCT Pub. No.: WO2010/113524
PCT Pub. Date: Oct. 7, 2010

(65) Prior Publication Data
US 2012/0027083 A1 Feb. 2, 2012

(30) Foreign Application Priority Data

Apr. 3, 2009 (EP) .................................... 09005012
Jul. 17, 2009 (EP) .................................... 09165804

(51) Int. Cl.
*H04N 7/12* (2006.01)
*H04N 19/82* (2014.01)
(Continued)

(52) U.S. Cl.
CPC ............. *H04N 19/82* (2014.11); *H04N 19/117* (2014.11); *H04N 19/136* (2014.11);
(Continued)

(58) Field of Classification Search
CPC combination set(s) only.
See application file for complete search history.

(56) References Cited

U.S. PATENT DOCUMENTS 5,867,602 A * 2/1999 Zandi et al. .................... 382/248
8,787,449 B2 * 7/2014 Ayeung et al. ........... 375/240.01
(Continued)

FOREIGN PATENT DOCUMENTS

EP 1 841 230 10/2007
EP 2 003 896 12/2008
(Continued)

OTHER PUBLICATIONS

ITU-T Recommendation H.264 (Mar. 2009), Advanced Video Coding for Generic Audiovisual Services.*
(Continued)

*Primary Examiner* — Dave Czekaj
*Assistant Examiner* — Tyler W Sullivan
(74) *Attorney, Agent, or Firm* — Wenderoth, Lind & Ponack, L.L.P.

(57) ABSTRACT

A video coding method enables reduction in the decrease in the efficiency of coding a video and enhancement of the image quality of the resulting decoded video. The video coding method includes predicting a video signal to generate a prediction signal; calculating, as a prediction error signal, the difference between the video signal and a prediction signal; and generating a reconstructed video signal by reconstructing the video signal based on the prediction signal and the prediction error signal. The video coding method also includes determining filter data items that are used to filter each of at least two of the prediction signal, the prediction error signal, and the reconstructed video signal; and coding the determined filter data items based on the cross correlations between the determined filter data items.

20 Claims, 43 Drawing Sheets

(51) Int. Cl.
*H04N 19/70* (2014.01)
*H04N 19/46* (2014.01)
*H04N 19/196* (2014.01)
*H04N 19/61* (2014.01)
*H04N 19/117* (2014.01)
*H04N 19/463* (2014.01)
*H04N 19/136* (2014.01)
*H04N 19/186* (2014.01)
*H04N 19/86* (2014.01)

(52) U.S. Cl.
CPC .......... *H04N 19/186* (2014.11); *H04N 19/196* (2014.11); *H04N 19/46* (2014.11); *H04N 19/463* (2014.11); *H04N 19/61* (2014.11); *H04N 19/70* (2014.11); *H04N 19/86* (2014.11)

(56) References Cited

U.S. PATENT DOCUMENTS

| | | | | |
|---|---|---|---|---|
| 2006/0093039 | A1* | 5/2006 | Yasuda et al. | 375/240.16 |
| 2008/0247467 | A1* | 10/2008 | Rusanovskyy et al. | 375/240.16 |
| 2009/0154567 | A1* | 6/2009 | Lei et al. | 375/240.24 |
| 2009/0257670 | A1* | 10/2009 | Chiu et al. | 382/239 |
| 2010/0014763 | A1 | 1/2010 | Wittmann et al. | |
| 2010/0074330 | A1* | 3/2010 | Fu et al. | 375/240.12 |
| 2011/0188571 | A1* | 8/2011 | Maani et al. | 375/240.12 |

FOREIGN PATENT DOCUMENTS

| | | |
|---|---|---|
| EP | 2 048 886 | 4/2009 |
| JP | 2006-211152 | 8/2006 |
| WO | 2006/108654 | 10/2006 |
| WO | 2007/111292 | 10/2007 |
| WO | 2008/010929 | 1/2008 |
| WO | 2008/075247 | 6/2008 |

OTHER PUBLICATIONS

International Search Report issued Jul. 6, 2010 in International (PCT) Application No. PCT/JP2010/002431.

European Search Report of European Patent Application No. 09005012.1 issued on Aug. 25, 2009.

European Search Report of European Patent Application No. 09165804.7 issued on Aug. 25, 2009.

S. Haykin, "*Adaptive Filter Theory*", Fourth Edition, Prentice Hall Information and System Sciences Series, Prentice Hall, 2002.

Wedi, Thomas: "*Advanced motion compensated prediction methods*", ITU-T Video Coding Experts Groups (ITU-T SG16 Q.6), Oct. 18, 2003, pp. 1-8, XP002454495.

Kimata, H. et al., "*3D Adaptive Motion Vector Coding Integrated With Block-Basedadaptive Interpolation Filter*", Systems & Computers in Japan, Wiley, Hoboken, N.J., U.S., vol. 35, No. 14, Dec. 1, 2004, pp. 10-20, XP001211995.

* cited by examiner

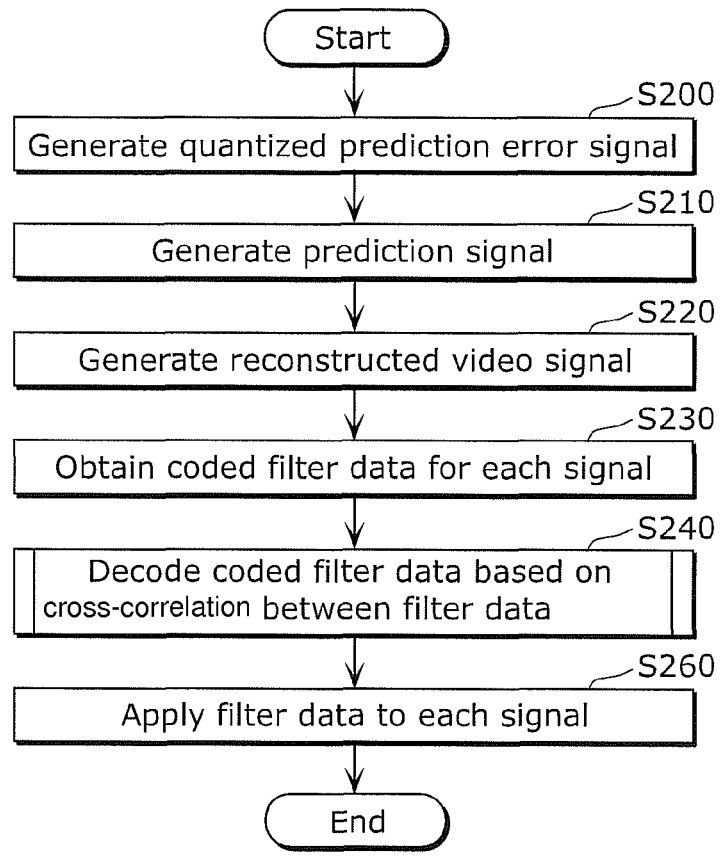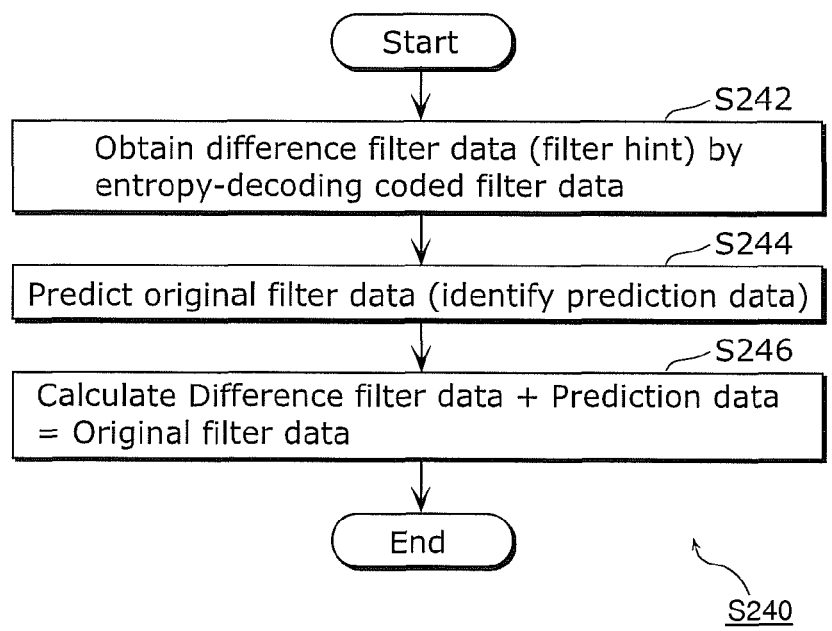

FIG. 12A sequence_header

| Description |
|---|
| sequence_header(){ |
| ... |
| postfilter |
| ... |
| if (postfilter!=0) |
| { |
| post_filter_initial_probabilities |
| } |
| ... |

FIG. 12B frame

| Description |
|---|
| frame(){ |
| ... |
| if (postfilter!=0) |
| for (c=0; c<3; c++){ |
| post_filter_flag[c] |
| if (post_filter_flag[c]!=0) |
| decode_post_filter(c) |
| } |
| ... |

FIG. 13A decode post filter

| Description |
|---|
| decode_post_filter(c){ |
|   filter_hint_type[c] |
|   filter_hint_size_rec_x[c] |
|   filter_hint_size_rec_y[c] |
|   filter_hint_size_pred_x[c] |
|   filter_hint_size_pred_y[c] |
|   filter_hint_size_qpe_x[c] |
|   filter_hint_size_qpe_y[c] |
|   filter_precision [c] |
|   if (filter_hint_type[c] ==0 \|\| filter_hint_type[c] ==1) { //2D |
|     for (cy=0; cy<filter_hint_size_rec_y[c]; cy++) |
|       for (cx=0; cx<filter_hint_size_rec_x[c]; cx++) |
|         filter_hint_rec[c][cy][cx] |
|     for (cy=0; cy<filter_hint_size_pred_y[c]; cy++) |
|       for (cx=0; cx<filter_hint_size_pred_x[c]; cx++) |
|         filter_hint_pred[c][cy][cx] |
|     for (cy=0; cy<filter_hint_size_qpe_y[c]; cy++) |
|       for (cx=0; cx<filter_hint_size_qpe_x[c]; cx++) |
|         filter_hint_qpe[c][cy][cx] |
|   } |
|   else{ //1D |
|     for (cx=0; cx<filter_hint_size_rec_x[c]; cx++) |
|       filter_hint_rec_x[c][cx] |
|     for (cy=0; cy<filter_hint_size_rec_y[c]; cy++) |
|       filter_hint_rec_y[c][cy] |
|     for (cx=0; cx<filter_hint_size_pred_x[c]; cx++) |
|       filter_hint_pred_x[c][cx] |
|     for (cy=0; cy<filter_hint_size_pred_y[c]; cy++) |
|       filter_hint_pred_y[c][cy] |
|     for (cx=0; cx<filter_hint_size_qpe_x[c]; cx++) |
|       filter_hint_qpe_x[c][cx] |
|     for (cy=0; cy<filter_hint_size_qpe_y[c]; cy++) |
|       filter_hint_qpe_y[c][cy] |
|   } |
|   filter_hint_offset[c] |
| } |

FIG. 13B decode post filter

| Description |
|---|
| decode_post_filter(c){ |
|   filter_hint_type[c] |
|   filter_precision [c] |
|   if (filter_hint_type[c] ==0 ‖ filter_hint_type[c] ==1) { //2D |
|     filter_hint_size_rec_idx[c] |
|     filter_hint_size_pred_idx[c] |
|     filter_hint_size_qpe_idx[c] |
|     for (cy=0; cy<filter_hint_size_rec[c]; cy++) |
|       for (cx=0; cx<filter_hint_size_rec[c]; cx++) |
|         filter_hint_rec[c][cy][cx] |
|     for (cy=0; cy<filter_hint_size_pred[c]; cy++) |
|       for (cx=0; cx<filter_hint_size_pred[c]; cx++) |
|         filter_hint_pred[c][cy][cx] |
|     for (cy=0; cy<filter_hint_size_qpe[c]; cy++) |
|       for (cx=0; cx<filter_hint_size_qpe[c]; cx++) |
|         filter_hint_qpe[c][cy][cx] |
|   } |
|   else{ //1D |
|     filter_hint_size_rec_x_idx[c] |
|     filter_hint_size_rec_y_idx[c] |
|     filter_hint_size_pred_x_idx[c] |
|     filter_hint_size_pred_y_idx[c] |
|     filter_hint_size_qpe_x_idx[c] |
|     filter_hint_size_qpe_y_idx[c] |
|     for (cx=0; cx<filter_hint_size_rec_x[c]; cx++) |
|       filter_hint_rec_x[c][cx] |
|     for (cy=0; cy<filter_hint_size_rec_y[c]; cy++) |
|       filter_hint_rec_y[c][cy] |
|     for (cx=0; cx<filter_hint_size_pred_x[c]; cx++) |
|       filter_hint_pred_x[c][cx] |
|     for (cy=0; cy<filter_hint_size_pred_y[c]; cy++) |
|       filter_hint_pred_y[c][cy] |
|     for (cx=0; cx<filter_hint_size_qpe_x[c]; cx++) |
|       filter_hint_qpe_x[c][cx] |
|     for (cy=0; cy<filter_hint_size_qpe_y[c]; cy++) |
|       filter_hint_qpe_y[c][cy] |
|   } |
|   filter_hint_offset[c] |
| } |

FIG. 14 filter_hint_type values

| Value | Description |
|---|---|
| 0 | Coefficient of two-dimensional FIR filter |
| 1 | Cross correlation matrix |
| 2 | Coefficients of two one-dimensional FIR filters |
| 3 | Two cross correlation vectors |

FIG. 15

| filter_precision[c] | Wiener_Filter_Precision[c] |
|---|---|
| 0 | 8 |
| 1 | 16 |
| 2 | 32 |
| 3 | 64 |
| 4 | 128 |
| 5 | 256 |
| 6 | 512 |
| 7 | 1024 |
| 8 | 2048 |
| 9 | 4096 |
| 10 | 8192 |
| 11 | 16384 |

FIG. 16

| filter_precision[c] | Codeword |
| --- | --- |
| 0 | 1 |
| 1 | 01 |
| 2 | 001 |
| 3 | 0001 |
| 4 | 00001 |
| 5 | 000001 |
| 6 | 0000001 |
| 7 | 00000001 |
| 8 | 000000001 |
| 9 | 0000000001 |
| 10 | 00000000001 |
| 11 | 000000000001 |

FIG. 17

| filter_precision[c] | Codeword |
| --- | --- |
| 0 | 10 |
| 1 | 11 |
| 2 | 010 |
| 3 | 011 |
| 4 | 0010 |
| 5 | 0011 |
| 6 | 00010 |
| 7 | 00011 |
| 8 | 000010 |
| 9 | 000011 |
| 10 | 0000010 |
| 11 | 0000011 |

FIG. 18

| filter_precision[c] | Codeword |
|---|---|
| 0 | 100 |
| 1 | 101 |
| 2 | 110 |
| 3 | 111 |
| 4 | 0100 |
| 5 | 0101 |
| 6 | 0110 |
| 7 | 0111 |
| 8 | 00100 |
| 9 | 00101 |
| 10 | 00110 |
| 11 | 00111 |

FIG. 19

| filter_precision[c] | Codeword |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

FIG. 20A $$\text{coeff\_rec}[c][cy][cx] = \begin{cases} \text{filter\_hint\_rec}[c][cy][cx] + \text{Wiener\_Filter\_Precision}[c] & ; cx = \frac{(\text{filter\_hint\_size\_rec\_x-1})}{2} \wedge cy = \frac{(\text{filter\_hint\_size\_rec\_y-1})}{2} \\ \text{filter\_hint\_rec}[c][cy][cx] & ; \text{else} \end{cases}$$

...(Expression 8)

FIG. 20B $$\text{coeff\_pred}[c][cy][cx] =$$
$$\begin{cases} \text{filter\_hint\_pred}[c][cy][cx] + (\text{Wiener\_Filter\_Precision}[c] - \text{coeff\_rec}[c][oy][ox]) & ; cx = \frac{(\text{filter\_hint\_size\_pred\_x-1})}{2} \wedge cy = \frac{(\text{filter\_hint\_size\_pred\_y-1})}{2} \\ \text{filter\_hint\_pred}[c][cy][cx] - \text{filter\_hint\_rec}[c][oy][ox] & ; \text{else} \end{cases}$$

with $ox = \frac{(\text{filter\_hint\_size\_rec\_x-1})}{2}$ and $oy = \frac{(\text{filter\_hint\_size\_rec\_y-1})}{2}$ ... (Expression 9)

FIG. 20C $$\text{coeff\_qpe}[c][cy][cx] = \begin{cases} \text{filter\_hint\_qpe}[c][cy][cx] + \text{coeff\_pred}[c][oy][ox] & ; cx = \frac{(\text{filter\_hint\_size\_qpe\_x-1})}{2} \wedge cy = \frac{(\text{filter\_hint\_size\_qpe\_y-1})}{2} \\ \text{filter\_hint\_qpe}[c][cy][cx] & ; \text{else} \end{cases}$$

with $ox = \frac{(\text{filter\_hint\_size\_pred\_x-1})}{2}$ and $oy = \frac{(\text{filter\_hint\_size\_pred\_y-1})}{2}$ ... (Expression 10)

FIG. 21

$$\begin{aligned}\text{filtered\_image}[c][y][x] =& \sum_{j=0}^{\text{filter\_hint\_size\_rec\_y}-1} \sum_{i=0}^{\text{filter\_hint\_size\_rec\_x}-1} \text{coeff\_rec}[c][j][i] \\ & \cdot \text{rec\_image}[c]\left[y+j-\frac{\text{filter\_hint\_size\_rec\_y}-1}{2}\right]\left[x+i-\frac{\text{filter\_hint\_size\_rec\_x}-1}{2}\right] \\ &+ \sum_{j=0}^{\text{filter\_hint\_size\_pred\_y}-1} \sum_{i=0}^{\text{filter\_hint\_size\_pred\_x}-1} \text{coeff\_pred}[c][j][i] \\ & \cdot \text{pred\_image}[c]\left[y+j-\frac{\text{filter\_hint\_size\_pred\_y}-1}{2}\right]\left[x+i-\frac{\text{filter\_hint\_size\_pred\_x}-1}{2}\right] \\ &+ \sum_{j=0}^{\text{filter\_hint\_size\_qpe\_y}-1} \sum_{i=0}^{\text{filter\_hint\_size\_qpe\_x}-1} \text{coeff\_qpe}[c][j][i] \\ & \cdot \text{qpe\_image}[c]\left[y+j-\frac{\text{filter\_hint\_size\_qpe\_y}-1}{2}\right]\left[x+i-\frac{\text{filter\_hint\_size\_qpe\_x}-1}{2}\right] \\ &+ \text{filtered\_hint\_offset}[c] \end{aligned}$$

... (Expression 11)

FIG. 22A $$\text{filtered\_image\_clipped}[c][y][x] = \begin{cases} 0; \text{floor}\left(\left(\text{filtered\_image}[c][y][x] + \frac{\text{Wiener\_Filter\_Precision}[c]}{2}\right)/\text{Wiener\_Filter\_Precision}[c]\right) < 0 \\ 255; \text{floor}\left(\left(\text{filtered\_image}[c][y][x] + \frac{\text{Wiener\_Filter\_Precision}[c]}{2}\right)/\text{Wiener\_Filter\_Precision}[c]\right) > 255 \\ \text{floor}\left(\left(\text{filtered\_image}[c][y][x] + \frac{\text{Wiener\_Filter\_Precision}[c]}{2}\right)/\text{Wiener\_Filter\_Precision}[c]\right); \text{else} \end{cases}$$

··· (Expression 12)

FIG. 22B $$\text{filtered\_image\_clipped}[c][y][x] = \begin{cases} 0; \text{floor}((\text{filtered\_image}[c][y][x] + (\text{Wiener\_Filter\_Precision}[c] >> 1)) >> \alpha[c]) < 0 \\ 255; \text{floor}((\text{filtered\_image}[c][y][x] + (\text{Wiener\_Filter\_Precision}[c] >> 1)) >> \alpha[c]) > 255 \\ \text{floor}((\text{filtered\_image}[c][y][x] + (\text{Wiener\_Filter\_Precision}[c] >> 1)) >> \alpha[c]); \text{else} \end{cases}$$

··· (Expression 13)

FIG. 23A $$cx = \frac{(filter\_hint\_size\_pred\_x-1)}{2} \wedge cy = \frac{(filter\_hint\_size\_pred\_y-1)}{2} \quad \cdots \text{(Expression 17)}$$

$$coeff\_pred[\,c\,][cy][cx] =$$

$$filter\_hint\_pred[c][cy][cx]\text{-}filter\_hint\_rec[c][oy][ox]$$

$$\text{with } ox = cx - \frac{(filter\_hint\_size\_pred\_x-1)}{2} + \frac{(filter\_hint\_size\_rec\_x-1)}{2} \text{ and}$$

$$oy = cy - \frac{(filter\_hint\_size\_pred\_y-1)}{2} + \frac{(filter\_hint\_size\_rec\_y-1)}{2}$$

$$\cdots \text{(Expression 18)}$$

FIG. 23B $$cx \neq \frac{(filter\_hint\_size\_pred\_x-1)}{2} \wedge cy \neq \frac{(filter\_hint\_size\_pred\_y-1)}{2} \quad \cdots \text{(Expression 19)}$$

$$coeff\_pred[c][cy][cx] =$$

$$\begin{cases} filter\_hint\_pred[c][cy][cx]+coeff\_rec[c][oy][ox] & ; 0 \leq ox \leq filter\_hint\_size\_pred\_x-1 \wedge 0 \leq oy \leq filter\_hint\_size\_pred\_y-1 \\ filter\_hint\_pred[c][cy][cx] & \text{else} \end{cases}$$

$$\text{with } ox = cx - \frac{(filter\_hint\_size\_pred\_x-1)}{2} + \frac{(filter\_hint\_size\_rec\_x-1)}{2} \text{ and}$$

$$oy = cy - \frac{(filter\_hint\_size\_pred\_y-1)}{2} + \frac{(filter\_hint\_size\_rec\_y-1)}{2}$$

$$\cdots \text{(Expression 20)}$$

FIG. 23C $$\text{coeff\_qpe}[c][cy][cx] = \begin{cases} \text{filter\_hint\_qpe}[c][cy][cx] + \text{coeff\_pred}[c][oy][ox] & ; 0 \leq ox \leq \text{filter\_hint\_size\_qpe\_x}-1 \land 0 \leq oy \leq \text{filter\_hint\_size\_qpe\_y}-1 \\ \text{filter\_hint\_qpe}[c][cy][cx] & \text{else} \end{cases}$$

$$\text{with } ox = cx - \frac{(\text{filter\_hint\_size\_qpe\_x}-1)}{2} + \frac{(\text{filter\_hint\_size\_pred\_x}-1)}{2} \text{ and}$$

$$oy = cy - \frac{(\text{filter\_hint\_size\_qpe\_y}-1)}{2} + \frac{(\text{filter\_hint\_size\_pred\_y}-1)}{2}$$

··· (Expression 21)

FIG. 24A $$\text{coeff\_rec\_x}[\,c\,][\,cx\,] = \begin{cases} \text{filter\_hint\_rec\_x}[c][cx] + \text{Wiener\_Filter\_Precision}[c] & ; cx = \dfrac{(\text{filter\_hint\_size\_rec\_x} - 1)}{2} \\ \text{filter\_hint\_rec\_x}[c][cx] & ; \text{else} \end{cases} \quad \cdots \text{(Expression 22)}$$

$$\text{coeff\_rec\_y}[\,c\,][\,cy\,] = \begin{cases} \text{filter\_hint\_rec\_y}[c][cy] + \text{Wiener\_Filter\_Precision}[c] & ; cx = \dfrac{(\text{filter\_hint\_size\_rec\_y} - 1)}{2} \\ \text{filter\_hint\_rec\_y}[c][cy] & ; \text{else} \end{cases} \quad \cdots \text{(Expression 23)}$$

FIG. 24B $$\text{coeff\_pred\_x}[c][cx] = \begin{cases} \text{filter\_hint\_pred\_x}[c][cx] + (\text{Wiener\_Filter\_Precision}[c] - \text{coeff\_rec\_x}[c][ox]) & ; cx = \frac{(\text{filter\_hint\_size\_pred\_x}-1)}{2} \\ \text{filter\_hint\_pred\_x}[c][cx] & \text{else} \\ \text{filter\_hint\_pred\_x}[c][cx] - \text{filter\_hint\_rec\_x}[c][ox] & ; cx = \frac{(\text{filter\_hint\_size\_pred\_x}-1)}{2} \\ \text{filter\_hint\_pred\_x}[c][cx] & \text{else} \end{cases}$$

$$\text{with } ox = \frac{(\text{filter\_hint\_size\_rec\_x}-1)}{2} \quad \cdots \text{(Expression 24)}$$

$$\text{coeff\_pred\_y}[c][cy] = \begin{cases} \text{filter\_hint\_pred\_y}[c][cy] + (\text{Wiener\_Filter\_Precision}[c] - \text{coeff\_rec\_y}[c][ox]) & ; cy = \frac{(\text{filter\_hint\_size\_pred\_y}-1)}{2} \\ \text{filter\_hint\_pred\_y}[c][cy] & \text{else} \\ \text{filter\_hint\_pred\_y}[c][cy] - \text{filter\_hint\_rec\_y}[c][oy] & ; cy = \frac{(\text{filter\_hint\_size\_pred\_y}-1)}{2} \\ \text{filter\_hint\_pred\_y}[c][cy] & \text{else} \end{cases}$$

$$\text{with } oy = \frac{(\text{filter\_hint\_size\_rec\_y}-1)}{2} \quad \cdots \text{(Expression 25)}$$

FIG. 24C $$\text{coeff\_qpe\_x}[c][cx] = \begin{cases} \dfrac{\text{filter\_hint\_qpe\_x}[c][cx] + \text{coeff\_pred\_x}[c][ox]}{\text{filter\_hint\_qpe\_x}[c][cx]} & ; cx = \dfrac{(\text{filter\_hint\_size\_qpe\_x}-1)}{2} \\ & ; \text{else} \end{cases}$$

$$\text{with } ox = \dfrac{(\text{filter\_hint\_size\_pred\_x}-1)}{2} \quad \cdots \text{(Expression 26)}$$

$$\text{coeff\_qpe\_y}[c][cy] = \begin{cases} \dfrac{\text{filter\_hint\_qpe\_y}[c][cy] + \text{coeff\_pred\_y}[c][oy]}{\text{filter\_hint\_qpe\_y}[c][cy]} & ; cy = \dfrac{(\text{filter\_hint\_size\_qpe\_y}-1)}{2} \\ & ; \text{else} \end{cases}$$

$$\text{with } ox = \dfrac{(\text{filter\_hint\_size\_pred\_y}-1)}{2} \quad \cdots \text{(Expression 27)}$$

FIG. 25

$$\text{filtered\_image\_x}[c][y][x] = \sum_{i=0}^{\text{filter\_hint\_size\_rec\_x}} \text{coeff\_rec\_x}[c][i] \cdot \text{rec\_image}[c][y]\left[x+i-\frac{\text{filter\_hint\_size\_rec\_x}-1}{2}\right]$$

$$+ \sum_{i=0}^{\text{filter\_hint\_size\_pred\_x}} \text{coeff\_pred\_x}[c][i] \cdot \text{pred\_image}[c][y]\left[x+i-\frac{\text{filter\_hint\_size\_pred\_x}-1}{2}\right]$$

$$+ \sum_{i=0}^{\text{filter\_hint\_size\_qpe\_x}} \text{coeff\_qpe\_x}[c][i] \cdot \text{qpe\_image}[c][y]\left[x+i-\frac{\text{filter\_hint\_size\_qpe\_x}-1}{2}\right]$$

$$\cdots \text{(Expression 28)}$$

FIG. 26

$$\text{Filtered\_image\_clipped\_x}[c][y][x] = \begin{cases} 0; & \text{floor}\left(\dfrac{\text{filtered\_image\_x}[c][y][x] + \dfrac{\text{Wiener\_Filter\_Precision}[c]}{2}}{\text{Wiener\_Filter\_Precision}[c]}\right) < 0 \\ 255; & \text{floor}\left(\dfrac{\text{filtered\_image\_x}[c][y][x] + \dfrac{\text{Wiener\_Filter\_Precision}[c]}{2}}{\text{Wiener\_Filter\_Precision}[c]}\right) > 255 \\ \text{floor}\left(\dfrac{\text{filtered\_image\_x}[c][y][x] + \dfrac{\text{Wiener\_Filter\_Precision}[c]}{2}}{\text{Wiener\_Filter\_Precision}[c]}\right); & \text{else} \end{cases} \quad \text{(Expression 29)}$$

FIG. 27

$$\text{filtered\_image\_xy}[c][y][x] = \sum_{j=0}^{\text{filter\_hint\_size\_rec\_y}} \text{coeff\_rec\_y}[c][j] \cdot \text{filtered\_image\_clipped\_x}[c]\left[y+j-\frac{\text{filter\_hint\_size\_rec\_y}-1}{2}\right][x]$$

$$+ \sum_{j=0}^{\text{filter\_hint\_size\_pred\_y}} \text{coeff\_pred\_y}[c][j] \cdot \text{pred\_image}[c]\left[y+j-\frac{\text{filter\_hint\_size\_pred\_y}-1}{2}\right][x]$$

$$+ \sum_{j=0}^{\text{filter\_hint\_size\_qpe\_y}} \text{coeff\_qpe\_y}[c][j] \cdot \text{qpe\_image}[c]\left[y+j-\frac{\text{filter\_hint\_size\_qpe\_y}-1}{2}\right][x]$$

$$+ \text{filter\_hint\_offset}[c] \qquad \cdots \text{(Expression 30)}$$

FIG. 28

$$\text{Filtered\_image\_clipped}[c][y][x] = \begin{cases} 0; \text{floor}\left(\left(\text{filtered\_image\_xy}[c][y][x] + \frac{\text{Wiener\_Filter\_Precision}[c]}{2}\right) / \text{Wiener\_Filter\_Precision}[c]\right) < 0 \\ 255; \text{floor}\left(\left(\text{filtered\_image\_xy}[c][y][x] + \frac{\text{Wiener\_Filter\_Precision}[c]}{2}\right) / \text{Wiener\_Filter\_Precision}[c]\right) > 255 \\ \text{floor}\left(\left(\text{filtered\_image\_xy}[c][y][x] + \frac{\text{Wiener\_Filter\_Precision}[c]}{2}\right) / \text{Wiener\_Filter\_Precision}[c]\right); \text{else} \end{cases}$$

... (Expression 31)

FIG. 29A $$cc\_rec[c][cy][cx] = \frac{1}{\text{Wiener\_Filter\_Precision}[c]} \times \left\{ \begin{array}{l} \text{filter\_hint\_rec}[c][cy][cx] + \text{Wiener\_Filter\_Precision}[c]; \\ cx = \frac{(\text{filter\_hint\_size\_rec\_x}-1)}{2} \wedge cy = \frac{(\text{filter\_hint\_size\_rec\_y}-1)}{2} \\ \text{filter\_hint\_rec}[c][cy][cx]; \\ \text{else} \end{array} \right.$$

... (Expression 32)

FIG. 29B $$cc\_pred[c][cy][cx] = \frac{1}{\text{Wiener\_Filter\_Precision}[c]} \times \left\{ \begin{array}{l} \text{filter\_hint\_pred}[c][cy][cx] + (\text{Wiener\_Filter\_Precision}[c] - cc\_rec[c][cy][cx]); \\ cx = \frac{(\text{filter\_hint\_size\_pred\_x}-1)}{2} \wedge cy = \frac{(\text{filter\_hint\_size\_pred\_y}-1)}{2} \\ \text{filter\_hint\_pred}[c][cy][cx]; \\ \text{else} \end{array} \right.$$

... (Expression 33)

FIG. 29C $$cc\_qpe[c][cy][cx] = \frac{1}{Wiener\_Filter\_Precision[c]} \times \begin{cases} \frac{filter\_hint\_qpe[c][cy][cx] + cc\_pred[c][cy][cx]}{filter\_hint\_qpe[c][cy][cx]} & ; cx = \frac{(filter\_hint\_size\_qpe\_x-1)}{2} \wedge cy = \frac{(filter\_hint\_size\_qpe\_y-1)}{2} \\ ; else \end{cases} \quad \cdots \text{(Expression 34)}$$

FIG. 30A $$cc\_rec\_x[c][cx] = \frac{1}{Wiener\_Filter\_Precision[c]} \times \begin{cases} filter\_hint\_rec\_x[c][cx] + Wiener\_Filter\_Precision[c] & ; cx = \frac{(filter\_hint\_size\_rec\_x-1)}{2} \\ filter\_hint\_rec\_x[c][cx] & ; else \end{cases} \quad \cdots \text{(Expression 35)}$$

FIG. 30B $$cc\_rec\_y[c][cy] = \frac{1}{Wiener\_Filter\_Precision[c]} \times \begin{cases} filter\_hint\_rec\_y[c][cy] + Wiener\_Filter\_Precision[c] & ; cy = \frac{(filter\_hint\_size\_rec\_y-1)}{2} \\ filter\_hint\_rec\_y[c][cy] & ; else \end{cases} \quad \cdots \text{(Expression 36)}$$

FIG. 30C $$cc\_pred\_x[c][cx] = \frac{1}{Wiener\_Filter\_Precision[c]} \times \begin{cases} \frac{filter\_hint\_pred\_x[c][cx] + (Wiener\_Filter\_Precision[c] - cc\_rec\_x[c][cx])}{filter\_hint\_pred\_x[c][cx]} & ; cx = \frac{(filter\_hint\_size\_pred\_x-1)}{2} \\ ; & else \end{cases}$$

... (Expression 37)

FIG. 30D $$cc\_pred\_y[c][cy] = \frac{1}{Wiener\_Filter\_Precision[c]} \times \begin{cases} \frac{filter\_hint\_pred\_y[c][cy] + (Wiener\_Filter\_Precision[c] - cc\_rec\_y[c][cy])}{filter\_hint\_pred\_y[c][cy]} & ; cx = \frac{(filter\_hint\_size\_pred\_y-1)}{2} \\ ; & else \end{cases}$$

... (Expression 38)

FIG. 30E $$cc\_qpe\_x[c][cx] = \frac{1}{Wiener\_Filter\_Precision[c]} \times \begin{cases} filter\_hint\_qpe\_x[c][cx] + cc\_pred\_x[c][cx] & ; cx = \frac{(filter\_hint\_size\_qpe\_x - 1)}{2} \\ filter\_hint\_qpe\_x[c][cx] & ; else \end{cases}$$

... (Expression 39)

FIG. 30F $$cc\_qpe\text{-}y[c][cy] = \frac{1}{Wiener\_Filter\_Precision[c]} \times \begin{cases} filter\_hint\_qpe\_y[c][cy] + cc\_pred\_y[c][cy] & ; cy = \frac{(filter\_hint\_size\_qpe\_y - 1)}{2} \\ filter\_hint\_qpe\_y[c][cy] & ; else \end{cases}$$

... (Expression 40)

| Neighboring block (m = 2) | Neighboring block (m = 3) | Neighboring block (m = 4) |
|---|---|---|
| Neighboring block (m = 5) | Current block (m = 1) | Neighboring block (m = 6) |
| Neighboring block (m = 7) | Neighboring block (m = 8) | Neighboring block (m = 9) |

VIDEO CODING METHOD, VIDEO DECODING METHOD, VIDEO CODING APPARATUS, AND VIDEO DECODING APPARATUS THAT USE FILTERS FOR FILTERING SIGNALS

BACKGROUND OF INVENTION

1. Technical Field

The present invention relates to video coding method of coding video signals and video decoding method of decoding the coded video signals, and in particular to methods of coding and decoding signals using filters for filtering the signals resulting from the coding and decoding.

2. Background Art

At present, the most of standardized video coding algorithms are based on hybrid video coding. Typically, hybrid video coding methods combine several different lossless and lossy compression schemes in order to achieve a desired compression gain. Hybrid video coding is also the basis for the ITU-T standards (the H.26x standards such as H.261 and H.263) as well as the ISO/IEC standards (the MPEG-X standards such as MPEG-1, MPEG-2, and MPEG-4). The most recent and advanced video coding standard is currently the standard denoted as H.264/MPEG-4 advanced video coding (AVC) which is a result of the standardization efforts by joint video team (JVT) that is a joint team of ITU-T and ISO/IEC MPEG groups.

A video signal input to an encoder is a sequence of images called frames. Each frame is a two-dimensional matrix of pixels. All the above-mentioned standards based on hybrid video coding include subdividing each individual video frame into smaller blocks each consisting of a plurality of pixels. Typically, a macroblock (usually denoting a block composed of 16×16 pixels) is an image element as a basic unit of coding. However, various particular coding steps may be performed for smaller image elements which are, for example, submacroblocks having a size of 8×8, 4×4, 16×8, or the like, or other units of blocks.

Typically, the coding steps in a hybrid video coding include a spatial and/or a temporal prediction. Accordingly, each current block to be coded is first predicted from previously coded video frames, that is, by using either the blocks in its spatial neighborhood or blocks from its temporal neighborhood. A block that is calculated next is a difference between the current block to be coded and a prediction result that is also referred to as a prediction residual or a prediction error signal. The next coding step is to transform a residual block (a prediction error signal) from the spatial (pixel) domain to a frequency domain. The transform aims at reducing the redundancy of the residual block. The still next coding step is to quantize the transform coefficients. In this step, the actual lossy (irreversible) compression is performed. Usually, the compressed transform coefficient values (quantized coefficients) are further compacted (losslessly compressed) by means of an entropy coding. In addition, supplementary information necessary to reconstruct the coded video signal is coded and provided together with the coded video signal. This information is, for example, information about a spatial and/or temporal prediction, the amount of quantization, or the like.

FIG. 1 is a block diagram showing an example of a typical video coding apparatus (encoder) 100 compliant with the H.264/MPEG-4 AVC standard. The H.264/MPEG-4 AVC standard is a combination of all the above-mentioned coding steps. A subtractor 105 first determines differences between a current block to be coded in an input video image (input signal) and a corresponding prediction block (a prediction signal). This difference is used to predict the current block to be coded. In H.264/MPEG-4 AVC, the prediction signal is generated either by a temporal prediction or by a spatial prediction. The type of prediction can be varied on a per frame basis or on a per macroblock basis. Macroblocks predicted using temporal prediction (inter prediction) are called inter-coded macroblcoks and macroblocks predicted using spatial prediction (intra prediction) are called intra-coded macroblcoks. The type of prediction for a video frame can be set by the user or selected by the video coding apparatus 100 so as to achieve a compression gain that is as high as possible. In accordance with the selected prediction type, an intra/inter switch 175 provides a corresponding prediction signal to the subtractor 105. The prediction signal which is generated using temporal prediction is calculated from a reconstructed image (a reconstructed image signal) which is stored in a memory 140. The prediction signal which is generated using spatial prediction is calculated from the value(s) of boundary pixel(s) in the neighboring block(s) which is/are previously coded, decoded, and stored in the memory 140. The memory 140 thus operates as a delay unit that allows a comparison between the current signal value to be coded and the prediction signal value generated from the previous signal value(s). The memory 140 can store a plurality of previously coded video frames. The difference between the input signal and the prediction signal is referred to as a prediction error signal or a residual. A transform/quantization unit 110 transforms the prediction error signal into coefficients of frequency components, and quantizes the transformed coefficients. An entropy coding unit 190 entropy-codes the quantized coefficients in order to further reduce the amount of data in a lossless way. Such reduction is mainly achieved by applying variable length coding using codewords having variable lengths that are determined based on the occurrence probabilities of the respective codewords.

Intra-coded images (also referred to as I-pictures, I-images or I-frames) consist only of macroblocks that are intra-coded, that is, intra-coded images. Thus, the intra-coded images can be decoded without reference to any other previously decoded image. The intra-coded images provide error resilience for the resulting coded video sequence. This is because the intra-coded images are images for removing (refreshing) errors that otherwise propagate from frame to frame in the video sequence due to temporal prediction. Moreover, each I-frame enables a random access within the resulting coded video sequence. Basically, intra-fame prediction is performed by using a predefined set of intra-prediction modes for predicting a current block based on the boundary pixels in the neighboring blocks already coded. Different spatial intra-prediction modes are performed by applying different two-dimensional prediction directions. This allows efficient spatial intra prediction in the case of various edge directions. The prediction signal generated by such an intra prediction is then subtracted from the input signal by the subtractor 105 as described above. In addition, information indicating a spatial intra prediction mode is entropy-coded and provided together with the coded video signal.

The video coding apparatus 100 includes a decoding unit which generates a decoded video signal. The video coding apparatus 100 further includes an inverse quantization/inverse transform unit 120 which executes the decoding steps corresponding to the coding steps. The inverse quantization/inverse transform unit 120 generates a quantized prediction error signal by inversely quantizing and inversely transforming the quantized coefficients. The quantized prediction error signal differs from the original prediction error signal due to a quantization error that is also referred to as a quantization noise. An adder 125 generates a reconstructed signal by adding the quantized prediction error signal to the prediction signal. In order to maintain the compatibility between the encoder side (the video coding apparatus 100) and the decoder side (the video decoding apparatus), a prediction signal known at both the encoder and decoder sides is generated using the reconstructed signal that is the video signal coded and then decoded. Due to the quantization, the quantization noise is superimposed to the reconstructed video signal. Due to the block-based coding, the superimposed noise often has blocking characteristics which result in noticeable block boundaries in the decoded image represented by the reconstructed signal, in particular when strong quantization is performed. Such blocking artifacts (block distortions) have a negative effect upon human visual perception.

In order to reduce these artifacts, a deblocking filter 130 performs deblocking filtering for each block of the decoded image. The deblocking filtering is performed on the reconstructed signal which is the sum of the prediction signal and the quantized prediction error signal. The reconstructed video signal that is the reconstructed signal after being subjected to the deblocking filtering is the decoded signal which is generally displayed at the decoder side (if no such post filtering is performed). The deblocking filter in H.264/MPEG-4 AVC can be applied locally. In the case of a high degree of blocking noise, a strong (narrow-band) low-pass filter is applied, whereas in the case of a low degree of blocking noise, a weaker (broad-band) low-pass filter is applied. The strength of the low-pass filter is determined by the prediction signal and by the quantized prediction error signal. A deblocking filter generally smoothes the block edges, which leads to an enhanced subjective quality of the decoded image. Moreover, since the filtered part of an image is used for the motion compensation prediction of the following images, the filtering also reduces the prediction errors, and thus enables increase in the coding efficiency.

Intra-coded macroblocks are filtered before being displayed, but intra prediction is carried out using the macroblocks represented by the reconstructed signal that is not yet filtered.

FIG. 2 is a diagram for illustrating processing performed by the deblocking filter 130. The deblocking filter 130 separates samples $p_3$, $p_2$, $p_1$, and $p_0$ of a first block 301 on its left and samples $q_3$, $q_2$, $q_1$, and $q_0$ of a second block 302 on its right, and performs deblocking filtering at the vertical block boundary 310. A linear deblocking filtering with four coefficients is applied to the input samples $p_2$, $p_1$, $p_0$, $q_0$, $q_1$ and $q_2$, which produces, as the samples already subjected to the deblocking filtering, the following filtered outputs "$p_{0,\ new}$" and "$q_{0,\ new}$":

$$p0,new=(p2-(p1<<1)+(p0+q0+1)>>1)>>1,$$

$$q0,new=(q2-(q1<<1)+(q0+p0+1)>>1)>>1$$

The reconstructed video signal is then stored in the memory 140.

In order to be decoded, inter-coded images require also the previously coded and subsequently decoded image(s). Temporal prediction may be performed uni-directionally (that is, using only video frames temporally before the current frame to be coded), or bi-directionally (that is, using also video frames preceeding and following the current frame. Uni-directional temporal prediction results in inter-coded images called P-frames (P-pictures), and bi-directional temporal prediction results in inter-coded images called B-frames (B-pictures). In general, an inter-coded image may be composed of any of a P-macroblock and a B-macroblock, and possibly even an I-macroblock.

A motion compensation prediction unit 160 predicts an inter-coded macroblock (a P-macroblock or a B-macroblock). First, a motion estimation unit 165 detects a best-matching block for the current block within one of the previously coded and decoded video frames. The aforementioned prediction signal shows this best-matching block. The motion estimation unit 165 signals the relative displacement (motion) between the current block and its best matching block, as motion data in the form of a three-dimensional motion vector that is included in the supplementary information provided together with the coded video signal. The three dimensions consist of two spatial dimensions and one temporal dimension. In order to optimize the prediction accuracy, a motion vector may be determined with a spatial sub-pixel resolution such as the half pixel or quarter pixel resolution. A motion vector with a spatial sub-pixel resolution may point to a spatial position such as a sub-pixel position which is within an already decoded video frame and at which no real pixel value is available. Hence, spatial interpolation of such pixel values is needed in order to perform motion compensation prediction. The interpolation filter 150 interpolates such spatial pixel values. According to the H.264/MPEG-4 AVC standard, a six-tap Wiener interpolation filter having fixed filter coefficients and a bilinear filter are applied in order to generate pixel values at sub-pixel positions in both the vertical and horizontal directions.

In the intra- and inter-coding modes, the transform/quantization unit 110 transforms and quantizes the prediction error signals that are differences between the input signal and the prediction signal to generate quantized coefficients. Generally, an orthogonal transform such as a two-dimensional discrete cosine transform (DCT) or an integer version thereof is employed. The orthogonal transform is performed to reduce the redundancies of the natural video images efficiently. After the transform, lower frequency components are usually more important for the image quality than high frequency components. Thus, more bits can be spent for coding the low frequency components than the high frequency components. An entropy coding unit 190 converts the two-dimensional matrix of quantized coefficients into a one-dimensional array. Typically, this conversion is performed by a what is called zig-zag scanning. The zig-zag scanning is performed starting with the DC-coefficient in the upper left corner of the two-dimensional matrix and ending with the AC coefficient in the lower right corner according to a predetermined sequential order. The energy is typically concentrated in the lower frequencies corresponding to the left upper part of the two-dimensional matrix of coefficients. Thus, the zig-zag scanning usually results in an array where the last values are sequential zeros. In this way, it is possible to perform efficient coding using run-length codes as a part of or at a pre-stage of the actual entropy coding.

The H.264/MPEG-4 AVC employs scalar quantization which can be controlled by a quantization parameter (QP) and a customizable quantization matrix (QM). For each macroblock, a corresponding one of 52 quantizers is selected by a quantization parameter. In addition, such a quantization matrix is specifically designed to keep certain frequencies in the source to avoid degradation of image quality. A quantization matrix in the H.264/MPEG-4 AVC can be adapted to the video sequence and signaled together with the coded video signal.

The H.264/MPEG-4 AVC standard includes two functional layers that are a Video Coding Layer (VCL) and a Network Abstraction Layer (NAL). The VCL provides the coding functionality as briefly described above. The NAL encapsulates the coded prediction error signal together with the supplemental information necessary for the decoding of the video into standardized units called NAL units according to their further application(s) such as transmission over a channel and/or storing in a storage. There are VCL NAL units containing the compressed video data and the related information. There are also non-VCL units that encapsulate additional data. Examples of such additional data include a parameter set relating to an entire video sequence, or recently added Supplemental Enhancement Information (SEI) providing additional information that can be used to increase the decoding performance.

In order to enhance the image quality, a what is called post filter 280 (see FIG. 3) may be applied at the decoder (the video decoding apparatus 200). The H.264/MPEG-4 AVC standard allows the sending of post filter data for such a post filtering via the Supplemental Enhancement Information (SEI) message. The post filter design unit 180 identifies the filter data (a what is called filter hint for post filtering) by comparing the locally decoded signal (the reconstructed video signal) and the original input signal. In general, the filter data is information used by a decoder to set up an appropriate filter condition. For example, the filter data may include filter coefficients as they are. However, the filter data may also include other information that enables the setup of the filter. Examples of the other information includes the cross-correlation information related to the uncompressed signal, cross-correlation information between the original input image and the decoded image, and cross-correlation information between the decoded image and the quantization noise. This cross correlation information can be used to calculate the filter coefficients. The filter data which is output by the post filter design unit 180 is also transmitted to the entropy coding unit 190 in order to be coded and inserted into the coded video signal.

The decoder may apply the filter data to the decoded signal before display of the decoded signal (the decoded video signal).

FIG. 3 is a block diagram of an exemplary video decoding apparatus (decoder) 200 compliant with the H.264/MPEG-4 AVC video coding standard. The input signal that is the coded video signal is first transmitted to the entropy decoding unit 290. The entropy decoding unit 290 entropy-decodes the input signal. This yields the quantized coefficients, the information elements necessary for decoding motion data, prediction modes, etc., and the filter data. The one-dimensional array of quantized coefficients is inversely scanned to be a two-dimensional matrix, and the two-dimensional matrix is then transmitted to the inverse quantization/inverse transform unit 220. The inverse quantization and inverse transform unit 220 generates a quantized prediction error signal by inversely quantizing and inversely transforming the quantized coefficients of the two-dimensional matrix. This corresponds to the differences generated by subtracting the prediction signal from the input signal input to the encoder in the case where no quantization noise is introduced The prediction signal is generated from either a motion compensation prediction unit 260 or an intra prediction unit 270, respectively. The intra/inter switch 275 switches prediction signals to be output to the adder 225, according to an information element indicating the type of prediction applied at the encoder. An information element in the case of intra-prediction further includes information such as intra-prediction mode necessary for the intra prediction, and an information element in the case of motion compensation prediction further includes information such as motion data necessary for the motion compensation prediction. Depending on the current value of the motion vector, interpolation of pixel values may be required to perform motion compensation prediction. This interpolation is performed by an interpolation filter 250. The adder 225 generates the reconstructed signal by adding a quantized prediction error signal in the spatial domain to the prediction signal obtainable either from the motion compensation prediction unit 260 or the intra prediction unit 270. Furthermore, the adder 225 transmits the reconstructed signal to a deblocking filter 230. The deblocking filter 230 generates a reconstructed video signal by performing deblocking filtering on the reconstructed signal, and stores the reconstructed video signal in the memory 240. The reconstructed video signal is used for temporal prediction or spatial prediction of the following blocks.

The post filter 280 obtains the filter data entropy-decoded by the entropy decoding unit 290, and sets a filter condition such as a filter coefficient according to the filter data. In order to enhance the image quality, the post filter 280 applies the filtering according to the condition to the reconstructed video signal. In this way, the post filter 280 is capable of adapting to the characteristics of the video signal to be input to the encoder.

In summary, there are three types of filters used in the latest H.264/MPEG-4 AVC standard. The filters are an interpolation filter, a deblocking filter, and a post filter. In general, the suitability of a filter depends on the contents of the image to be filtered. Therefore, a filter design which enables adaptation to the image characteristics is advantageous. The coefficients of such a filter may be designed as Wiener filter coefficients.

FIG. 4 is a diagram illustrating a signal flow using a Wiener filter 400 for noise reduction. A noise n is added to an input signal s, resulting in a noisy signal s' to be filtered. With the goal of reducing the noise n, the Wiener filter 400 is applied to the signal s', resulting in the filtered signal s". The Wiener filter 400 is designed to minimize the mean squared error between the input signal s which is the desired signal and the filtered signal s". This means that Wiener filter coefficients w correspond to the solution of the optimization problem "$\arg_w \min E[(S-S")^2]$" which can be formulated as a system of a linear equation referred to as a Wiener-Hopf equation. The operator E[x] indicating the expected value of x. The solution is given by:

$$w = R^{-1} \cdot p$$

Here, w is an M×1 vector containing the optimal coefficients of a Wiener filter having an order of M that is a positive integer. Also, $R^{-1}$ denotes the inverse of an M×M autocorrelation matrix R of the noisy signal s' to be filtered. Also, p denotes an M×1 cross correlation vector between the noisy signal s' to be filtered and the original signal s. For further details on adaptive filter design, see Non-patent Literature (NPL) 1. NPL 1 is incorporated herein by reference.

Thus, one of the advantageous effects of the Wiener filter 400 is that the filter coefficients can be determined from the autocorrelation of the corrupted (noisy) signal and the cross correlations of the corrupted signal and the desired signal. In video coding, quantization noise is superposed to the original (input) video signal in the quantization step. Wiener filtering in the context of video coding aims at the reduction of the superimposed quantization noise in order to minimize the mean squared error between the filtered reconstructed video signal and the original signal.

Filter information that is transmitted from the encoder to the decoder can either be the calculated filter coefficients as they are or the cross correlation vector p which is necessary for calculating the Wiener filter and which cannot be determined at the decoder. Transmitting such supplementary information may enhance the quality of filtering. Furthermore, it is possible to further enhance the filtering quality and thereby enhance the video quality by, for example, either (i) increasing the order of the filter or (ii) separately determining the respective parts of the video signal and/or separately applying filter coefficients to the respective parts of the video signal.

CITATION LIST

Patent Literature

[PTL 1]
European Patent Application Publication No. 2048886

Non Patent Literature

[NPL 1]
S. Haykin, "Adaptive Filter Theory", Fourth Edition, Prentice Hall Information and System Sciences Series, Prentice Hall, 2002, pages 10-20.

SUMMARY OF INVENTION

However, the conventional video coding method and video decoding method create a problem that increasing the number of filter coefficients in order to enhance the image quality inevitably results in an increase in the amount of filter data which should be transmitted to a decoder in order to allow the decoder to set up filter coefficients. As a result, the coding efficiency decreases, a broader communication bandwidth is required to transmit coded video signals, and a larger memory capacity is required to store the coded video signals.

The problem underlying the present invention is based on the observation that further enhancement of the quality of video filtering typically involves an increase in the requirements to the bandwidth for providing the filter data together with the coded video signal.

The present invention has been conceived in view of the aforementioned problem with an aim to provide a video coding method and a video decoding method which enable reduction in the decrease in the efficiency of coding a video and enhancement in the image quality of a resulting decoded video.

In order to achieve the above object, a video coding method according to an aspect of the present invention is a video coding method of coding a video signal including at least one picture, the video coding method including: generating a prediction signal by predicting the video signal spatially or temporally; calculating, as a prediction error signal, a difference between the video signal and the prediction signal; generating a reconstructed video signal by reconstructing the video signal, based on the prediction signal and the prediction error signal; determining filter data items each of which is used to filter a corresponding one of at least two signals among the prediction signal, the prediction error signal, and the reconstructed video signal; and coding the determined filter data items, based on a cross correlation between the determined filter data items.

In this way, filter data items such as filter coefficients are determined for each of at least two of the prediction signal, the prediction error signal, and the reconstructed video signal. Thus, a video decoding apparatus can generate a signal that is the same as or closer to the original video signal by applying the filter data items to the at least two of the prediction signal, the prediction error signal, and the reconstructed video signal, and thereby can enhance the image quality of the resulting decoded video. In addition, since the filter data items are coded based on the cross correlations between the filter data items, it is possible to reduce the amount of filter data and thereby to reduce the decrease in the coding efficiency.

In addition, in the coding of the filter data items: prediction data of a second filter data item other than a first filter data item may be identified by predicting, based on the first filter data item, the second filter data item, the second filter data item and the first filter data item being included in the determined at least two filter data items; and the second filter data item may be coded by calculating a difference between the second filter data item and the prediction data. For example, when the prediction data is identified, the first filter data item is identified as the prediction data. In addition, for example, the first filter data item is for the reconstructed video signal, and the second filter data item is for the prediction signal.

In this way, prediction coding of what is called filter data (filter coefficients) are performed. In other words, since the difference between the second filter data item and the prediction data is to be the second coded filter data item, a prediction data closer to the second filter data item can reduce the data amount of the second coded filter data more significantly, and thereby can increase the coding efficiency. In addition, when there is a tendency that the first filter data item is similar to the second filter data item, determining the first filter data item to be the prediction data makes it possible to easily identify such prediction data that increases the coding efficiency, and to reduce the processing loads.

In addition, in the coding of the filter data items: the filter data items may be quantized; and precision information items may be coded, each of the precision information items indicating precision of the quantization of a corresponding one of the filter data items.

In this way, the filter data items are quantized to further reduce the amount of filter data, which further increases the coding efficiency. In addition, since the precision information items (for example, filter_precision[c]) are coded, the video decoding apparatus can inversely quantize the quantized filter data in an appropriate manner by obtaining the coded precision information items.

In addition, in the coding of the precision information items, the precision information items may be coded such that a shorter codeword is assigned to a precision information item having a lower precision.

This further increases the coding efficiency.

In addition, in the determining of the filter data items, each of the filter data items may be determined for each of color components of the at least two signals, and in the coding of the filter data items, when the color components consist of a first color component and a second color component, a filter data item of the first color component may be coded based on a cross correlation between the filter data item of the first color component and a filter data item of the second color component.

For example, it is possible to further reduce the amount of the filter data by determining, to be the filter data item of the first coded color component, the difference between the filter data item of the first color component and the filter data item of the second color component, and thus to increase the coding efficiency.

In addition, the video coding method may further include generating a coded video signal as a bitstream, based on the prediction error signal; and including the coded filter data items into the bitstream, wherein in the including of the coded filter data items into the bitstream, the coded filter data items may be arranged, in the bistream, before an image signal that should be subjected to filtering using the filter data items.

Since the coded filter data items are arranged before the image signal to which the filter data items are applied, generating the coded filter data items and the image signal according to the order of arrangement of the filter data items in the bitstream eliminates the need to temporally store the generated filter data items, and thus enables reduction in the memory capacity. In this case, it is possible to generate the image signal using the filter data items, and thus to implement what is called an in-loop filter. In other words, it is possible to perform filtering using the filter data on the prediction signal to generate an image signal from the filtered prediction signal.

In addition, in the determining of the filter data items: a size of a filter coefficient for each of the at least two signals may be selected; and the filter data item including the filter coefficient and a syntax element for identifying the selected size may be determined.

In this way, it is possible to change the size (filter size) of a filter coefficient for each frame, slice, or the like. As a specific example, it is possible to reduce the size according to a situation where only the filter data item (filter coefficient) at the center position of a range predetermined based on the aforementioned size is coded (prediction coded) based on a cross correlation. This increases the coding efficiency.

Furthermore, in order to achieve the above object, a video decoding method according to an aspect of the present invention is a video decoding method of decoding a coded video signal including at least one picture, the video decoding method including: generating a prediction error signal from the coded video signal; generating a prediction signal by predicting the video signal spatially or temporally; generating a reconstructed video signal by reconstructing the video signal, based on the prediction signal and the prediction error signal; obtaining coded filter data items each of which is determined for a corresponding one of at least two signals among the prediction signal, the prediction error signal, and the reconstructed video signal; generating filter data items by decoding the coded filter data items corresponding to the at least two signals, based on a cross correlation between the filter data items; and filtering the at least two signals using the generated filter data items.

In this way, it is possible to decode each of the filter data items coded using a video coding method according to an aspect of the present invention in an appropriate manner. Thus, it is possible to perform filtering using the filter data to generate a decoded image that is closer to an image represented by the original video signal and has an enhanced image quality.

It is to be noted that the present invention can be not only realized as the aforementioned video coding method and video decoding method, but also implemented as apparatuses or integrated circuits which perform processing operations according to the methods, as programs causing computers to execute the processing operations according to the methods, and/or as recording media on which these programs are recorded.

In addition, it is the unique approach of the present invention to determine the filter data items considering at least two of a prediction video signal, a prediction error signal, and a reconstructed video signal, perform filtering on the determined filter data items, and code the filter data items of the at least two signals by using the statistical relationships (cross correlations) between these filter data items.

Such an approach provides an increased filtering performance on one hand, and, on the other hand, the approach reduces the bandwidth required for the transmission of the filter data items. Thus, the quality of the decoded video signal may be enhanced with respect to a particular rate required for storing/transmitting such a coded video signal.

According to an aspect of the present invention, a method of coding a video signal including at least one video frame is provided. A video signal is predicted spatially or temporally, and a prediction error signal is calculated based on the prediction result. Based on the prediction video signal and the prediction error signal, a video signal is reconstructed. Filter data for filtering at least two of the prediction video signal, the prediction error signal, and the reconstructed video signal are determined and coded. The coding is performed based on statistical relationships (cross correlations) between the filter data items of the at least two of the prediction video signal, the prediction error signal, and the reconstructed video signal.

According to another aspect of the present invention, a method of decoding a coded video signal including at least one video frame is provided. A video signal is predicted spatially or temporally, and a prediction error signal is obtained from the encoder side. Based on the prediction video signal and the prediction error signal, a video signal is reconstructed. The filter data are decoded based on statistical relationships between the filter data items of at least two of the prediction video signal, the prediction error signal, and the reconstructed video signal. Accordingly, a filter is set up in accordance with the decoded filter data, and the at least two of the prediction signal, the prediction error signal, and the reconstructed video signal are filtered.

According to still another aspect of the present invention, a coding apparatus which codes a video signal including at least one video frame is provided. The coding apparatus includes a predictor which predicts a video signal spatially or temporally, a subtractor which calculates a prediction error signal based on the prediction video signal, and a reconstructor which reconstructs a video signal based on the prediction video signal and the prediction error signal.

The coding apparatus further includes: a filter design unit which determines filter data items for filtering at least two of the prediction video signal, the prediction error signal, and the reconstructed video signal; and a filter data encoder which encodes the determined filter data items based on statistical relationships (cross correlations) between the filter data items of the at least two of the prediction video signal, the prediction error signal, and the reconstructed video signal.

According to still another aspect of the present invention, a decoding apparatus which decodes a coded video signal including at least one video frame is provided. The decoding apparatus includes: a predictor which predicts a video signal spatially or temporally; and a reconstructor which reconstructs a video signal based on the prediction video signal and a prediction error signal which can be obtained by the decoding apparatus, from the encoder side. The decoding apparatus further includes: a decoder which decodes the filter data items of at least two of the prediction video signal, the prediction error signal, and the reconstructed video signal, based on statistical relationships (cross correlations) between the filter data items; and a filter design unit which sets up a filter in accordance with each of the decoded filter data items, and filters the at least two of the prediction video signal, the prediction error signal, and the reconstructed video signal.

Preferably, the coding further involve quantization of the prediction error signal, wherein each of the filter data items is calculated as a Wiener filter based on the prediction video signal, the quantized prediction error signal, the reconstructed video signal, and a video signal input to the encoder. In general, the coding may further include any other kind of coding such as transform, color space conversion, etc. Each of the filter data items may not be limited to the Wiener filter, and the filter for use here may be designed in any other manner, for instance, by solving an optimization problem other than minimizing the mean squared error.

Preferably, the filter data be coded using at least one of predictive coding, transform coding, vector quantization and coding, and coding based on a Markov model and/or a state transition diagram. However, any other kind of coding may be used instead as long as the coding uses the statistical dependency relationships between the filter data items of the prediction signal(s) and/or of the quantized prediction error signal, and/or of the reconstructed signal. For example, it is possible to use a run-length coding, or a variable length coding that involves switching coding tables in accordance with previously coded data, or a joint entropy coding for coding, as a single codeword, a combination of filter data items of different video signals and/or color components.

In accordance with a preferred embodiment of the present invention, the filter data items of the prediction video signal, of the prediction error signal, and of the reconstructed video signal are coded using a predictive coding. In particular, the filter data item of the prediction video signal is predicted from the filter data item of the reconstructed video signal, and/or the filter data item of the quantized prediction error signal is predicted from the filter data item of the prediction video signal. The prediction may be performed, for example, by assuming that the filter data item of the prediction video signal and the filter data item of the prediction error signal are equivalent to each other. The prediction of a filter coefficient may also be performed, for example, by assuming that the sum of a filter coefficient of the prediction video signal and a filter coefficient of the reconstructed video signal are equal to a fixed value (such as 1). The coding is then performed by coding the difference between the filter data item and the prediction result. However, the prediction result of the filter data item of one of the above-listed signals may also be performed using a function of the filter data items of the remaining signals. For example, the filter data item of the reconstructed video signal may be predicted as a function of the filter data item of the prediction video signal and of the filter data item of the prediction error signal. Correspondingly, the decoder decodes the signals using the statistical relationships between the filter data items of the signals.

In particular, in the case of coding such filter data using a predictive coding, it is possible to perform a prediction adapted to the characteristics of the current filter data to be coded by signaling the prediction type. Similarly, the transform and the Markov model may be included in, for example, a sequence, a frame, or even a slice header, and be signaled from the encoder to the decoder side in an adaptive manner. In the case where vector quantization and associated coding of the vectors is used, the representative vectors may be included in, for example, a sequence, a frame, or even a slice header, and be signaled from the encoder to the decoder side in an adaptive manner.

Preferably, a filter data item be separately determined for each color component, and the filter data item of a first color component is coded based on a statistical relationship between the filter data item of the first color component and the filter data item of another color component. This allows utilization of the statistical relationship also between the color components of the filtered signals.

In particular, each of the filter data items includes at least one of a filter coefficient, a filter length, an offset, and the coding type of the filter data item, and a cross correlation between a video signal input to the encoder and at least one of the prediction signal, the prediction error signal, and the reconstructed video signal. It is also possible to transmit the cross correlation between the quantization noise and at least one of the prediction signal, the prediction error signal, and the reconstructed video signal. The cross correlation information may be used to determine the filter coefficient at the decoder. In general, any information may be signaled as the filter data item, as long as the information is available for determining the filter coefficient at the decoder side. Typically, it is preferable that such information be related to the original video signal input to the encoder or to the quantization noise, and be not known to the decoder side Preferably, the coding of the filter data item be performed with regard to the overall bit rate of the coded video signal. In particular, a lower rate is selected to code the filter data when an overall bit rate is lower, and a higher rate is selected to code the filter data when an overall bit rate is higher. The filter data item may include filter data quantization information. The filter data quantization information specifies the accuracy (precision) of at least one of an offset, a filter coefficient or a cross correlation between a video signal input to the encoder and at least one of the prediction signal, the prediction error signal, and the reconstructed video signal each of which is coded and included in the filter data item. The lower the precision, the coarser is the quantization of the data. Preferably, the filter data quantization information be coded using shorter codewords for filter data quantization information values specifying lower accuracy. This provides the advantageous effect of maintaining the overhead caused by signaling of the filter data lower for low-rate coded video data. The filter data quantization information may also be subjected to an adaptive coding in which the codeword table may be signaled or calculated based on information signaled within the bitstream.

According to an embodiment of the present invention, the filter data item related to a video signal area is included after the coded video signal area within the bitstream. This reduces memory requirements at the encoder, since it is not necessary to store at the encoder the coded video stream in order to attach a header with the relevant filter data item to the coded video stream.

According to an embodiment of the present invention, the filter data item related to a video signal area is included before the coded video signal area within the bit stream. This enables reduction of memory requirements at the decoder, since it is not necessary to store the entire coded/decoded video stream until the filter may be set up and applied.

Preferably, header information, the filter data item and macroblock data be coded using arithmetic codes in such a way that an individual codeword is provided for each of the header information, the filter data, and the macroblock data. Thus, the encoder and the corresponding decoder are restarted before coding each of the header information, the filter data, and the macroblock data. This allows separate handling of these different types of data. However, the header information, the filter data item, and the macroblock data may also be coded as a single codeword without restarting the encoder and decoder. Moreover, coding different from the arithmetic coding may also be employed.

A flag may be provided together with the coded filter data item in order to signal a signal for which the filter data item is coded from among the prediction signal, the prediction error signal, and the reconstructed video signal. Another flag may be provided in order to signal if an offset is coded.

Preferably, the video signal be coded and/or decoded based on the H.264/MPEG-4 AVC standard, and the filter data item is provided within the Supplemental Enhancement Information (SEI) message.

However, the present invention is not limited to the H.264/MPEG-4 AVC standard and its enhancements and followers, and may be used for any video coding mechanism that is standardized or proprietary.

According to another aspect of the present invention, a computer program product is provided which includes a computer-readable recording medium having embodied thereon a computer-readable program codes adapted to carry out the present invention.

According to another aspect of the present invention, a system is provided which is for transmission of a video signal from the encoder side to the decoder side. This system includes the aforementioned encoder, the channel for storing and transmitting the coded video signal, and the aforementioned decoder. According to an embodiment of the present invention, the channel corresponds to a storage medium such as a volatile or a non-volatile memory, an optical storage medium or a magnetic storage medium such as a CD, a DVD, a BD or a hard disc, a Flash memory, or any other storage means. In another embodiment of the present invention, the channel is a transmission medium. This can be configured with resources of a wireless system or a wired system, or any combination of the both in accordance with any standardized or proprietary transmission technology/system such as the Internet, WLAN, UMTS, ISDN, xDSL, etc The above and other objects and features of the present invention will become more apparent from the following descriptions and preferred embodiments given in conjunction with the accompanying drawings.

A video coding method and a video decoding method according to the present invention enable reduction in the decrease in the efficiency of coding a video to be decoded and enhancement in the image quality of the video to be decoded.

BRIEF DESCRIPTION OF DRAWINGS

FIG. 8A is a flowchart of processing operations performed by the video decoding apparatus according to the embodiment.

FIG. 8B is a flowchart showing detailed coding processing operations performed on coded filter data according to the embodiment.

FIG. 12A is a diagram showing a syntax of a sequence header according to the embodiment.

FIG. 12B is a diagram showing a syntax of a frame according to the embodiment.

FIG. 13A is a diagram showing a syntax of decode_post_filter[c] according to the embodiment.

FIG. 13B is a diagram showing another syntax of decode_post_filter[c] according to the embodiment.

FIG. 14 is a diagram showing relationships between the values of filter_hint_type[c] and the types of filter hints according to the embodiment.

FIG. 15 is a diagram showing the correlation relationships between filter_precision[c] and Wiener_Filter_Precision[c] according to the embodiment.

FIG. 16 is a diagram showing unary codes which are allocated to filter_precision[c] (Wiener_Filter_Precision[c]) according to the embodiment.

FIG. 17 is a diagram showing an example of Golomb codes which are allocated to filter_precision[c] (Wiener_Filter_Precision[c]) according to the embodiment.

FIG. 18 is a diagram showing another example of Golomb codes which are allocated to filter_precision[c] (Wiener_Filter_Precision[c]) according to the embodiment.

FIG. 19 is a diagram showing fixed length codes which are allocated to filter_precision[c] (Wiener_Filter_Precision[c]) according to the embodiment.

FIG. 20A is a diagram showing an expression for calculating the filter coefficients for a reconstructed video signal according to the embodiment.

FIG. 20B is a diagram showing an expression for calculating the filter coefficients for a prediction signal according to the embodiment.

FIG. 20C is a diagram showing an expression for calculating the filter coefficients for a quantized prediction error signal according to the embodiment.

FIG. 21 is a diagram showing an expression for calculating a decoded video signal according to the embodiment.

FIG. 22A is a diagram showing a calculation expression for normalization and clipping according to the embodiment.

FIG. 22B is a diagram showing a calculation expression for the normalization and clipping according to the embodiment.

FIG. 23A is a diagram showing an expression for calculating the filter coefficient at the center position of the prediction signal according to the embodiment.

FIG. 23B is a diagram showing an expression for calculating filter coefficients at the portions other than the center position of the prediction signal according to the embodiment.

FIG. 23C is a diagram showing an expression for calculating the filter coefficients for the quantized prediction error signal according to the embodiment.

FIG. 24A is a diagram showing an expression for calculating the filter coefficients for the reconstructed video signal according to the embodiment.

FIG. 24B is a diagram showing an expression for calculating the filter coefficients for the prediction signal according to the embodiment.

FIG. 24C is a diagram showing an expression for calculating the filter coefficients for the quantized prediction error signal according to the embodiment.

FIG. 25 is a diagram showing horizontal filtering according to the embodiment.

FIG. 26 is a diagram showing a calculation expression for normalization and clipping on a horizontally filtered signal according to the embodiment.

FIG. 27 is a diagram showing vertical filtering according to the embodiment.

FIG. 28 is a diagram showing a calculation expression for normalization and clipping on a horizontally and vertically filtered signal according to the embodiment.

FIG. 29A is a diagram showing an expression for calculating elements in a cross correlation matrix corresponding to the reconstructed video signal according to the embodiment.

FIG. 29B is a diagram showing an expression for calculating elements in a cross correlation matrix corresponding to the prediction signal according to the embodiment.

FIG. 29C is a diagram showing an expression for calculating elements in a cross correlation matrix corresponding to the quantized prediction error signal according to the embodiment.

FIG. 30A is a diagram showing an expression for calculating elements of horizontal cross correlation motion vectors corresponding to the reconstructed video signal according to the embodiment.

FIG. 30B is a diagram showing an expression for calculating elements of vertical cross correlation motion vectors corresponding to the reconstructed video signal according to the embodiment.

FIG. 30C is a diagram showing an expression for calculating elements of horizontal cross correlation motion vectors corresponding to the prediction signal according to the embodiment.

FIG. 30D is a diagram showing an expression for calculating elements of vertical cross correlation motion vectors corresponding to the prediction signal according to the embodiment.

FIG. 30E is a diagram showing an expression for calculating elements of horizontal cross correlation motion vectors corresponding to the quantized prediction error signal according to the embodiment.

FIG. 30F is a diagram showing an expression for calculating elements of vertical cross correlation motion vectors corresponding to the quantized prediction error signal according to the embodiment.

DETAILED DESCRIPTION OF INVENTION

According to the present invention, in order to design a filter condition either in the spatial domain or in the frequency domain, a prediction signal, a prediction error signal, and a reconstructed video signal may be considered. This makes it possible to individually consider noise for each of these three signals. A filter data item is determined for each of at least two of the signals and coded using the cross correlation between the filter data items of the at least two signals.

In this way, the present invention provides an efficient filtering approach, and thereby enhancing the quality of the filtered data while reducing the amount of data required to transmit a coded video stream. In other words, it is possible to enhance the image quality of the resulting decoded video by reducing the decrease in the coding efficiency.

Hereinafter, embodiments of the present invention will be described.

Embodiment 1

Figure 5:
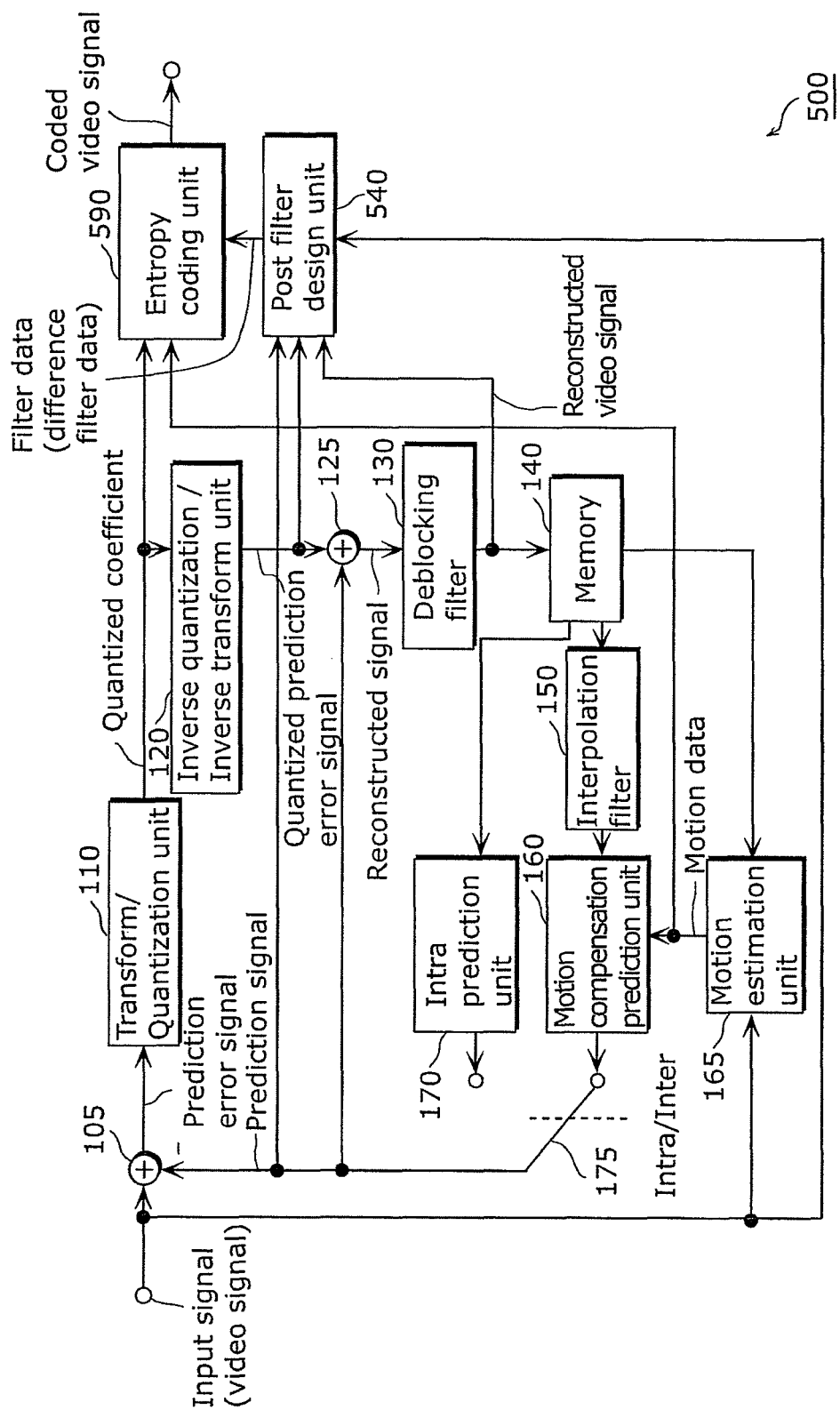
FIG. 5 is a block diagram of a video coding apparatus according to an embodiment of the present invention.

FIG. 5 is a block diagram of a video coding apparatus 500 which is an exemplary encoder in this embodiment and compliant with the H.264/MPEG4 AVC.

The video coding apparatus 500 according to this embodiment includes: a subtractor 105, a transform/quantization unit 110, an inverse quantization/inverse transform unit 120, an adder 125, a deblocking filter 130, a memory 140, an interpolation filter 150, a motion compensation prediction unit 160, a motion estimation unit 165, an intra prediction unit 170, an intra/inter switch 175, a post filter design unit 540, and an entropy coding unit 590. The video coding apparatus 500 according to this embodiment is characterized by processing operations performed by the post filter design unit 540.

The subtractor 105 subtracts a prediction signal from an input video signal to generate a prediction error signal.

The transform/quantization unit 110 performs an orthogonal transform such as DCT and quantization on the prediction error signal generated by the subtractor 105 to generate quantized coefficients.

The inverse quantization/inverse transform unit 120 performs inverse quantization on the quantized coefficients generated by the transform/quantization unit 110 and performs an inverse orthogonal transform such as inverse DCT, to generate a quantized prediction error signal.

The adder 125 adds the prediction signal to the quantized prediction error signal corresponding to the prediction signal to generate a reconstructed signal.

The deblocking filter 130 removes block distortion included in an image represented by the reconstructed signal, and stores, in the memory 140, the reconstructed signal without the block distortion. In this embodiment, the adder 125 and the deblocking filter 130 make up a reconstruction unit.

The interpolation filter 150 reads out a reference image shown by the reconstructed video signal stored in the memory 140, and interpolates sub-pixels in the reference image.

The intra prediction unit 170 performs intra prediction to generate a prediction image for a current block to be coded, and outputs the prediction signal representing the prediction image.

The motion estimation unit 165 refers to the reference image represented by the reconstructed video signal stored in the memory 140, and estimates a motion vector for a block included in the video signal. Next, the motion estimation unit 165 outputs the motion vector as motion data to the motion compensation prediction unit 160 and the entropy coding unit 590.

The motion compensation prediction unit 160 performs motion compensation using the reference image with sub-pixels interpolated by the interpolation filter 150 and the motion data output by the motion estimation unit 165. In this way, the motion compensation prediction unit 160 performs intra prediction to generate the prediction image for the current block to be coded, and outputs the prediction signal representing the prediction image.

Depending on the coding type of the current block to be coded, the intra/inter switch 175 switches between the prediction signal generated by the intra prediction unit 170 and the prediction signal generated by the motion compensation prediction unit 160, and outputs the resulting prediction signal to the subtractor 105 and the adder 125. For example, when the current block to be coded is intra prediction coded, the intra/inter switch 175 outputs the prediction signal generated by the intra prediction unit 170 to the subtractor 105 and the adder 125. On the other hand, when the current block to be coded is inter prediction coded, the intra/inter switch 175 outputs the prediction signal generated by the motion compensation prediction unit 160 to the subtractor 105 and the adder 125.

The post filter design unit 540 designs filter conditions such as filter coefficients for the post filtering. In other words, the post filter design unit 540 calculates filter coefficients for the reconstructed video signal, the prediction signal, and the quantized prediction error signal, based on the video signal that is the input signal, the reconstructed video signal, the prediction signal, and the quantized prediction error signal. Next, the post filter design unit 540 generates filter hints which enable recovery of the filter coefficients at the decoder side, based on cross correlations between the filter coefficients, and outputs new filter data items (difference filter data items) including the filter hints to the entropy coding unit 590. In other words, the post filter design unit 540 determines filter data items including the filter coefficients for the reconstructed video signal, the prediction signal, and the quantized prediction error signal, and generates the filter hints (difference filter data items) based on the cross correlations between the filter data items. It is to be noted that the aforementioned filter hints are generated for each of the reconstructed video signal, the prediction signal, and the quantized prediction error signal, and thus that the filter hints may be the raw filter coefficients or may be data items resulting from the filter coefficients. In addition, the filter data items may be any other information such as cross correlation vectors.

The entropy coding unit 590 performs entropy coding (such as arithmetic coding) on the difference filter data items together with the quantized coefficients and the motion data, and outputs a coded video signal including the entropy-coded difference filter data items. It is to be noted that, in this embodiment, the functional part which determines filter data items of the post filter design unit 540 is configured as a determination unit, and the functional part which generates filter hints (difference filter data items) of the post filter design unit 540 and the entropy coding unit 590 are configured as a coding unit.

For example, the post filtering design unit 540 calculates such filter coefficients that minimize the mean squared error between a desired signal s that is an input signal and a filtered signal s'.

[Math. 1]

$$s' = \sum_{i=1}^{M} w_i \cdot p_i + \sum_{i=1}^{N} w_{M+i} \cdot e_i + \sum_{i=1}^{O} w_{M+N+i} \cdot r_i + w_{M+N+O+1} \quad \text{Expression 1}$$

In the above Expression 1, $w_1, \ldots, w_M$ are M number of filter coefficients for post filtering, and are applied to $p_1, \ldots, p_M$ which are M number of prediction samples (prediction signals). In addition, $w_{M+1}, \ldots, w_{M+N}$ are N number of filter coefficients for post filtering, and are applied to $e_1, \ldots, e_N$ which are N number of quantized prediction error samples (quantized prediction error signals). Furthermore, $w_{M+N+1}, \ldots, w_{M+N+O}$ are O number of filter coefficients for post filtering, and are applied to $r_1, \ldots, r_O$ which are O number of reconstructed video samples (reconstructed video signals). $w_{M+N+O+1}$ is an offset.

Figure 1:
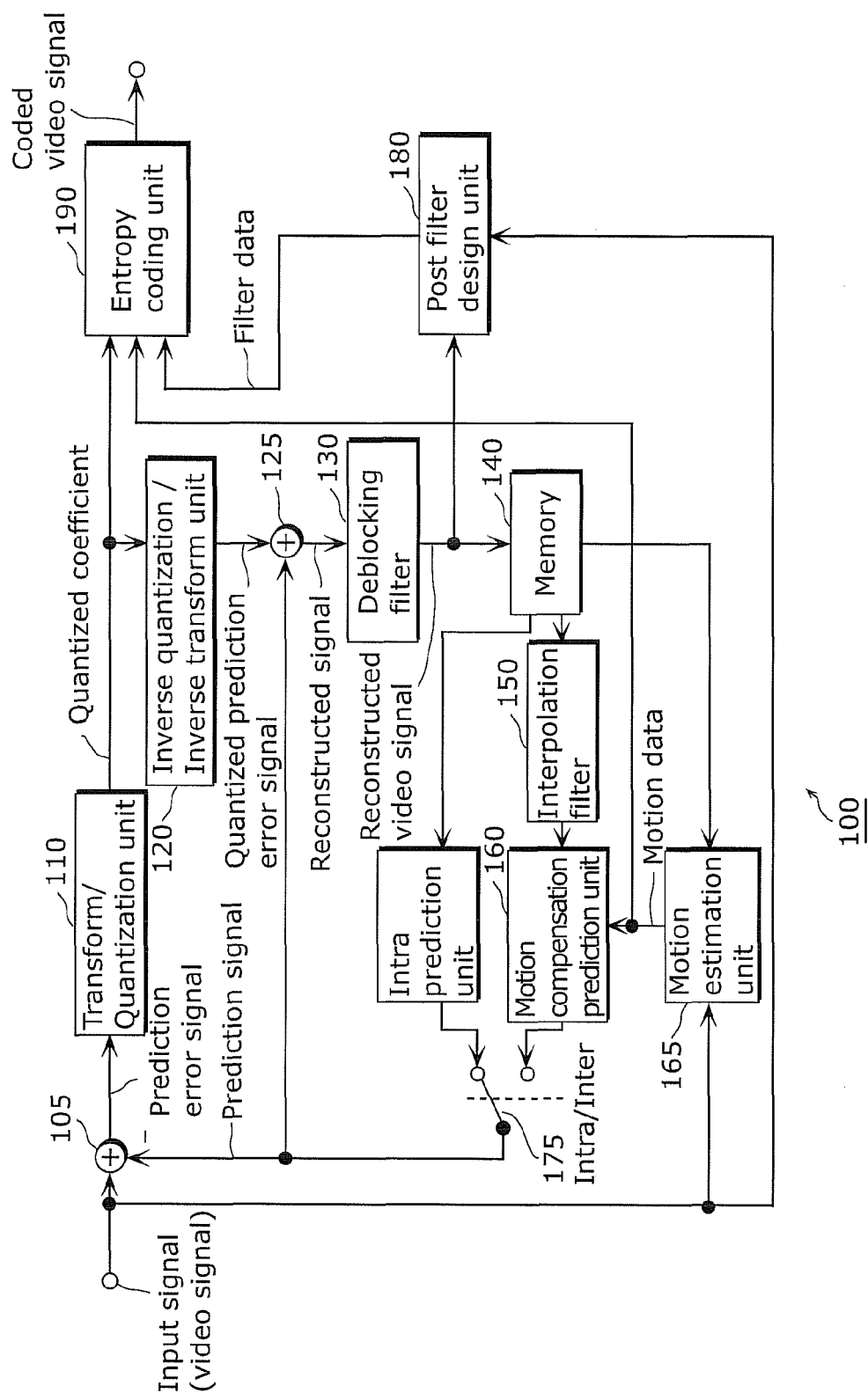
FIG. 1 is a block diagram showing a video coding apparatus which complies with the conventional H.264/MPEG-4 AVC.
Figure 2:
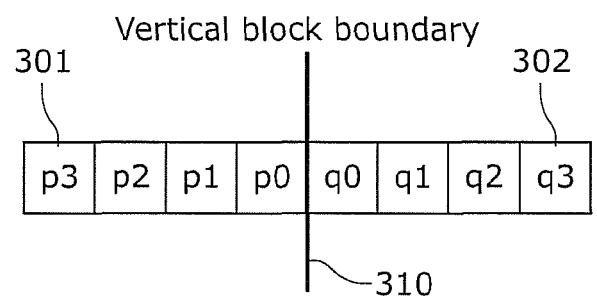
FIG. 2 is a schematic diagram showing deblocking filtering at a vertical boundary between two blocks.
Figure 3:
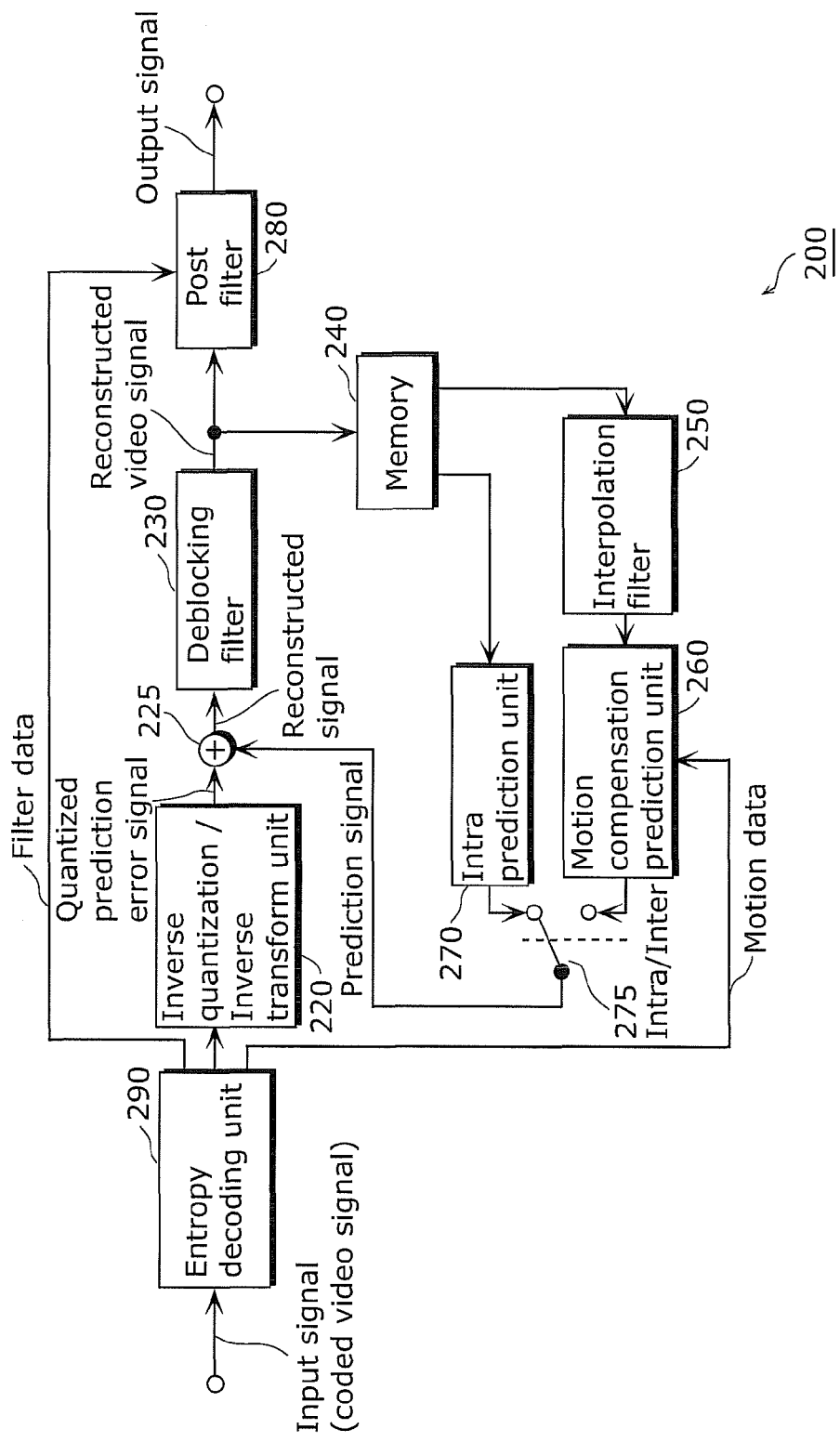
FIG. 3 is a block diagram showing a video decoding apparatus which complies with the conventional H.264/MPEG-4 AVC.
Figure 4:
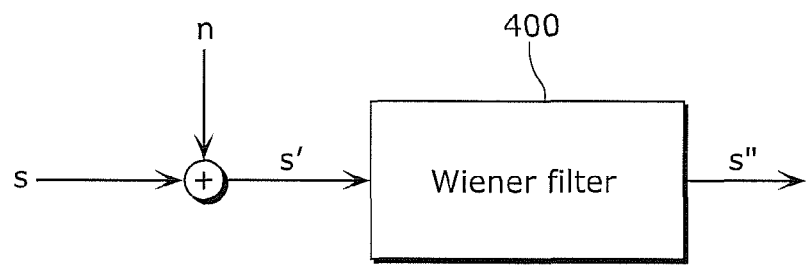
FIG. 4 is a schematic diagram showing a transmission system including a Wiener filter.

As described in connection with FIG. 4, the filter coefficients that minimize the mean squared error between the desired signal s and the filtered signal s' may be determined by solving a Wiener-Hopf equation.

Figure 6A:
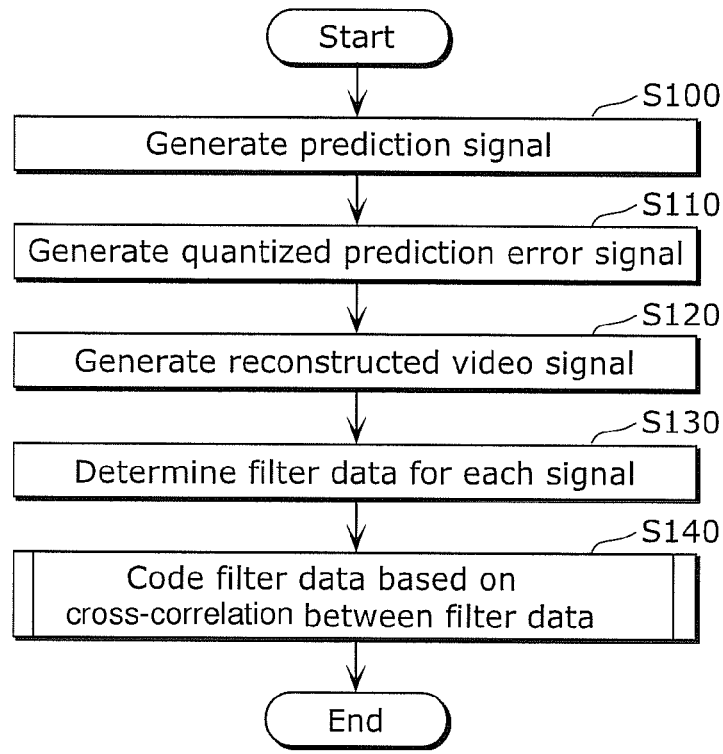
FIG. 6A is a flowchart of processing operations performed by the video coding apparatus according to the embodiment.

FIG. 6A is a flowchart of processing operations performed by the video coding apparatus 500 according to this embodiment.

The intra prediction unit 170 or the motion compensation prediction unit 160 of the video coding apparatus 500 generates a prediction signal (Step S100). Next, the subtractor 105 subtracts the prediction signal from the video signal to generate a prediction error signal. The transform/quantization unit 110 and the inverse quantization/inverse transform unit 120 perform quantization and inverse quantization on the prediction error signal to generate a quantized prediction error signal (Step S110). Further, the adder 125 adds the quantized prediction error signal to the prediction signal to generate a reconstructed signal. The deblocking filter 130 removes block distortion from the reconstructed signal to generate a reconstructed video signal (Step S120).

The post filter design unit 540 determines a filter data item for each of the signals generated in Steps S100, S110, and S120 (Step S130). At this time, the post filter design unit 540 performs calculation based on the above Expression 1 to determine such filter coefficients that minimize the mean squared error. In other words, the post filter design unit 540 determines the filter data items including the filter coefficients such that an image (decoded image) closer to an image represented by the video signal is generated, than images represented by the respective prediction signal, quantized prediction error signal, and reconstructed video signal. Subsequently, the post filter design unit 540 and the entropy coding unit 590 code the determined filter data items, based on the cross correlations between the determined filter data items (Step S140).

Figure 6B:
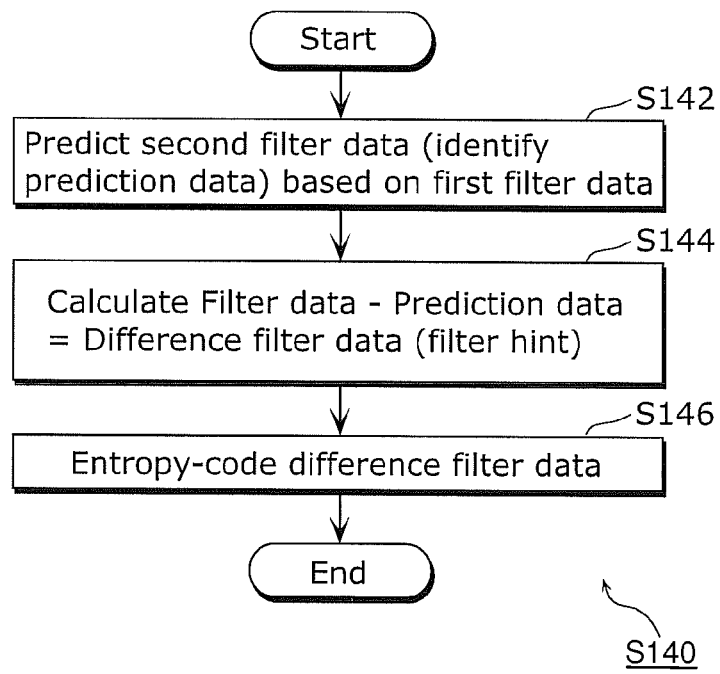
FIG. 6B is a flowchart showing detailed coding processing operations performed on filter data according to the embodiment.

FIG. 6B is a flowchart showing detailed coding processing operations performed on a filter data item (Step S140).

The post filter design unit 540 identifies prediction data of a second filter data item by predicting the second filter data item based on first filter data item among the determined two filter data items (Step S142). Next, the post filter design unit 540 calculates the difference filter data item (filter hint) by calculating the difference between the second filter data item and the prediction data (Step S144). Subsequently, the entropy coding unit 590 entropy-codes the difference filter data item (Step S146). In this way, the second filter data item is coded by the difference calculation and the entropy coding. In other words, the coded filter data item is generated.

It is to be noted that, typically, a filter data item is a filter coefficient, a difference filter data item indicates the difference between two filter coefficients, and the difference filter coefficient is handled as a filter hint. In addition, typically, the aforementioned prediction data item is a first filter data item that is a raw filter coefficient.

More specifically, the post filter design unit 540 determines, in Step S120, a filter coefficient corresponding to the reconstructed video signal, a filter coefficient corresponding to the prediction signal, and a filter coefficient corresponding to the quantized prediction error signal. Subsequently, the post filter design unit 540 identifies, in Step S142, the prediction data (a prediction filter coefficient) corresponding to the prediction signal by predicting the filter coefficient corresponding to the prediction signal based on the filter coefficient corresponding to the reconstructed video signal. Next, in Steps S144 and S146, the post filter design unit 540 calculates the difference between the filter coefficient corresponding to the prediction signal and the prediction filter coefficient, and entropy-codes the difference. In this way, the post filter design unit 540 codes the filter coefficient corresponding to the prediction signal. In addition, in Step S142, the post filter design unit 540 identifies, for example, the filter coefficient corresponding to the reconstructed video signal as the prediction filter coefficient.

In addition, the post filter design unit 540 may quantize the filter coefficients (filter data items) determined in Step 130 of the prediction signal, the quantized prediction error signal, and the reconstructed video signal, and calculate the difference filter coefficient based on the quantized filter coefficients. Alternatively, the post filter design unit 540 may calculate the difference filter coefficient and quantize the difference filter coefficient without quantizing the filter coefficients. Alternatively, the post filter design unit 540 may quantize only the filter coefficient(s) corresponding to one or two of the prediction signal, the quantized prediction error signal, and the reconstructed video signal. When such quantization is performed, the post filter design unit 540 include, in the difference filter data item, information (filter_precision [c]) indicating the quantization precision (Wiener_Filter_precision[c]).

Alternatively, the post filter design unit 540 may determine, for each color component, a corresponding one of the filter coefficients when determining the filter coefficients, and code the filter coefficient for a first color component (for example, a color component corresponding to c=1), based on the cross correlation between the filter coefficient for the first color component and the filter coefficient for a second color component (for example, a color component corresponding to c=2).

Figure 7:
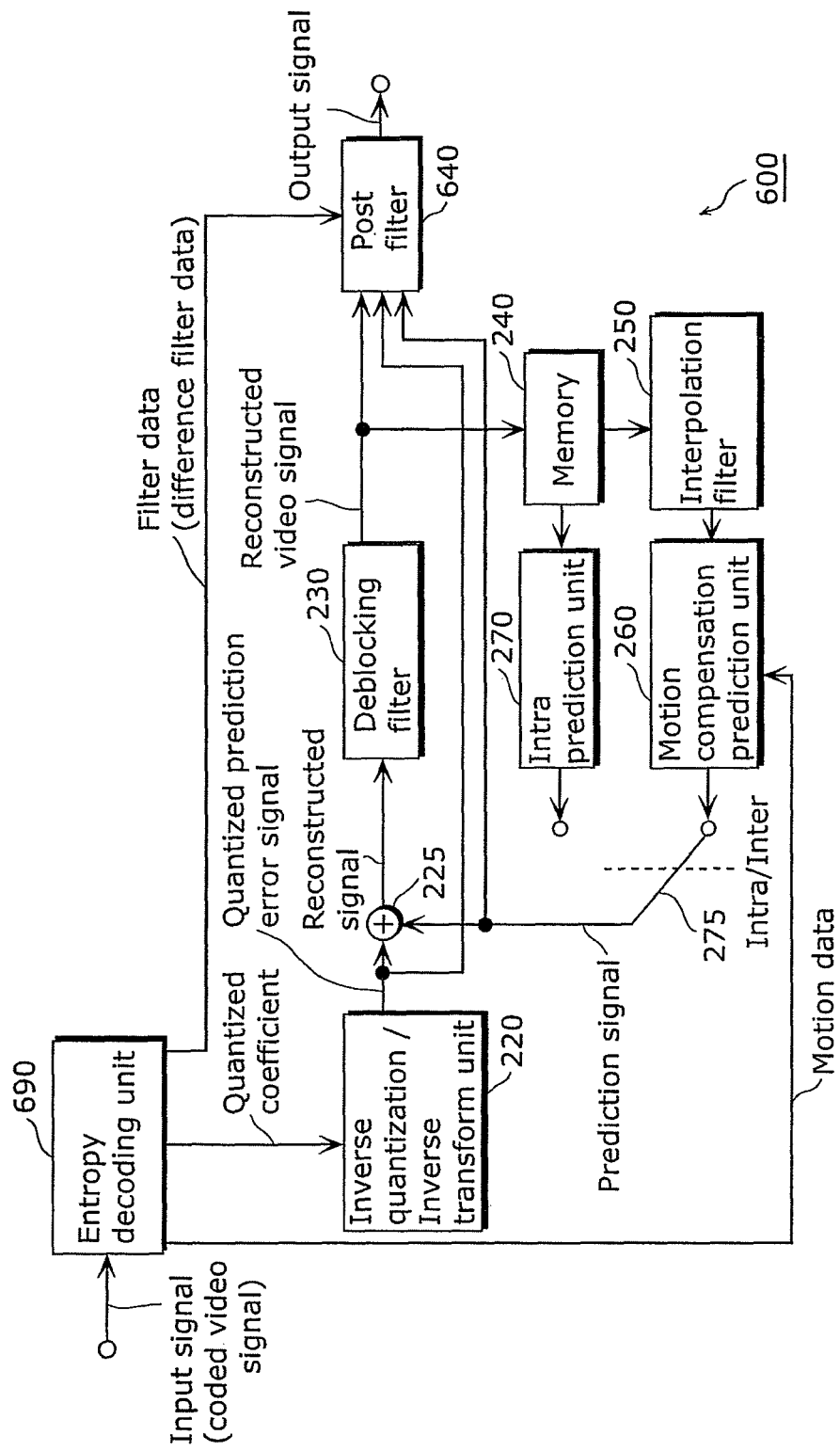
FIG. 7 is a block diagram of a video decoding apparatus according to the embodiment.

FIG. 7 is a block diagram of a video decoding apparatus 600 that is a decoder according to this embodiment.

The video decoding apparatus 600 according to this embodiment obtains, as an input signal, a coded video signal that is an output signal from the video coding apparatus 500, and decodes the input signal. The video decoding apparatus 600 includes an entropy decoding unit 600, an inverse quantization/inverse transform unit 220, an adder 225, a deblocking filter 230, a memory 240, an interpolation filter 250, an intra prediction unit 270, an intra/inter switch 275, a motion compensation prediction unit 260, and a post filter 640. The video decoding apparatus 600 according to this embodiment is characterized by the post filter 640.

The entropy decoding unit 690 performs entropy decoding (such as arithmetic decoding) on the input coded video signal, and outputs the motion data, the quantized coefficients, and the filter data item (difference filter data item) to the motion compensation prediction unit 260, the inverse quantization/inverse transform unit 220, and the post filter 640, respectively. At this time, the coded filter data items included in the coded video signal are entropy-decoded, and one of the coded filter data items is transformed into the difference filter data item.

The inverse quantization/inverse transform unit 220 performs inverse quantization on the quantized coefficients output from the entropy decoding unit 690 and performs an inverse orthogonal transform such as inverse DCT, to generate a quantized prediction error signal. In this embodiment, the entropy decoding unit 690 and the inverse quantization/inverse transform unit 220 make up a prediction error signal generation unit. In addition, the entropy decoding unit 690 includes an obtainment unit.

The adder 225 adds the prediction signal corresponding to the quantized prediction error signal to the quantized prediction error signal generated by the inverse quantization/inverse transform unit 220, to generate a reconstructed signal.

The deblocking filter 230 removes block distortion included in an image represented by the reconstructed signal, and stores, in the memory 240, the reconstructed signal without the block distortion. In this embodiment, the adder 225 and the deblocking filter 230 make up a reconstruction unit.

The interpolation filter 250 reads out a reference image shown by the reconstructed video signal stored in the memory 240, and interpolates sub-pixels in the reference image.

The intra prediction unit 270 performs intra prediction to generate a prediction image for a current block to be coded, and outputs the prediction signal representing the prediction image.

The motion compensation prediction unit 260 performs motion compensation using the reference image with sub-pixels interpolated by the interpolation filter 250 and the motion data output by the entropy decoding unit 690. In this way, the motion compensation prediction unit 260 performs intra prediction to generate the prediction image for the current block to be coded, and outputs the prediction signal representing the prediction image.

Depending on the coding type of the current block to be coded, the intra/inter switch 275 switches between the prediction signal generated by the intra prediction unit 270 and the prediction signal generated by the motion compensation prediction unit 260, and outputs the resulting prediction signal to the adder 225. For example, when the current block to be coded is intra prediction coded, the intra/inter switch 275 outputs the prediction signal generated by the intra prediction unit 270 to the adder 225. On the other hand, when the current block to be coded is inter prediction coded, the intra/inter switch 275 outputs the prediction signal generated by the motion compensation prediction unit 260 to the adder 225.

The post filter 640 obtains the filter data item (difference filter data item) from the entropy decoding unit 690, and sets up the filter condition such as a filter coefficient, based on the difference filter data item. This difference filter data item includes a filter hint for reconstructing the filter coefficient to be applied to each of the quantized prediction error signal, the prediction signal, and the reconstructed video signal. In other words, the post filter 640 recovers, from the filter hint, the filter coefficient to be applied to each of the quantized prediction error signal, the prediction signal, and the reconstructed video signal, based on the cross correlations between the filter data items (filter coefficients). Furthermore, the post filter 640 generates a decoded video signal representing a decoded image by post filtering, that is, applying the recovered filter coefficient to each of the quantized prediction error signal, the prediction signal, and the reconstructed video signal, and outputs the decode video signal as an output signal.

In this embodiment, the functional part which performs entropy decoding of the entropy decoding unit 690 and the functional part which recovers the filter coefficients for the post filter 640 are configured as a filter data decoding unit. Furthermore, the functional part which performs filtering of the post filter 640 is configured as a filter.

FIG. 8A is a flowchart of processing operations performed by the video coding apparatus 600 according to this embodiment.

The entropy decoding unit 690 of the video decoding apparatus 700 entropy-decodes the coded video signal to generate quantized coefficients. The inverse quantization/inverse transform unit 220 performs inverse quantization and inverse orthogonal transform on the quantized coefficients to generate a quantized prediction error signal (Step S200). Next, the intra prediction unit 270 or the motion compensation prediction unit 260 generates a prediction signal (Step S210). Further, the adder 225 adds the prediction signal to the quantized prediction error signal to generate a reconstructed signal. The deblocking filter removes block distortion from the reconstructed signal to generate a reconstructed video signal (Step S220).

Furthermore, the entropy decoding unit 690 obtains, from the coded video signal, coded filter data item for each of the quantized prediction error signal, the prediction signal, and the reconstructed video signal (Step S230). The entropy decoding unit 690 and the post filter 640 decode these coded filter data items, based on the cross correlations between the filter data items (Step S240).

Next, the post filter 640 performs filtering by applying the filter data items to the quantized prediction error signal, the prediction signal, and the reconstructed video signal, and outputs a decoded video signal that is an output signal (Step S260).

FIG. 8B is a flowchart showing detailed decoding processing operations performed on coded filter data items (Step S240).

The entropy decoding unit 690 entropy-decodes the coded filter data item to obtain a difference filter data item (a filter hint) corresponding to any one of the quantized prediction error signal, the prediction signal, and the reconstructed video signal, and outputs the difference filter data item to the post filter 640 (Step S242).

Upon receiving the difference filter data item, the post filter 640 predicts the original filter data item (typically, a filter coefficient) corresponding to the difference filter data item (Step S244). At this time, the post filter 640 predicts the original filter data item corresponding to the aforementioned difference filter data item, using another filter data item (typically, a filter coefficient) already calculated. In this way, the prediction data is identified. Next, the post filter 640 adds the prediction data to the difference filter data item (the filter hint) to calculate the original filter data item corresponding to the difference filter data item (Step S246). In this way, the coded filter data item is decoded by the entropy decoding and addition on the coded filter data item. The aforementioned prediction data is typically another already calculated filter data item, that is, another raw filter coefficient.

In addition, in the case where the difference filter data item includes information (filter_precision[c] indicating the quantization precision (Wiener_Filter_Precision[c])), the post filter 640 inversely quantizes the filter coefficient or the difference filter coefficient for each of the prediction signal, the quantized prediction error signal, and the reconstructed video signal, according to the precision indicated by the information.

In addition, filter design and/or application may be advantageously performed in the frequency domain. Designing a filter for filtering the video signal in the frequency domain is especially advantageous in the case where the noise is added also in the frequency domain. This is the case for the majority of today's video coding methods that quantize and transmit/store video signals transformed into the frequency domain.

Figure 9:
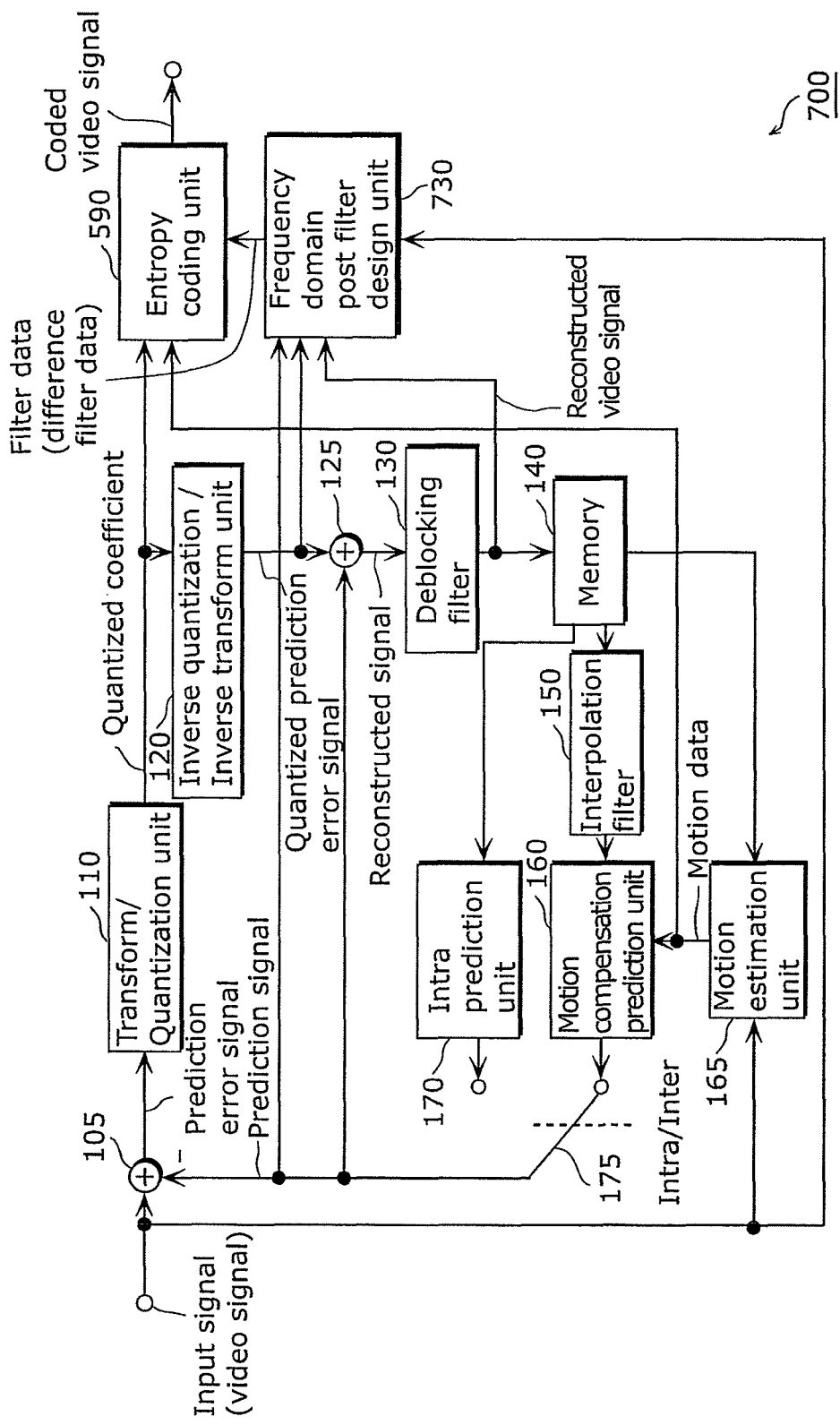
FIG. 9 is a block diagram of the video coding apparatus which performs filter design in a frequency domain according to the embodiment.

FIG. 9 is a block diagram of a video coding apparatus 700 which performs filter design in a frequency domain.

The video coding apparatus 700 is an encoder that includes a frequency domain post filter design unit 730 instead of the post filter design unit 540 of the video coding apparatus 500. The frequency domain post filter design unit 730 designs filter conditions for post filtering in the frequency domain. More specifically, the frequency domain post filter design unit 730 performs an orthogonal transform on the video signal, the prediction signal, the quantized prediction error signal, and the reconstructed video signal. In this way, the respective signals are transformed from spatial domain to frequency domain. Furthermore, the frequency domain post filter design unit 730 determines filter coefficients based on the respective signals in the frequency domain, and calculates filter hints based on the filter coefficients, in the same manner as the processing by the post filter design unit 540. Next, the frequency domain post filter design unit 730 outputs the difference filter data item including the filter hint to the entropy coding unit 590.

Figure 10:
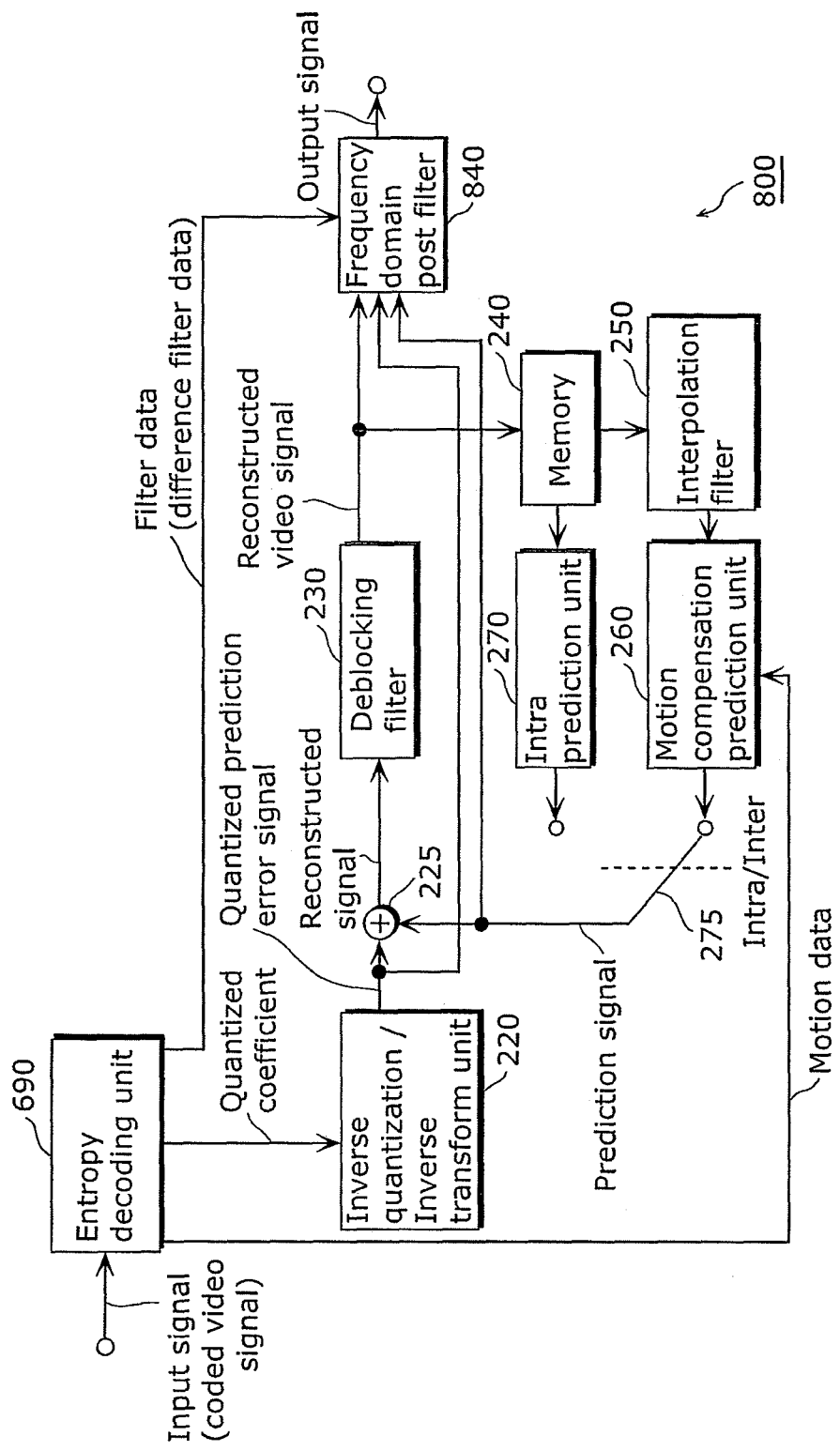
FIG. 10 is a block diagram of the video decoding apparatus which performs filtering in the frequency domain according to the embodiment.

FIG. 10 is a block diagram of the video decoding apparatus which performs filtering in the frequency domain.

The video decoding apparatus 800 is a decoder that includes a frequency domain post filter 840 instead of the post filter 640 of the video decoding apparatus 600. The frequency domain post filter 840 obtains a difference filter data item from the entropy decoding unit 690, and sets up a filter condition such as a filter coefficient, based on the difference filter data item, as performed by the post filter 640. Furthermore, the frequency domain post filter 840 obtains the prediction signal, the quantized prediction error signal, and the reconstructed video signal, and performs an orthogonal transform on these signals. In this way, the respective signals are transformed from spatial domain to frequency domain. Next, the frequency domain post filter 840 applies the filter coefficients respectively set up for the quantized prediction error signal, the prediction signal, and the reconstructed video signal represented in the frequency domain, to generate a decoded video signal represented in the frequency domain. Next, the frequency domain post filter 840 performs an inverse orthogonal transform on the decoded video signal. In this way, the decoded video signal is transformed from frequency domain to spatial domain. The frequency domain post filter 840 outputs, as an output signal, the decoded video signal represented in the frequency domain.

It is to be noted that the filter conditions set up by the frequency domain post filter 840 may be identical or similar to the filter conditions set up by the frequency domain post filter design unit 730.

For example, the prediction signal, the quantized prediction error signal, and the reconstructed image signal are transformed into the frequency domain prior to filter condition design or filtering. For each of the signals, K number of filter coefficients are determined. A filter coefficient is applied to each signal in the frequency domain when filtering is performed. For example, in general, the minimum mean squared error between a desired coefficient $c_K$ that is the frequency coefficient of the input signal and the filtered frequency coefficient $c_K'$ may be used as the optimization criterion for the design of the filter condition. The filtered frequency coefficient $c_K'$ is calculated according to the following Expression 2.

[Math. 2]

$$c_k' = \sum_{i=1}^{M} w_{k,i} \cdot c_{k,p,i} + \sum_{i=1}^{N} w_{k,M+i} \cdot c_{k,e,i} + \sum_{i=1}^{O} w_{k,M+N+i} \cdot c_{k,r,i} + w_{k,M+N+O+1}$$

$$\forall k = 1, \ldots, K$$

Expression 2

In the above Expression 2, $w_{K,1}, \ldots, w_{K,M}$ are M number of filter coefficients for post filtering, and are applied to $c_{k,p,1}, \ldots, c_{k,p,M}$ which are M number of frequency coefficients of prediction signals. In addition, $w_{k,M+1}, \ldots w_{k,M+N}$ are N number of filter coefficients for post filtering, and are applied to $c_{k,e,1}, \ldots, c_{k,e,N}$ which are N number of frequency coefficients of the quantized prediction error signal. Furthermore, $w_{k,M+N+1}, \ldots w_{k,M+N+o}$ are O number of filter coefficients for post filtering, and are applied to $c_{k,r,1}, \ldots, c_{k,r,o}$ which are O number of frequency coefficients of the reconstructed video signal. $W_{K,M+N+O+1}$ is an offset.

Here, the filter coefficients which minimize the mean squared error between the desired frequency coefficient $c_k$ and the filtered frequency coefficient $c_k'$ can be calculated by applying the Wiener-Hopf equation.

The filter coefficients and the offsets need to be coded and transmitted to the decoder. Alternatively, information necessary for calculating the filter coefficients and/or the offsets at the decoder may be provided to the decoder side. Preferably, such information be somehow related to the original video signal input to the encoder, and be not available at the decoder side. For example, the cross correlation between the original video signal and at least one of the prediction signal, the (quantized) prediction error signal, and the reconstructed signal is included within one of the filter data items. In addition, the cross correlation between the quantized error signal and at least one of the prediction video signal, the (quantized) prediction error signal, and the reconstructed video signal may be included within one of the filter data items.

Providing the filter data items for smaller parts of a video sequence (coded video signal) such as several number of pictures, a GOP (Group of Pictures), a frame, a slice, or a block, may enhance the quality of the filtered signal. On the other side, however, such provision of the filter data items increases the bandwidth required to embed such filter data items into the coded video signal (bitstream).

Thus, the present invention provides an efficient coding scheme for the filter data items (such as the filter coefficients and the offsets) that are necessary in various different filtering schemes such as those described above, in which filter coefficients are transmitted for the prediction signal, for the quantized prediction error signal, and for the reconstructed video signal. In order to achieve a high coding efficiency, this coding scheme utilizes statistical dependency relationships between the coefficients and the offsets to be coded and transmitted.

The present invention may also be applied to other filtering schemes. For example, it is not always necessary to consider all of the three signals that are the prediction signal, the quantized prediction error signal, and the reconstructed signal. According to the differential pulse code modulation scheme that is applied to a video signal to be coded, a prediction signal and a prediction error signal are computed from the video signal. Next, a first filter data item may be determined based on statistical characteristics of the prediction signal, and a second filter data item is computed based on statistical characteristics of the prediction error signal. For determining the respective filter data items, a Wiener filter, or any other method may be used. Both the first filter data item and the second filter data item are then coded by using their mutual statistical characteristics.

Moreover, other signals belonging to different color components may be considered separately.

The filter data items may include filter coefficients and offsets. However, it may include also a filter length or other data. Instead of signaling the filter coefficients, it is also good to signal the information necessary for calculating the filter coefficients. Examples of such information include the cross correlation between the original video signal input to the encoder and any one of the video signals to be filtered. This allows the decoder side to calculate the filter coefficients.

The filtering may be post filtering, but the filtering may not always be post filtering. The present invention may be applied to an interpolation filter and/or to a deblocking filter.

In addition, the present invention can be applied to a prediction filter to be applied to the integer pixel positions of a reference frame. Moreover, the filter data items of, for example, the prediction error signal may be used to design a plurality of filters (for instance, for the post filtering and the interpolation filter). In such cases, statistical dependency relationships between the filter data items of different filters may also be utilized for the coding.

In order to achieve higher coding efficiency of the filter data coding, statistical dependency relationships between the filter data items (such as the filter coefficients and/or the offsets) of the filtered signals are utilized in the coding of the filter data items. This is achieved by employing various coding techniques as indicated below.
  coding using prediction of filter data,
  transform coding of filter data,
  coding of filter data using a Markov model, and/or
  vector quantization and joint entropy coding
These coding techniques are described in the following example relating to filtering in the spatial domain in which filter data items are composed of filter coefficients and offsets.

In order to utilize statistical dependency relationships between the filter coefficients and the offsets of the filtered signals, predictive coding according to an embodiment of the present invention is applied. According to this, filter coefficients $w_1, \ldots, W_{M+N+O+1}$ are predicted as represented by the following Expression 3.

[Math. 3]

$$\hat{w}_1, \ldots, \hat{w}_{M+N+O+1}$$

Expression 3

The above Expression 3 shows prediction filter coefficients. The difference filter coefficients $ew_1, \ldots, ew_{M+N+O+1}$ are coded which are the remaining prediction error and correspond to the differences between the filter coefficients and the prediction filter coefficients. In general, coding the difference filter coefficients $w_1, \ldots, ew_{M+N+O+1}$ yields a higher coding efficiency than in the case of coding the filter coefficients $w_1, \ldots, w_{M+N+O+1}$.

Current filter coefficients at the encoder (or the decoder) are predicted based on the filter coefficients already coded (or decoded). However, such prediction may be performed also considering information which is other than the transmitted filter coefficients and is already available at the decoder.

For example, a prediction filter coefficient is obtained according to Expression 4 as shown below.

[Math. 4]

$$\hat{w}_{i,t} = F_i(w_{1,t}, \ldots, w_{i-1,t}, w_{i+1,t}, \ldots, w_{M+N+O+1,t}, w_{1,t-1}, \ldots, w_{M+N+O+1,t-1}, w_{1,t-2}, \ldots, w_{M+N+O+1,t-2}, \ldots), \forall i \quad \text{Expression 4}$$

In the above Expression 4, an index t denotes a time instance. The time instance is associated with a relative decoding order. In other words, the information having a time index smaller than t is already coded. For instance, the time instance t may relate to a coding (or decoding) of a picture or even a single block, depending on the area for which the filter coefficient(s) is/are determined. In general, a function Fi is a function determined depending on all the already coded filter coefficients.

In particular, a linear predictor may be used for predicting the filter coefficients and offsets. For example, the function Fi is represented according to the following Expression 5.

[Math. 5]

$$F_i = \alpha_i + \sum_{j=1, j\neq i}^{M+N+O+1} a_{j,t} \cdot w_{j,t} + \sum_{j=1}^{M+N+O+1} a_{j,t-1} \cdot w_{j,t-1} + \sum_{j=1}^{M+N+O+1} a_{j,t-2} \cdot w_{j,t-2} + \ldots \forall i \quad \text{Expression 5}$$

In the above Expression 5, $a_i$ is a constant value. Prediction coefficients $a_{j,\,t}, \ldots, a_{j,\,t-1}, \ldots, a_{j,\,t-2}, \ldots$ and $a_i$ may be fixed or may be adaptively changed. In the case of adaptive prediction coefficients, it is possible to provide the prediction coefficients to the decoder side. In other words, the adaptive prediction coefficients are included within the coded video signal, for instance, in the sequence header or in the frame header. It is also possible to derive them at the decoder from already received data. In addition, it is also good to adaptively change the prediction coefficients $a_{j,\,t}, \ldots, a_{j,\,t-1}, \ldots, a_{j,\,t-2}, \ldots$ and $a_i$ for arbitrary parts (areas) such as slices or blocks of a single picture.

In order to further reduce the bandwidth, each of the difference filter coefficients (prediction errors) may be coded by a variable length code such as a Huffman code, an arithmetic code, a Golomb code, an Elias code, or any other variable length code. In addition, the difference filter coefficient may be subjected to a fixed-length coding.

Predictive coding of filter data provides an advantageous effect since the reconstructed video signal is based on the prediction signal and the (quantized) prediction error signal. Thus, typically, there is a statistical relationship especially between the reconstructed video signal and each of the prediction signal and the (quantized) prediction error signal. In most cases, filter data items determined for the reconstructed video signal and filter data items determined for the prediction signal even have identical or similar values. In such a case, it is possible to efficiently reduce the bandwidth required for the coded video signal by simply predicting the filter data items of the prediction signal or the like using the values of the filter data items of the reconstructed video signal. It is also good to predict the filter data items of the (quantized) prediction error signal in the same manner, by, for example, using the filter data items of the prediction signal. However, the filter data items of one signal do not necessarily have to be predicted in unit of a pair (that is, predicted from the paired filter data items of another single signal). In general, the filter data items of one signal may be predicted using an arbitrary function of filter data items determined for the other signals. For example, a filter data item of the reconstructed video signal may be predicted using any function of a filter data item of the prediction error signal and a filter data item of the prediction signal.

In addition, the linear statistical dependency relationships between the filter coefficients and the offsets are also used in transform coding. In other words, the filter coefficients $w_1, \ldots, w_{M+N+O+1}$ may be transformed into the filter coefficients $cw_1, \ldots, cw_{M+N+O+1}$, and the filter coefficients $cw_1, \ldots, cw_{M+N+O+1}$ may be further coded. In general, coding the transform coefficients $cw_1, \ldots, cw_{M+N+O+1}$ yields a higher coding efficiency than in the case of coding the filter coefficients and the offsets $w_1, \ldots, W_{M+N+O+1}$. The transform is performed according to Expression 6.

[Math. 6]

$$CW_t = T_t \cdot W_t \quad \text{Expression 6}$$

In the above Expression 6, $CW_t$ denotes a vector including the transform coefficients $cw_1, \ldots, cw_{M+N+O+1}$, and $Wt$ denotes a vector including the filter coefficients $w_1, \ldots, w_{M+N+O+1}$, and $Tt$ denotes a transform matrix at the time instance t. Depending on the characteristics of the input image/video, applying the same or different transform at each time instance may provide an advantageous effect. The applied transform may either be a fixed transform such as a discrete cosine transform (DCT), a fast Fourier transform (FFT), or a Karhunen-Loève transform (KLT) with fixed coefficients. However, the transform may also be adaptive. In the case of an adaptive transform, it is possible to transmit transform information to the decoder, for instance, after inserting the transform information in the sequence header, the frame, or the slice header.

The transform information may include either the transform matrix or information that enables obtainment of the transform matrix.

In order to code the transform coefficients $cw_1, \ldots, cw_{M+N+O+1}$, variable length coding is preferably applied. However, fixed length coding may be applied instead.

In addition, it is also possible to utilize statistical dependency relationships between the filter coefficients and between the offsets in the coding scheme that assumes a Markov source. Accordingly, a filter coefficient or an offset $w_{i,t}$ is coded using a codeword that is conditioned on (possibly all) already coded and transmitted filter coefficients or offsets, as represented by the following Expression 7.

[Math. 7]

$$w_{1,t}, \ldots, w_{i-1,t}, w_{i+1,t}, \ldots, w_{M+N+O+1,t}, w_{1,t-1}, \ldots, w_{M+N+O+1,t-1}, w_{1,t-2}, \ldots, w_{M+N+O+1,t-2} \quad \text{Expression 7}$$

Depending on the coding scheme and the input image/video, it may be advantageous to take into account only a subset of the already coded filter coefficients or offsets as conditions.

This coding scheme, which assumes a Markov source, requires knowledge of a source model. This model may either be fixed or adaptive. Such a coding scheme may be described, for instance, by a state transition diagram. In the case of an adaptive model, it is possible to code and transmit the model (for example, the state transition diagram) to the decoder side, for instance, after inserting the coded information about the model in the sequence header, the frame, or the slice header.

It is also good to firstly code the filter coefficients and the offsets using the Markov source, and then further code the coded filter coefficients and offsets using variable length codes or fixed length codes.

The above three coding methods are examples of coding schemes that utilize the statistical relationships between the coded data items. However, the present invention may also employ other methods considering the statistical relationships between data items to be coded. Examples of the other methods includes a run-length coding, a variable length coding using table switching based on values of already coded data, and a variable length coding for coding, as a single codeword, a combination of filter data items for a different signal.

In addition, in this embodiment, coded filter data items are inserted in the coded video signal (bitstream). The syntax and semantics of the bitstream may be a subject of a future video coding standard.

The following describes an example of integration of the coding scheme according to the present invention into a future video coding standard. In this example, it is assumed that filtering in the spatial domain as described with reference to FIGS. 5 and 7 is applied, and that the filter data items include filter coefficients for which a prediction scheme is applied.

The syntax elements may be coded using a specific code specified by the standard. Such code may be a fixed length code or a variable length code. One possibility is the use of arithmetic coding in which a probability model may be adapted for particular syntax elements. Another possibility is the use of codewords according to the Huffman codes. Alternatively, it is also good to use a unary code or (universal) integer codes such as Golomb codes, exp-Golomb codes, Elias codes, etc.

Preferably, the filter data items (for example, filter coefficients) be transmitted after inserted at the end of the related data (for example, the entire frame data, the slice data, or the like. This produces advantageous effects indicated below. The filter data items at the encoder are generally estimated after the coding and decoding of a frame, a slice, or any image area for which the filter data items are determined. In the case where the filter data items are included in the header of the frame or the slice including the data for which the filter data items are already estimated, the entire coded bitstream needs to be stored until the filter data items are calculated and inserted to the bitstream. In the case of performing arithmetic coding of all the data, not only the bitstream but all syntax elements to be coded need to be stored and coded after the filter data items are coded. In the case of transmitting the filter data items inserted in the bitstream after the frame or the slice data, no bitstream or syntax elements have to be stored during the coding. This reduces the requirements on memory size.

Thus, preferably, the filter data items be transmitted after included in a separate NAL unit such as a SEI message compliant with H.264/MPEG-4 AVC.

In the case where the filter data items are transmitted after inserted within the frame header or the slice header, it is beneficial to terminate and restart the arithmetic coder (the entropy coding unit 590). This provides the advantageous effect that only the bitstream but not all the syntax elements have to be stored at the encoder.

There are more possibilities with respect to the locations of the filter data items within the coded video signal (bitstream).

In particular, the filter data items may be included before or after the part related to the filter data items in coded video signal.

In an embodiment of the present invention, the structure of the bitstream is optimized for the decoder. In particular, the filter data items are included in the frame header or the slice header each of which relates to the corresponding one of the filter data items. In this case, the entire information about the post filtering is known at the decoder before the decoding of the blocks of the slice or the frame. This provides advantageous effects such as reduction in memory, reduction in memory allocations, and reduction in storing operations in the decoder. Therefore, it is possible to perform decoding in a faster and more inexpensive manner.

For example, the post filtering may be performed after the decoding and storing of a certain number of blocks within a slice or a frame. The number of blocks that need to be stored before start of the post filtering depends on the filter size of the post filter. It is not necessary to decode and store all the blocks of a slice or a frame (that is, for example, a reconstructed video signal and/or a quantized prediction error signal and/or a prediction signal) before start of the post filtering.

In the slice header, a flag (post_filter_flag[c]) may show whether a particular color component is considered for the post filtering or not. In the case where post filtering should not be performed for a given color component, the decoder does not need to store any signal (for example, a reconstructed video signal and/or a quantized prediction error signal and/or a prediction signal) for the purpose of the post filtering.

Moreover, in the case where filter coefficients which are associated with certain signals to be filtered (for instance, with the reconstructed video signal, the quantized prediction error signal, and the prediction signal) are all zero, it is not necessary to store these signals in the decoder for the purpose of the post filtering.

In combination with an arithmetic coding, it may be further beneficial for encoders to generate individual codewords for the header, the filter data items, and the remaining macroblock data. Individual codewords are generated by (i) terminating the arithmetic coder after the general header information, (ii) restarting the arithmetic coder before coding filter data items and then terminating the arithmetic coder, and (iii) restarting again the arithmetic coder before coding the remaining macroblock data and then terminating the arithmetic coder. Depending on architectures, the codewords in the arithmetic coding preferably have a length of an integer number of bytes (for example, architectures using byte arrays). The use of individual codewords provides an advantageous effect of being able to skip re-coding of the cordwords and directly store and rearrange the cordwords. The use of arrayed codewords (for example, byte arrays of codewords) further facilitates storing and rearrangement of the bitstream portions at the encoder.

Figure 11A:
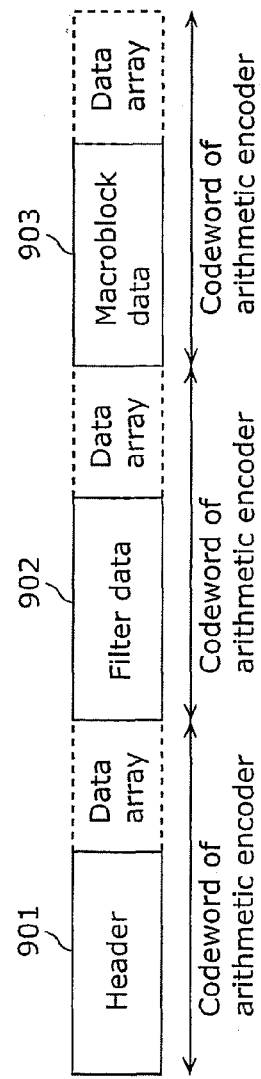
FIG. 11A is a diagram showing an example of a structure of portions corresponding to a slice or a frame in a coded video signal (bitstream) according to the embodiment.

FIG. 11A is a diagram showing an example of a structure of portions corresponding to a slice or a frame in a coded video signal (a bitstream). First, a header 901 is included in the bitstream, and if arrayed data is necessary, the arrayed data follows. Next, a filter data 902 is included in the bitstream, and if arrayed data is necessary, the arrayed data follows. Finally, the macroblock data 903 showing coded macroblocks of the video signal is included into the bitstream, together with the arrayed data (if the arrayed data is necessary).

In other words, since the filter data 902 is placed before the image signal (the macroblock data 903) to which the filter data 902 is applied, generating the filter data 902 and the image signal according to the order of arrangement in the bitstream eliminates the need to temporally store the generated data, and thus enables reduction in the memory capacity. In this case, it is possible to generate the image signal (macroblock data 903) using the filter data 902, which makes it possible to implement what is called an in-loop filter. More specifically, it is possible to filter a prediction signal using the filter data 903 to generate an image signal (the macroblock data 903) made up of quantized coefficients, based on the filtered prediction signal, in a loop made up of the sequentially-arranged elements of the subtractor 105, the transform/quantization unit 110, the inverse quantization/inverse transform unit 120, the adder 125, the deblocking filter 130, the memory 140, the intra prediction unit 170 (the interpolation filter 150, and the motion compensation prediction unit 160), and the subtractor 105.

In this embodiment of the present invention, the structure of the bitstream may be optimized for the encoder. In particular, the filter data is included in the bitstream after the related macroblock data. In this case, the entire information about the post filter can be generated after the coding of the blocks of a slice or a frame. This provides advantageous effects such as reduction in memory, reduction in memory allocations, and reduction in storing operations in the encoder. Therefore, it is possible to perform decoding in a faster and more inexpensive manner.

The calculation of the optimum Wiener filter coefficients in post filtering requires all data for functioning of the filtering. In the case of this embodiment of the present invention, the reconstructed video signal and/or the quantized prediction error signal and/or the prediction signal is/are required in full. At the encoder, this data is only available after a complete coding and decoding of a slice or a frame. While completing the coding, the bitstream is already generated and stored and/or transmitted. Thus, it is necessary to store the entire bitstream in order to include the filter data before the macroblock data. In the case of performing arithmetic coding using only one codeword (termination at the end of a slice or a frame), it is also necessary to store all the syntax elements and complete re-coding of the syntax elements. Such storage operation is unnecessary in the case of including the filter information before the macroblock data.

Figure 11B:
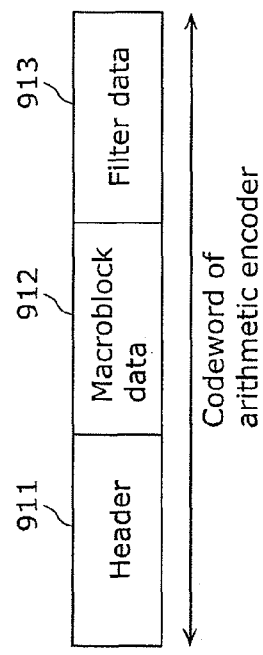
FIG. 11B is a diagram showing another example of a structure of a part of the coded video signal (bitstream) according to the embodiment.

FIG. 11B is a diagram showing another example of a structure of a part of the coded video signal (bitstream).

Each of the header data 911, the macroblock data 912, and the filter data 913 is coded as a single codeword in the arithmetic encoder (the entropy coding unit 590). In other words, the coding processing is continued without restart for each coding of a different portion of the bitstream.

Figure 11C:
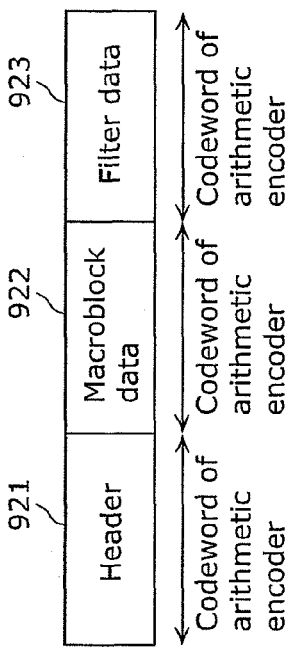
FIG. 11C is a diagram showing another example of a structure of a part of the coded video signal (bitstream) according to the embodiment.

FIG. 11C is a diagram showing another example of a structure of a part of the coded video signal (bitstream).

Each of the header data 921, the macroblock data 922, and the filter data 923 may be coded as a single codeword in the arithmetic encoder (the entropy coding unit 590).

However, the present invention is not limited to an embodiment using an arithmetic coding, and another embodiment is possible which uses any other kind of coding. The following describes a preferred syntax of the information elements within the bitstream for the sequence header and for the frame.

FIG. 12A is a diagram showing a syntax of a sequence header.

In FIG. 12A, "postfilter" indicates whether or not a post filter can be applied at a frame level.

"post_filter_initial_probabilities" indicates an initial probability for controlling codes in filter data.

FIG. 12B is a diagram showing the syntax of a frame.

"post_filter_flag[c]" indicates whether post filtering is applied to a color component c. Here, c=0 corresponds to a luma component, and c=1 and c=2 correspond to two chroma components.

The function "decode_post_filter(c)" further includes a plurality of syntax elements Each of FIG. 13A and FIG. 13B is a diagram showing a syntax of "decode_post_filter(c)".

"filter_hint_type[c]" specifies the type of the transmitted filter hint for the color component c. Here, c=0 corresponds to a luma component, and c=1 and c=2 correspond to two chroma components. Possible values are 0 to 3 inclusive as indicated in FIG. 14.

FIG. 14 is a diagram showing relationships between the values of "filter_hint_type[c]" and the types of filter hints.

When the value of "filter_hint_type[c]" is 0, "filter_hint_type[c]" indicates, as the type of a filter hint, a coefficient of a two-dimensional FIR filter. When the value of "filter_hint_type[c]" is 1, "filter_hint_type[c]" indicates, as the type of a filter hint, a cross correlation matrix. When the value of "filter_hint_type[c]" is 2, "filter_hint_type[c]" indicates, as the type of a filter hint, two one-dimensional FIR filter coefficients. When the value of "filter_hint_type[c]" is 3, "filter_hint_type[c]" indicates, as the type of a filter hint, two cross correlation vectors. In other words, when the value of "filter_hint_type[c]" is 0 or 1, "filter_hint_type[c]" indicates that the range of the filtering is two-dimensional array ("2D" in FIG. 13A or FIG. 13B), and when the value of "filter_hint_type[c]" is 2 or 3, "filter_hint_type[c]" indicates that the range of the filtering is one-dimensional array ("1D" in FIG. 13A or FIG. 13B).

The semantics of the syntax elements in the syntax indicated in FIG. 13A are indicated below.

"filter_hint_size_rec_x" specifies a filter coefficient array for a reconstructed video signal or the horizontal size (filter size) of a cross correlation array for the reconstructed video signal.

"filter_hint_size_rec_y" specifies a filter coefficient array for the reconstructed video signal or the vertical size (filter size) of the correlation array for the reconstructed video signal.

"filter_hint_size_pred_x" specifies a filter coefficient array for a prediction signal or the horizontal size (filter size) of a cross correlation array for the prediction video signal.

"filter_hint_size_pred_y" specifies a filter coefficient array for the prediction signal or the vertical size (filter size) of a cross correlation array for the prediction video signal.

"filter_hint_size_qpe_x" specifies a filter coefficient array for a quantized prediction error signal or the horizontal size (filter size) of a cross correlation array for the quantized prediction error signal.

"filter_hint_size_qpe_y" specifies a filter coefficient array for the quantized prediction error signal or the vertical size (filter size) of a cross correlation array for the quantized prediction error signal.

"filter_hint_rec[c][cy][cx]" specifies an element of the filter coefficient matrix for the reconstructed video signal or an element of the cross correlation matrix between the original signal (video signal) and the reconstructed video signal. Here, c=0 corresponds to a luma component, and c=1 and c=2 correspond to two chroma components. Also, cy denotes a counter in the vertical direction, and cx denotes a counter in the horizontal direction.

"filter_hint_pred[c][cy][cx]" specifies an element of the filter coefficient matrix for the prediction signal or an element of the cross correlation matrix between the original signal (video signal) and the prediction signal. Here, c=0 corresponds to a luma component, and c=1 and c=2 correspond to two chroma components. Also, cy denotes a counter in the vertical direction, and cx denotes a counter in the horizontal direction.

"filter_hint_qpe[c][cy][cx]" specifies an element of the filter coefficient matrix for the quantized prediction error signal or an element of the cross correlation matrix between the original signal (video signal) and the quantized prediction error signal. Here, c=0 corresponds to a luma component, and c=1 and c=2 correspond to two chroma components. Also, cy denotes a counter in the vertical direction, and cx denotes a counter in the horizontal direction.

"filter_hint_rec_x[c][cx]" specifies an element of the filter coefficient vector for the horizontal filtering of the reconstructed video signal or an element of the horizontal cross correlation vector between the original signal (video signal) and the reconstructed video signal. Here, c=0 corresponds to a luma component, and c=1 and c=2 correspond to two chroma components. Also, cx denotes a counter in the horizontal direction.

"filter_hint_pred_x[c][cx]" specifies an element of the filter coefficient vector for the horizontal filtering of the prediction signal or an element of the horizontal cross correlation vector between the original signal (video signal) and the prediction signal. Here, c=0 corresponds to a luma component, and c=1 and c=2 correspond to two chroma components. Also, cx denotes a counter in the horizontal direction.

"filter_hint_qpe_x[c][cx]" specifies an element of the filter coefficient vector for the horizontal filtering of the quantized prediction error signal or an element of the horizontal cross correlation vector between the original signal (video signal) and the quantized prediction error signal. Here, c=0 corresponds to a luma component, and c=1 and c=2 correspond to two chroma components. Also, cx denotes a counter in the horizontal direction.

"filter_hint_rec_y[c][cx]" specifies an element of the filter coefficient vector for the vertical filtering of the reconstructed video signal or an element of the vertical cross correlation vector between the original signal (video signal) and the reconstructed video signal. Here, c=0 corresponds to a luma component, and c=1 and c=2 correspond to two chroma components. Also, cy denotes a counter in the vertical direction.

"filter_hint_pred_y[c][cx]" specifies an element of the filter coefficient vector for the vertical filtering of the prediction signal or an element of the vertical cross correlation vector between the original signal (video signal) and the prediction signal. Here, c=0 corresponds to a luma component, and c=1 and c=2 correspond to two chroma components. Also, cy denotes a counter in the vertical direction.

"filter_hint_qpe_y[c][cx]" specifies an element of the filter coefficient vector for the vertical filtering of the quantized prediction error signal or an element of the vertical cross correlation vector between the original signal (video signal) and the quantized prediction error signal. Here, c=0 corresponds to a luma component, and c=1 and c=2 correspond to two chroma components. Also, cy denotes a counter in the vertical direction.

"filter_hint_offset[c]" specifies an offset value. Here, c=0 corresponds to a luma component, and c=1 and c=2 correspond to two chroma components.

Each of the aforementioned syntax elements "filter_hint_rec", "filter_hint_pred", "filter_hint_qpe", "filter_hint_rec_x", "filter_hint_pred_x", "filter_hint_qpe_x", "filter_hint_rec_y", "filter_hint_pred_y", "filter_hint_qpe_y" denotes either a filter coefficient or a difference filter coefficient, and is handled as a filter hint.

"filter_precision[c]" specifies the precision of quantization of a filter data item (a filter coefficient). For each color component c, the value of the syntax element "filter_precision[c]" denotes the value of the precision "Wiener_Filter_Presision [c]" corresponding to the former value.

In the syntax as shown in FIG. 13B, the semantics of the syntax elements different from the aforementioned syntax elements are indicated below.

"filter_hint_size_rec_idx" is an index indicating an integer equal to or larger than 0, and is for identifying the size (filter size) of a two-dimensional filter coefficient array or a cross correlation array for a reconstructed video signal. The filter size identified by this index is the same in the horizontal direction and the vertical direction.

"filter_hint_size_pred_idx" is an index indicating an integer equal to or larger than 0, and is for identifying the size (filter size) of a two-dimensional filter coefficient array or a cross correlation array for a prediction signal. The filter size identified by this index is the same in the horizontal direction and the vertical direction.

"filter_hint_size_qpe_idx" is an index indicating an integer equal to or larger than 0, and is for identifying the size (filter size) of a two-dimensional filter coefficient array or a cross correlation array for a quantized prediction error signal. The filter size identified by this index is the size in the horizontal direction and the vertical direction.

"filter_hint_size_rec" indicates the same filter size in the horizontal and vertical directions of the two-dimensional filter coefficient array or the cross correlation array for the reconstructed video signal. This filter size is identified by an index "filter_hint_size_rec_idx". In other words, the "filter_hint_size_rec" is an odd number equal to or larger than 1 obtained according to "filter_hint_size_rec=2× (filter_hint_size_rec_idx)+1".

"filter_hint_size_pred" indicates the same filter size in the horizontal and vertical directions of the two-dimensional filter coefficient array or the cross correlation array for the prediction signal. This filter size is identified by an index "filter_hint_size_pred_idx". In other words, the "filter_hint_size_pred" is an odd number equal to or larger than 1 obtained according to "filter_hint_size_pred=2× (filter_hint_size_pred_idx)+1".

"filter_hint_size_qpe" indicates the same filter size in the horizontal and vertical directions of the two-dimensional filter coefficient array or the cross correlation array for the quantized prediction error signal. This filter size is identified by an index "filter_hint_size_qpe_idx". In other words, the "filter_hint_size_qpe" is an odd number equal to or larger than 1 obtained according to "filter_hint_size_qpe=2× (filter_hint_size_qpe_idx)+1".

"filter_hint_size_rec_x_idx" is an index indicating an integer equal to or larger than 0, and is for identifying the filter size (length) of one of a filter coefficient vector and a cross correlation vector each of which is a one-dimensional (horizontal) array for the reconstructed video signal. In this case, "filter_hint_size_rec_x" is an odd number equal to or larger than 1, and is obtained according to "filter_hint_size_rec_x=2× (filter_hint_size_rec_x_idx)+1".

"filter_hint_size_rec_y_idx" is an index indicating an integer equal to or larger than 0, and is for identifying the filter size (length) of one of a filter coefficient vector and a cross correlation vector each of which is a one-dimensional (vertical) array for the reconstructed video signal. In this case, "filter_hint_size_rec_y" is an odd number equal to or larger than 1, and is obtained according to "filter_hint_size_rec_y=2× (filter_hint_size_rec_y_idx)+1".

"filter_hint_size_pred_x_idx" is an index indicating an integer equal to or larger than 0, and is for identifying the filter size (length) of one of a filter coefficient vector and a cross correlation vector each of which is a one-dimensional (horizontal) array for the prediction signal. In other words, the "filter_hint_size_pred_x" is an odd number equal to or larger than 1 obtained according to "filter_hint_size_pred_x=2×(filter_hint_size_pred_x_idx)+1".

"filter_hint_size_pred_y_idx" is an index indicating an integer equal to or larger than 0, and is for identifying the filter size (length) of one of a filter coefficient vector and a cross correlation vector each of which is a one-dimensional (vertical) array for the prediction signal. In other words, the filter_hint_size_pred_y is an odd number equal to or larger than 1 obtained according to "filter_hint_size_pred_y=2× (filter_hint_size_pred_y_idx)+1".

"filter_hint_size_qpe_x_idx" is an index indicating an integer equal to or larger than 0, and is for identifying the filter size (length) of one of a filter coefficient vector and a cross correlation vector each of which is a one-dimensional (horizontal) array for a quantized prediction error signal. In other words, "filter_hint_size_qpe" is an odd number equal to or larger than 1 obtained according to "filter_hint_size_qpe_x=2×(filter_hint_size_qpe_x_idx)+1".

"filter_hint_size_qpe_y_idx" is an index indicating an integer equal to or larger than 0, and is for identifying the filter size (length) of one of a filter coefficient vector and a cross correlation vector each of which is a one-dimensional (vertical) array for the quantized prediction error signal. In this case, "filter_hint_size_qpe_y" is an odd number equal to or larger than 1 obtained according to "filter_hint_size_qpe_y_idx=2×(filter_hint_size_qpe_y_idx)+1".

According to the syntax shown in FIG. 13A, the filter size in the horizontal direction and the filter size in the vertical direction for each of the prediction signal, the quantized prediction error signal, and the reconstructed video signal are included in the difference filter data irrespective of whether the filtering range is one dimensional or two dimensional, and transmitted to the decoder.

On the other hand, according to the syntax shown in FIG. 13B, the index is included in the difference filter data and transmitted to the decoder. In this case, the decoder calculates each of the filter sizes by adding 1 to the product of the index and 2. Here, according to the syntax shown in FIG. 13B, when the filtering range is a two-dimensional array, the common index in the horizontal and vertical directions for each of the prediction signal, the quantized prediction error signal, and the reconstructed video signal is included in the difference filter data. In addition, when the filtering range is a one-dimensional array, the index in the horizontal and vertical directions for each of the prediction signal, the quantized prediction error signal, and the reconstructed video signal is included in the difference filter data.

In this way, according to the syntax shown in FIG. 13B, the filter size is included as the index in the difference filter data and is transmitted to the decoder. Thus, it is possible to reduce the amount of bits required to transmit the filter size. In addition, when the filtering range is a two-dimensional array, the common index in the horizontal and vertical directions is included in the difference filter data. Thus, it is possible to further reduce the amount of bits required to transmit the filter size.

In addition, the post filter design unit 540 of the video coding apparatus 500 may fix or change the filter size for each slice, frame, or sequence. When using a variable filter size, the post filter design unit 540 selects a changed filter size, and includes the changed filter size or an index (syntax element) corresponding to the filter size to the difference filter data, as shown in the syntax in FIG. 13A or FIG. 13B.

The filter size is assumed to be an odd number larger than 1 in the above descriptions, but the filter size may be a value which can be 0. When the filter size is 0, no filtering is performed. In other words, the filter coefficient (filter hint indicating a difference filter coefficient) is not included in the difference filter data, and is not transmitted to the decoder.

In this way, when the filter size is a value which can be 0, the filter size is calculated using an index according to max $\{0, 2\times (\text{index}-1)+1\}$. Here, max $\{A, B\}$ indicates the largest value among A and B. More specifically, according to whether the filtering range is two-dimensional or one-dimensional, each filter size is calculated according to the expression shown below.

In addition, it is also possible to prevent the reconstructed video signal, the prediction signal, and the quantized prediction signal from being used for filtering, by transmitting, to the decoder, filter hints that yield a filter coefficient of 0 for the respective signals. In this case, it is possible to reduce the coding amount by specifying indices that yield a filter size of 1.

Two-dimensional filter sizes:
filter_hint_size_rec=max $\{0, 2\times$ (filter_hint_size_rec_idx−1)+1$\}$
filter_hint_size_pred=max $\{0, 2\times$ (filter_hint_size_pred_idx−1)+1$\}$
filter_hint_size_qpe=max $\{0, 2\times$ (filter_hint_size_qpe_idx−1)+1$\}$ One-dimensional filter sizes:
filter_hint_size_rec_x=max $\{0, 2\times$ (filter_hint_size_rec_x_idx−1)+1$\}$
filter_hint_size_rec_y=max $\{0, 2\times$ (filter_hint_size_rec_y_idx−1)+1$\}$
filter_hint_size_pred_x=max $\{0, 2\times$ (filter_hint_size_pred_x_idx−1)+1$\}$
filter_hint_size_pred_y=max $\{0, 2\times$ (filter_hint_size_pred_y_idx−1)+1$\}$
filter_hint_size_qpe_x=max $\{0, 2\times$ (filter_hint_size_qpe_x_idx−1)+1$\}$
filter_hint_size_qpe_y=max $\{0, 2\times$ (filter_hint_size_qpe_y_idx−1)+1$\}$ The post filter 640 of the video decoding apparatus 600 which is a decoder calculates filter sizes based on indices included in difference filter data according to the expressions as listed above. The post filter 640 does not perform filtering when the filter size is 0, and, when the filter size is an odd number equal to or greater than 1, performs post filtering according to the filter size.

Here, in the above description, the filter sizes are calculated according to max $\{0, 2\times (\text{index}-1)+1\}$, but such filter sizes may be calculated according to max $\{0, 2\times \text{index}-1\}$ or max $\{0, 2\times (\text{index}-1)-1\}$. In addition, any other combination of an expression and an index is possible as long as the combination yields a filter size of 0 or a positive odd number.

In this way, the encoder and the decoder can switch the necessity of filtering according to whether the filter size is 0 or an odd number equal to or greater than 1.

It is to be noted that, in the case where no filter hint for a given one of signals is transmitted to a decoder, the decoder may calculate a filter coefficient for each of the signals assuming that the filter hint thereof is a specified value such as 0 so as not to introduce error in at least one or all of the filter coefficients for the respective signals for which the filter coefficients are calculated from the filter hints.

FIG. 15 is a diagram showing the correlation relationships between filter_precision[c] and Wiener_Filter_Precision[c].

Wiener_Filter_Precision[c] denotes filter data quantization information that determines the precision of the filter coefficient.

In the present invention, the number of possible values for filter_precision[c] and Wiener_Filter_Precision[c] are not limited to 12. It is also possible to have more or less number of possible values. The assignment of the value of the syntax element (filter_precision[c]) may be different from the assignment of the value of the filter precision (Wiener_Filter_Precision[c]). For example, the syntax elements and the filter precision may be associated with each other such that the values of the filter precision are higher when the values of the syntax elements are lower. It may also be advantageous to select a particular mapping between the value of the syntax element and the value of the filter precision. In order to achieve a desired overall coding efficiency, it is also good to design a combination of the mapping and the code used for coding the filter_precision[c] values. The number of possible values of Wiener_Filter_Precision[c] may be signaled. For example, fixed-length codes or variable-length codes may be coded.

It is also good to signal the mapping between the syntax element (filter_precision[c]) and the filter precision (Wiener_Filter_Precision[c]). However, in order to reduce the bandwidth required for such signaling, for example, all the values of Wiener_Filter_Precision[c] may be the powers of 2. In this case, the encoder side and/or the decoder side can calculate the values of Wiener_Filter_Precision[c] based only on the knowledge of the smallest value of "Wiener_Filter_Precision[c]" (the smallest value is 8 in the example of FIG. 15) and on the total number of possible values (the number of the possible values is 12 in the example of FIG. 15). In this case, it is only necessary to code all the possible values and only one (for example, the smallest value) of the values of "Wiener_Filter_Precision[c]".

The lower the value of "Wiener_Filter_Precision[c]", the lower is the precision of the filter data and the lower is the rate necessary for the transmission thereof.

The relative amount of bits used for coding the filter precision (syntax elements) is high when the overall bit rate of the coded video signal is low. The relative amount of bits used for coding the filter precision is very small when the overall bit rate of the coded video signal is high.

Thus, when the overall bit rate is low, a very low bit rate is desirable for coding filter precision (syntax elements). When the overall bit rate is high, a high bit rate is acceptable for coding filter precision. In order to fulfill these requirements, a coding scheme is preferably applied, with a bit rate of the filter precision (syntax elements) adapted to the overall bit rate (for example, optimized for a low overall bit rate). In the mapping between "filter_precision[c]" and "Wiener_Filter_Precision[c]" as shown in FIG. 15, a small "Wiener_Filter_Precision[c]" value results in a coarser quantization of the filter data item (for example, a filter coefficient). Consequently, the bit rate necessary for the coded filter data item including a coded parameter (filter precision) of "Wiener_Filter_Precidion" as syntax element filter_precision[c] is reduced more significantly when the bit rate of the coded video signal is lower.

For example, a shorter codeword is assigned in order to signal a low precision of "Wiener_Filter_Precision[c]", and a longer codeword is assigned in order to signal a high precision of "Wiener_Filter_Precision[c]". This makes it possible to reduce the bit rate required to code a low value of "Wiener_Filter_Precision[c]". For example, a unary code may be employed as shown in FIG. 16.

FIG. 16 is a diagram showing unary codes which are allocated to "filter_precision[c]" (Wiener_Filter_Precision[c]).

It is also possible to use variable length codes other than the unary codes, and arbitrarily select a coding scheme. For example, Golomb codes may be used as shown in FIG. 17.

FIG. 17 is a diagram showing an example of Golomb codes which are allocated to "filter_precision[c]" (Wiener_Filter_Precision[c]).

For example, Golomb codes may be used as shown in FIG. 18.

FIG. 18 is a diagram showing an example of Golomb codes which are allocated to "filter_precision[c]" (Wiener_Filter_Precision[c]).

As a matter of course, a fixed codeword length may also be used when the number of possible values is 16.

FIG. 19 is a diagram showing fixed length codes which are allocated to "filter_precision[c]" (Wiener_Filter_Precision[c]).

In addition, it is also possible to switch between codeword tables different from the codeword tables as shown in FIG. 16 to FIG. 19. The selection of the codeword table can also be coded and signalled by the encoder to the decoder. In this case, in order to enable an immediate decoding of the quantization step size, it is preferable that the selection be signaled before the precision of "filter_precision[c]" is signaled.

Furthermore, it is also possible to select one codeword table out of several appropriate codeword tables according to a fixed rule. Such a fixed rule may be based on the number of bits already used for the decoding of the current frame or slice. In addition, the rule may also be based on the quantization parameter which is used at the beginning of the decoding of the current frame or slice or which is used in average for the decoding of the current frame or slice. In addition, the rule may also be based on the quantized prediction error signal, for instance, on its variance. In addition, it may also be based on the prediction signal, for instance, on its variance, or on any other reference determined based on the prediction signal and/or the prediction error signal.

The binary symbols representing the syntax element of "filter_precision[c]" can also be coded by using arithmetic coding. Here, the same or an individual code can be used for coding each binary symbol. In addition, the code can also be determined depending on contexts. Due to the conditional coding, the coding efficiency is further increased. One possibility is to use the value of "filter_precision[i]" as a condition for the coding of "filter_precision[i+1]" and/or "filter_precision[i+2]". Furthermore, it is possible to code, transmit, and use different filter precisions for the coefficients of the respective components. This means that individual values of "filter_precision" are used for the filter data corresponding to the reconstructed video signal, to the prediction signal, and to the quantized prediction error signal. It is also possible to use different filter precisions for the filter data according to the respective signals. For example, individual filter precisions are used for the respective c and cy of "filter_hint_rec_y[c][cy]" included in the filter data.

At the encoder, it is possible to advantageously determine the value of "Wiener_Filter_Precison[c]" by minimizing the Lagrangian costs of the overall bit rate and the mean squared reconstruction error between the original image signal (video signal) and the filtered image signal (decoded video signal). Alternatively, it is possible to determine the Lagrangian costs for a certain value of "Wiener_Filter_Precison[c]", for instance, by completely coding and measuring the required bits and the resulting mean squared reconstruction error. Another possibility is to estimate the rate and the mean squared reconstruction error. Alternatively, it is possible to estimate the mean squared reconstruction error by filtering only a certain subset of the image signal and assuming that the mean squared reconstruction error for this subset approximates the mean squared reconstruction error of the whole image signal. It is also possible to test only a subset of the possible values of "Wiener_Filter_Precison[c]", for example, depending on the quantization parameter values of the frame or slice.

The filter data (difference filter data) that have been provided from the encoder side to the decoder side are used for decoding the video signal. The following particularly shows examples of a method of decoding the coded filter data and a method of using the decoded filter data in decoding the video signal.

In the first and second examples, the filter coefficients and offsets are used for post filtering of the color components of the decoded images (reconstructed video signals). In the case where cross correlations and offsets are transmitted and decoded, these cross correlations and offsets may be used to set up filter conditions for post filtering of the color components of the decoded images as shown in the third and fourth example.

If predictive coding is already applied to the filter data, the filter coefficients, the offsets and/or the cross correlation information are first reconstructed by adding a predicted data item (a prediction filter coefficient).

The first example (filter_hint_type[c]=0) relates to a post filter design and process in the case where coefficients of a two-dimensional (2D) FIR filter are transmitted.

The filter coefficients for post filtering of the reconstructed video signal, the prediction signal, and the quantized prediction error signal are calculated from the received difference filter data as represented by Expression 8 to Expression 10 in FIG. 20A to FIG. 20C. In other words, the post filter 640 of the video decoding apparatus 600 calculates the filter coefficients according to Expression 8 and Expression 10.

FIG. 20A is a diagram showing an expression for calculating the filter coefficients for the reconstructed video signal.

As shown in Expression 8 in FIG. 20A, the reconstructed signal filter coefficient of "coeff_rec[c][cy][cx]" that is a filter coefficient for the reconstructed video signal is calculated based on "filter_hint_rec[c][cy][cx]", "filter_hint_size_rec_x" and "filter_hint_size_rec_y", and the value of Wiener_Filter_Precision[c] which are included in the filter data (difference filter data). "Wiener_Filter_Precision[c]" is coded and included in the bitstream, but may also be fixedly specified, for instance, as "Wiener_Filter_Precision[c]= 16384", possibly for each value of the color component c. "Wiener_Filter_Precision[c]" may be coded for any of the color components and/or any of the prediction signal, the quantized prediction error signal, and the reconstructed video signal, and included in the bitstream.

FIG. 20B is a diagram showing an expression for calculating the filter coefficients for the prediction signal.

As shown in Expression 9 in FIG. 20B, a prediction signal filter coefficient of "coeff_pred[c][cy][cx]" that is a filter coefficient for a prediction signal is calculated based on a reconstruction signal filter coefficient of "coeff_rec[c][oy][ox]", the value of "Wiener_Filter_Precision[c]", and "filter_hint_pred [c] [cy] [cx]", "filter_hint_size_pred_x", "filter_hint_size_pred_y", "filter_hint_size_rec_x", and "filter_hint_size_rec_y" which are included in filter data (difference filter data). Here, ox denotes the center position in the horizontal direction (horizontal filtering range) of a filter coefficient array for the reconstructed video signal, and oy denotes the center position in the vertical direction (vertical filtering range) of the filter coefficient array for the reconstructed video signal.

FIG. 20C is a diagram showing an expression for calculating a filter coefficient for the quantized prediction error signal.

As shown in Expression 10 in FIG. 20C, a prediction error signal filter coefficient of "coeff_qpe[c][cy][cx]" that is a filter coefficient for a quantized prediction error signal is calculated based on a prediction signal filter coefficient of "coeff_pred[c][oy][ox]", and "filter_hint_qpe[c][cy][cx]", "filter_hint_size_qpe_x", "filter_hint_size_qpe_y", "filter_hint_size_pred_x", and "filter_hint_size_pred_y" which are included in filter data (difference filter data). Here, ox denotes the center position in the horizontal direction (horizontal filtering range) of a filter coefficient array for the prediction signal, and oy denotes the center position in the vertical direction (vertical filtering range) of the filter coefficient array for the prediction signal.

Here, according to the expressions shown in FIG. 20A to FIG. 20C, it is possible to calculate appropriate filter coefficients even when there is a difference in the filter size (filtering range) for the reconstructed video signal, the filter size for the prediction signal, and the filter size for the quantized prediction error signal. In addition, according to the expressions shown in FIG. 20A to FIG. 20C, only the filter coefficients at the center positions of the filtering ranges are coded as difference filter coefficients, and the filter coefficients for the respective signals are calculated by addition or subtraction of the difference filer coefficients and the other filter coefficients. For example, the prediction signal filter coefficient of "coeff_pred[c][cy][cx]" at the center position is calculated by subtracting the reconstructed signal filter coefficient of "coeff_rec[c][oy][ox]" that is another filter coefficient from the difference filter coefficient of "filter_hint_pred[c][cy][cx]", and then adding "Wiener_Filter_Precision[c]" to the subtraction result.

In some cases, coding efficiency can be high when only the filter coefficients at the center positions in the filtering ranges are coded as difference filter coefficients in this way. Such cases occur in the case of the three tendencies indicated below. A first tendency is that the reconstructed signal filter coefficient "coeff_rec" at the center position is always approximately the same value. A second tendency is that the sum of the reconstructed signal filter coefficient "coeff_rec" at the center position and the prediction signal filter coefficient "coeff_pred" at the center position are always approximately the same value. A third tendency is that the prediction signal filter coefficient "coeff_pred" at the center position is always approximately the same as the prediction error signal filter coefficient "coeff_qpe" at the center position. In addition, the filter sizes (filtering ranges) may be dynamically changed according to a trade-off relationship between the amount of codes required to transmit the filter coefficients and an advantageous effect of picture quality enhancement by the filters. As a result, the filter coefficients (filter hints) at the positions other than the center positions may become unnecessary. In such a case, only the filter coefficients at the center positions of the filtering ranges are coded as difference filter coefficients. In other words, there is no filter coefficient at a position other than the center position when the filter size is 1×1, and thus there is no need to include, in the filter data, the filter coefficients (filter hints) at the positions other than the center position, and to transmit them to the decoder. In order to facilitate adaptation to such a dynamical change in the filter size, only the filter coefficient at the center position of the filtering range is coded as the difference filter coefficient.

Next, as shown in Expression 11 in FIG. 21, the post filter 640 performs post filtering by respectively applying the calculated filter coefficients to the reconstructed video signal, the prediction signal, and the quantized prediction error signal, to generate a decoded video signal, and outputs the decoded video signal.

FIG. 21 is a diagram showing an expression for calculating a decoded video signal.

As shown in Expression 11 in FIG. 21, the post-filtered value (filtered_image[c][y][x]) that is a value at the position (x, y) of a color component c and shown by the decoded video signal is calculated based on (i) filter coefficients of "coeff_rec[c][j][i]", "coeff_pred[c][j][i]", and "coeff_qpe[c][j][i]", and (ii) "rec_image[c]", "pred_image[c]", and "qpe_image[c]". Here, "rec_image[c]" is a value corresponding to the color component c of the reconstructed video signal, "pred_image" is a value corresponding to the color component c of the prediction signal, and "qpe_image" is a value corresponding to the color component c of the quantized prediction error signal. Here, c=0 corresponds to a luma component, and c=1 and c=2 correspond to two chroma components. In the case of using a color space other than a YUV color space, these correlation relationships may be based on the color space to be used. For example, in the case of using an RGB color space, c=0, C=1, and C=2 may correspond to the Red (R) component, the Green (G) component, and the Blue (B) component, respectively.

Next, as shown in Expression 12 in FIG. 22A, the post filter 640 performs normalization and clipping on the filtered signal (filtered_image[c][y][x]) that is a decoded video signal.

FIG. 22A is a diagram showing a calculation expression for the normalization and clipping.

As shown in Expression 12 in FIG. 22A, the normalized or clipped filtered signal (filtered_image_clipped[c][y][x]) is set to a value within a range of 0 to 255 by application of inverse quantization and a FLOOR function to "filtered_image[c][y][x]".

Here, the step size in "Wiener_Filter_Precision[c]" is shown according to Expression 14 indicated below, and is very useful in, for example, execution by hardware or software.

[Math. 8]

$$\text{Wiener\_Filter\_Precision}[c] = 2^{\alpha[c]}, \alpha[c] = 0, 1, 2, \quad \text{Expression 14}$$

This is because the following division according to Expression 15 can be very efficiently realized by a bit-shift operation (shifting of one bit to the right).

[Math. 9]

$$\text{Wiener\_Filter\_Precision}[c]/2 \quad \text{Expression 15}$$

In other words, the following Expression 16 is satisfied.

[Math. 10]

$$\text{Wiener\_Filter\_Precision}[c]/2 = \text{Wiener\_Filter\_Precision}[c] >> 1 \quad \text{Expression 16}$$

Furthermore, the division by $2^\alpha$ can be efficiently realized by a bit-shift operation (shifting of a bits to the right).

Accordingly, the post filter 640 may perform normalization and clipping on the filtered signal (filtered_image[c][y][x]) by performing operation represented by Expression 13 in FIG. 22B.

FIG. 22B is a diagram showing a calculation expression for the normalization and clipping.

When "Wiener_Filter_Precision[c]" is represented by a power of 2, the calculation according to Expression 13 provides the same advantageous effect as provided according to Expression 12.

Here, it is also good to calculate the prediction signal filter coefficient of "coeff_pred[c][cy][cx]" according to an expression other than Expression 9 in FIG. 20B.

FIG. 23A is a diagram showing an expression for calculating the filter coefficient at the center position of the prediction signal.

As shown in Expression 17 in FIG. 23A, for the center position of the post filtering range of the prediction signal, the post filter 640 calculates the prediction signal filter coefficient of "coeff_pred[c][cy][cx]" according to the calculation expression shown in Expression 18.

FIG. 23B is a diagram showing an expression for calculating filter coefficients at the positions other than the center position of the prediction signal.

As shown in Expression 19 in FIG. 23B, for the positions other than the center position of the post filtering range of the prediction signal, the post filter 640 calculates the prediction signal filter coefficients of "coeff_pred[c][cy][cx]" according to the calculation expression shown in Expression 20. As shown in Expression 20, as in the case of the prediction signal filter coefficient of "coeff_pred[c][cy][cx]" at the center position, each of the prediction signal filter coefficients of "coeff_pred[c][cy][cx]" at the positions other than the center position is coded as a difference filter coefficient of "filter_hint_pred[c][cy][cx]" under a predetermined condition, and is calculated by summing the difference filter coefficient of "filter_hint_pred[c][cy][cx]" and the corresponding reconstructed signal filter coefficient of "coeff_rec[c][oy][ox]".

In addition, when the prediction signal filter coefficients of "coeff_pred[c][cy][cx]" are calculated according to Expression 17 to Expression 20, the post filter 640 calculates prediction error signal filter coefficients of "coeff_qpe[c][cy][cx]" according to Expression 21 in FIG. 23C.

FIG. 23C is a diagram showing an expression for calculating a filter coefficient for the quantized prediction error signal.

As shown in Expression 21 in FIG. 23C, each of the prediction error signal filter coefficients of "coeff_qpe[c][cy][cx]" is coded as a difference filter coefficient under a predetermined condition irrespective of whether or not the filter coefficient is at the center position, and is calculated by summing the difference filter coefficient of "filter_hint_qpe[c][cy][cx]" and the corresponding prediction filter coefficient of "coeff_pred[c][oy][ox]".

In the cases where some tendencies are observed, the coding efficiency in such a case where filter coefficients are calculated according to Expression 17 to Expression 21 in FIG. 23A to FIG. 23C may be higher than the coding efficiency in the cases where filter coefficients are calculated according to Expression 9 and Expression 10 in FIG. 20B and FIG. 20C. The aforementioned some tendencies consist of the earlier-mentioned first to third tendencies, and the fourth and fifth tendencies indicated below. The fourth tendency is that the reconstructed signal filter coefficient "coeff_rec" at the positions other than the center position are always approximately the same as the prediction signal filter coefficients "coeff_pred" at the positions other than the center position. The fifth tendency is that the prediction error signal filter coefficient "coeff_qpe" at the positions other than the center position are always approximately the same as the prediction signal filter coefficients "coeff_pred" at the positions other than the center position.

The second example (filter_hint_type[c]=2) relates to a post filter design and process in the case where coefficients of two one-dimensional (1D) FIR filters are transmitted.

The filter coefficients for post filtering of the reconstructed video signal, the prediction signal, and the quantized prediction error signal are calculated from the received difference filter data as represented by Expression 22 to Expression 27 in FIG. 24A to FIG. 24C. In other words, the post filter 640 of the video decoding apparatus 600 calculates the filter coefficients according to Expression 22 and Expression 27.

FIG. 24A is a diagram showing an expression for calculating the filter coefficients for the reconstructed video signal.

As shown in Expression 22 in FIG. 24A, the x component (coeff_rec_x[c][cx]) of a reconstructed signal filter coefficient that is a filter coefficient for a reconstructed video signal is calculated based on the values of "filter_hint_rec_x[c][cx]", "filter_hint_size_rec_x", and "Wiener_Filter_Precision[c]" which are included in the difference filter data.

In addition, as shown in FIG. 23 in FIG. 24A, the y component (coeff_rec_y[c][cy]) of the reconstructed signal filter coefficient that is a filter coefficient for the reconstructed video signal is calculated based on the values of "filter_hint_rec_y[c][cx]", "filter_hint_size_rec_y", and "Wiener_Filter_Precision[c]" which are included in the difference filter data.

FIG. 24B is a diagram showing an expression for calculating the filter coefficients for the prediction signal.

As shown in Expression 24 in FIG. 24B, the x component (coeff_pred_x[c][cx]) of a prediction signal filter coefficient that is a filter coefficient for the prediction signal is calculated based on the x component (coeff_rec_x[c][ox]) of the reconstructed signal filter coefficient, on the value of "Wiener_Filter_Precision[c]", and on the values of "filter_hint_pred_x[c][cx]", "filter_hint_size_pred_x", and "filter_hint_size_rec_x" which are included in the difference filter data.

In addition, as shown in FIG. 25 in FIG. 24B, the y component (coeff_pred_y[c][cy]) of the prediction signal filter coefficient that is a filter coefficient for the prediction signal is calculated based on the y component (coeff_rec_y[c][oy]) of the reconstructed signal filter coefficient, on the value of "Wiener_Filter_Precision[c]", and on the values of "filter_hint_pred_y[c][cy]", "filter_hint_size_pred_y", and "filter_hint_size_rec_y" which are included in the difference filter data.

FIG. 24C is a diagram showing an expression for calculating a filter coefficient for the quantized prediction error signal.

As shown in Expression 26 in FIG. 24C, the x component (coeff_qpe_x[c][cx]) of the prediction error signal filter coefficient that is a filter coefficient for a quantized prediction error signal is calculated based on the x component (coeff_pred_x[c][ox]) of the prediction signal filter coefficient, and on the values of "filter_hint_qpe_x[c][cx]", "filter_hint_size_qpe_x", and "filter_hint_size_pred_x" which are included in the difference filter data.

As shown in Expression 27 in FIG. 24C, the y component (coeff_qpe_y[c][cx]) of the prediction error signal filter coefficient that is a filter coefficient for a quantized prediction error signal is calculated based on the y component (coeff_pred_y[c][ox]) of the prediction signal filter coefficient, and on the values of "filter_hint_qpe_y[c][cx]", "filter_hint_size_qpe_y", and "filter_hint_size_pred_y" which are included in the difference filter data.

As in the above-described first example, the post filter 640 first calculates the filter coefficients ("coeff" in the name of the variable) for filtering the reconstructed video signal ("rec" in the name of the variable), calculates, based on the filter coefficients, the filter coefficients for filtering the prediction signal ("pred" in the name of the variable), and calculates, based on the latter filter coefficients, the filter coefficients for filtering the quantized prediction error signal ("qpe" in the name of the variable). In addition, in the calculation of the respective filter coefficients, the post filter 640 separately calculates the filter coefficients for horizontal filtering (the horizontal direction is indicated as "_x" in the name of the variable) and vertical filtering (the vertical direction is indicated as "_y" in the name of the variable).

Next, the post filter 640 performs horizontal filtering in post filtering, using the calculated filter coefficients.

FIG. 25 is a diagram showing the horizontal filtering.

As shown in Expression 28 in FIG. 25, the value (filtered_image_x[c][y][x]) that is at the position (x, y) of a color component c and to which the horizontal filtering in the post filtering is already applied is calculated based on (i) "coeff_rec_x[c][i]", "coeff_pred_x[c][i]", and "coeff_qpe_x[c][i]" which are x components of the filter coefficients, (ii) "rec_image[c]", "pred_image[c]", "qpe_image[c]", and (iii) "filter_hint_size_rec_x" "filter_hint_size_pred_x", and "filter_hint_size_qpe_x".

Next, the post filter 640 performs normalization and clipping of the horizontally filtered signal (filtered_image_x[c][y][x]), according to FIG. 26 (Expression 29).

FIG. 26 is a diagram showing a calculation expression for normalization and clipping on a horizontally filtered signal.

As shown in Expression 29 in FIG. 26, the horizontally filtered signal (filtered_image_clipped_x[c][y][x]) already normalized and clipped is set to a value within a range of 0 to 255 by application of inverse quantization and a FLOOR function to "filtered_image_x[c][y][x]".

Next, the post filter 640 performs vertical filtering in post filtering.

FIG. 27 is a diagram showing the vertical filtering.

As shown in Expression 30 in FIG. 27, the value (filtered_image_xy[c][y][x]) that is at the position (x, y) of a color component c and to which the vertical filtering in the post filtering is applied is calculated based on (i) "coeff_rec_y[c][j]", "coeff_pred_y[c][j]", and "coeff_qpe_y[c][j]" which are y components of the filter coefficients, (ii) the horizontally filtered signal (filtered_image_clipped_x[c]) already normalized and clipped, (iii) "pred_image[c]" and "qpe_image[c]", (iv) "filter_hint_size_rec_y", "filter_hint_size_pred_y", and "filter_hint_size_qpe_y", and (v) an offset (filter_hint_offset [c]).

Next, the post filter 640 performs normalization and clipping of the horizontally and vertically filtered signal (filtered_image_xy[c][y][x]), according to Expression 31 in FIG. 28.

FIG. 28 is a diagram showing a calculation expression for normalization and clipping on a horizontally and vertically filtered signal.

As shown in Expression 31 in FIG. 28, the horizontally and vertically filtered signal (filtered_image_clipped_xy[c][y][x]) already normalized and clipped is set to a value within a range of 0 to 255 by application of inverse quantization and a FLOOR function to "filtered_image_xy[c][y][x]".

In each of the above expressions, "filtered_image[c]" is the value corresponding to the color component c after the post filtering process, "rec_image[c]" is the value corresponding to the color component c of the reconstructed video signal, "pred_image[c]" is the value corresponding to the color component c of the prediction signal, and "qpe_image[c]" is the value corresponding to the color component c of the quantized prediction error signal. Here, c=0 corresponds to a luma component, and c=1 and c=2 correspond to two chroma components.

The third example (filter_hint_type[c]=1) relates to a post filter design and process in the case where coefficients of a cross correlation matrix are transmitted.

First, as shown in FIG. 29A (Expression 32), the post filter 640 calculates the elements of the cross correlation matrix between the original image (video signal) and the decoded image (reconstructed video signal).

FIG. 29A is a diagram showing an expression for calculating elements in a cross correlation matrix corresponding to the reconstructed video signal.

Figures 31, 32:
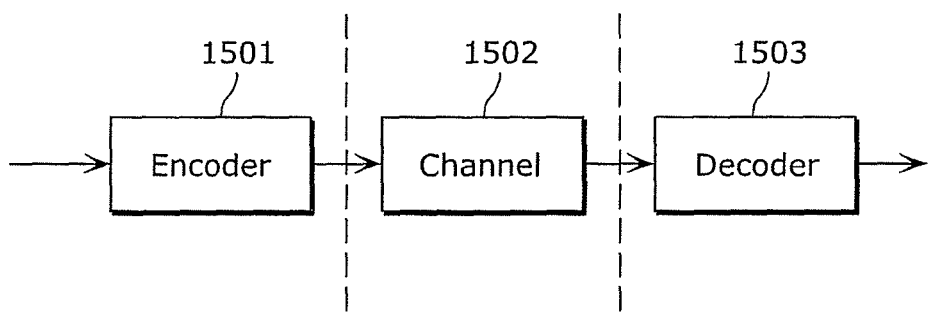
FIG. 31 shows neighbouring blocks in the neighborhood of a current block to be coded/decoded according to the embodiment.
FIG. 32 is a diagram showing a system according to the embodiment.

As shown in FIG. 32 in FIG. 29A, the elements of a cross correlation matrix "cc_rec" between the video signal and the reconstructed video signal are calculated according to calculation expressions that are selectively used for the positions, the center position or the positions other than the center position, of the filtering range of the reconstructed video signal.

Next, as shown in Expression 33 in FIG. 29B, the post filter 640 calculates elements of a cross correlation matrix between the original image (video signal) and the prediction image (prediction signal).

FIG. 29B is a diagram showing an expression for calculating elements in a cross correlation matrix corresponding to the prediction signal.

As shown in Expression 33 in FIG. 29B, the elements of the cross correlation matrix "cc_pred" between the video signal and the prediction signal are calculated according to calculation expressions that are selectively used for the positions, the center position or the positions other than the center position, of the filtering range of the prediction signal. In addition, at the center position, the element of the cross correlation matrix "cc_pred" is calculated using the elements of the cross correlation matrix "cc_rec" calculated according to Expression 32.

Next, as shown in Expression 34 in FIG. 29C, the post filter 640 calculates the elements of the cross correlation matrix between the original image (video signal) and the quantized prediction error image (quantized prediction error signal).

FIG. 29C is a diagram showing an expression for calculating elements in a cross correlation matrix corresponding to the quantized prediction error signal.

As shown in Expression 34 in FIG. 29C, the elements of the cross correlation matrix "cc_qpe" between the video signal and the quantized prediction error signal are calculated according to calculation expressions that are selectively used for the positions, the center position or the positions other than the center position, of the filtering range of the quantized prediction error signal. In addition, at the center position, the element of the cross correlation matrix "cc_qpe" is calculated using the elements of the cross correlation matrix "cc_pred" calculated according to Expression 33.

It is possible to calculate the filter coefficients of a post filter that is a Wiener filter by using the cross correlation matrices calculated in this way. Thus, it is possible to perform filtering by the aforementioned two-dimensional (2D) FIR filter by using the calculated filter coefficients together with "filter_hint_offset[c]".

The fourth example (filter_hint_type[c]=3) relates to a post filter design and process in the case where two cross correlation vectors are transmitted.

First, the post filter 640 calculates the elements of each of two cross correlation vectors (the horizontal cross correlation vector and the vertical cross correlation vector) between the original image (video signal) and the decoded image (reconstructed video signal).

FIG. 30A is a diagram showing an expression for calculating the elements of a horizontal cross correlation motion vector corresponding to the reconstructed video signal.

Figure 35:
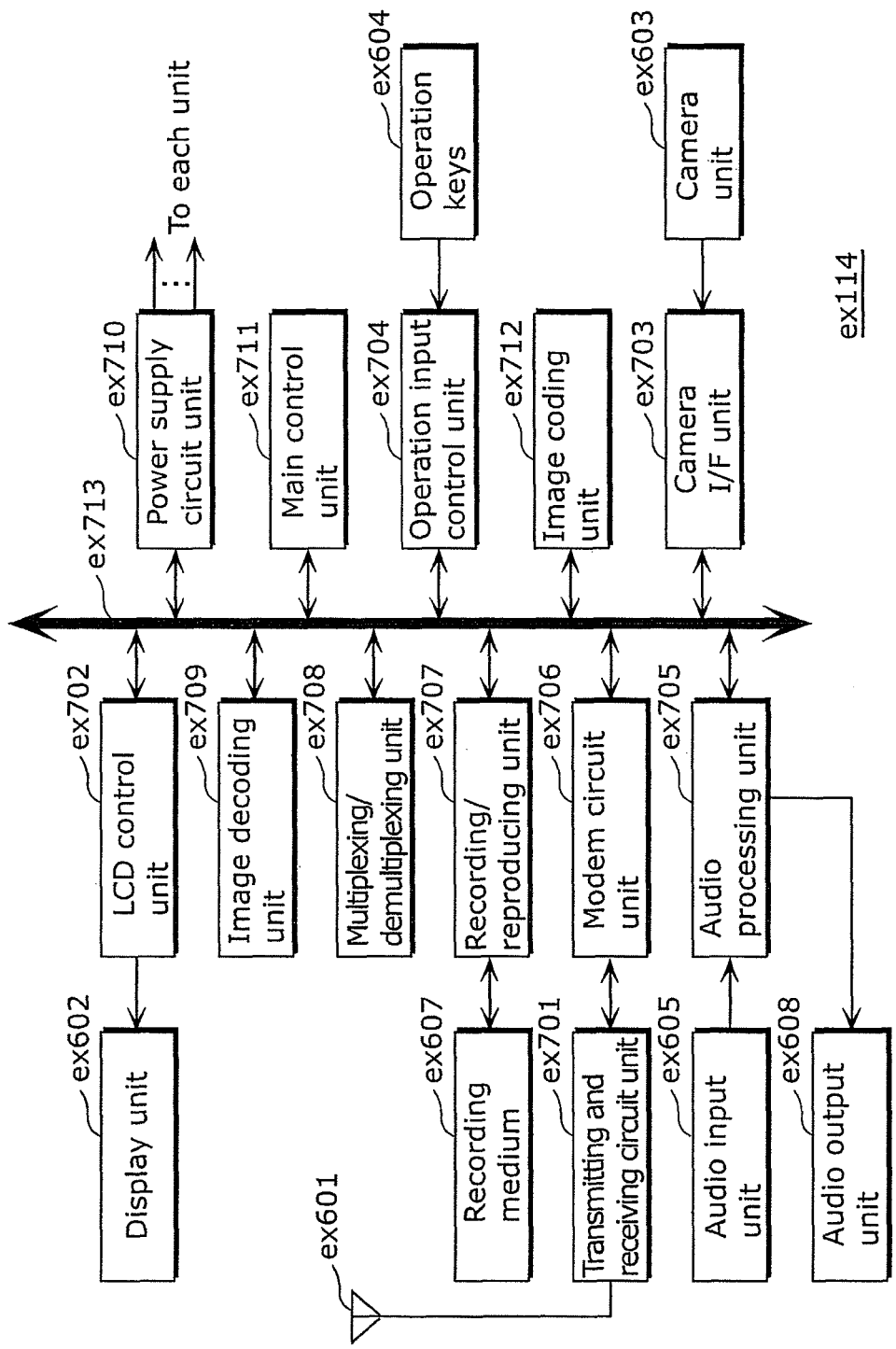
FIG. 35 is a block diagram showing an example of a structure of the mobile phone.

As shown in FIG. 35 in FIG. 30A, the elements of a horizontal cross correlation vector "cc_rec_x[c][cx]" between the video signal and the reconstructed video signal are calculated according to calculation expressions that are selectively used for the positions, the center position or the positions other than the center position, of the filtering range of the reconstructed video signal.

FIG. 30B is a diagram showing an expression for calculating the elements of the vertical cross correlation motion vector corresponding to the reconstructed video signal.

Figure 36:
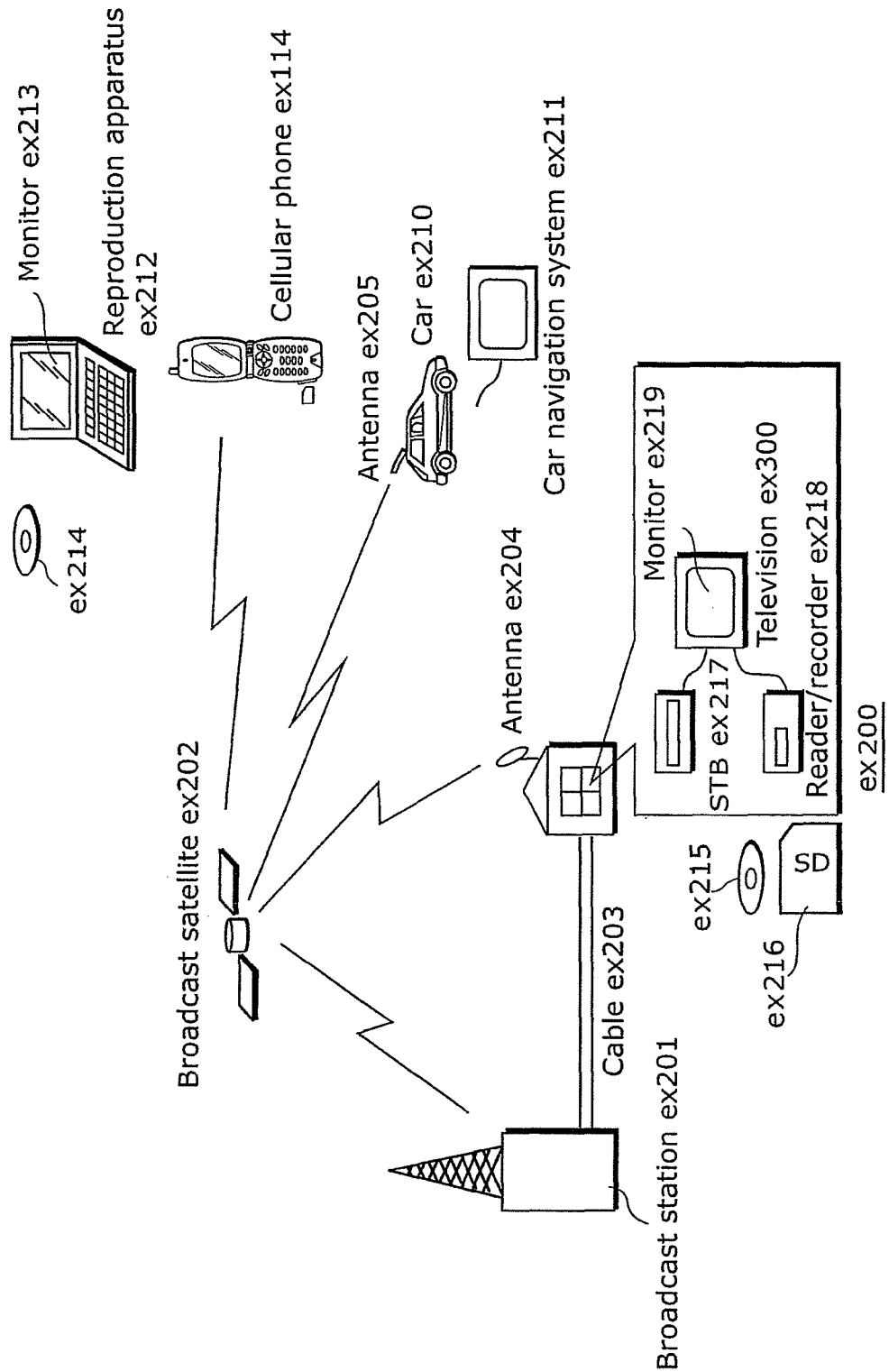
FIG. 36 schematically shows an example of an overall configuration of a digital broadcasting system.

As shown in FIG. 36 in FIG. 30B, the elements of the vertical cross correlation vector "cc_rec_y[c][cy]" between the video signal and the reconstructed video signal are calculated according to calculation expressions that are selectively used for the positions, the center position or the positions other than the center position, of the filtering range of the reconstructed video signal.

Next, the post filter 640 calculates the elements of each of two cross correlation vectors (the horizontal cross correlation vector and the vertical cross correlation vector) between the original image (video signal) and the prediction image (prediction signal).

FIG. 30C is a diagram showing an expression for calculating the elements of a horizontal cross correlation motion vector corresponding to the prediction signal.

As shown in Expression 37 in FIG. 30C, the elements of a horizontal cross correlation vector "cc_pred_x" between the video signal and the prediction signal are calculated according to calculation expressions that are selectively used for the positions, the center position or the positions other than the center position, of the filtering range of the prediction signal. In addition, at the center position, the elements of the cross correlation matrix "cc_rec" are calculated using the elements of the horizontal cross correlation vector "cc_rec_x" calculated according to Expression 35.

FIG. 30C is a diagram showing an expression for calculating the elements of a vertical cross correlation vector corresponding to the prediction signal.

As shown in Expression 38 in FIG. 30D, the elements of a vertical cross correlation vector "cc_pred_y" between the video signal and the prediction signal are calculated according to calculation expressions that are selectively used for the positions, the center position or the positions other than the center position, of the filtering range of the prediction signal. In addition, at the center position, the elements of the vertical cross correlation vector "cc_pred_y" are calculated using the elements of the horizontal cross correlation vector "cc_pred_y" calculated according to Expression 36.

Next, the post filter 640 calculates the elements of each of two cross correlation vectors (the horizontal cross correlation vector and the vertical cross correlation vector) between the original image (video signal) and the quantized prediction error image (quantized prediction error signal).

FIG. 30E is a diagram showing an expression for calculating the elements of the horizontal cross correlation motion vector corresponding to the quantized prediction error signal.

As shown in Expression 39 in FIG. 30E, the elements of the horizontal cross correlation vector "cc_qpe_x" between the video signal and the quantized prediction error signal are calculated according to calculation expressions that are selectively used for the positions, the center position or the positions other than the center position, of the filtering range of the quantized prediction error signal. In addition, at the center position, the elements of the cross correlation matrix "cc_pred_x" are calculated using the elements of the horizontal cross correlation vector "cc_pred_x" calculated according to Expression 37.

FIG. 30F is a diagram showing an expression for calculating the elements of each of vertical cross correlation vectors corresponding to the quantized prediction error signal.

As shown in Expression 40 in FIG. 30F, the elements of the vertical cross correlation vector "cc_qpe_y" between the video signal and the quantized prediction error signal are calculated according to calculation expressions that are selectively used for the positions, the center position or the positions other than the center position, of the filtering range of the quantized prediction error signal. In addition, at the center position, the elements of the vertical cross correlation vector "cc_qpe_y" are calculated using the elements of the vertical cross correlation vector "cc_pred_y" calculated according to Expression 38.

It is possible to calculate the filter coefficients of the post filter that is a horizontal Wiener filter and the filter coefficients of the post filter that is a vertical Wiener filter by using the cross correlation vectors calculated respectively. Thus, it is possible to perform filtering using the aforementioned two one-dimensional (1D) FIR filters by using the calculated filter coefficients together with "filter_hint_offset[c]".

In the above examples, the filter coefficients of the reconstructed video signal are calculated first, the filter coefficients of the prediction signal are calculated based on the firstly calculated filter coefficients, and based on the latter, the filter data of the quantized prediction error signal are calculated. However, the respective filter coefficients may be calculated according to another calculation order. For example, the filter coefficients of the quantized prediction error signal may be calculated first. Alternatively, the filter coefficients of the quantized prediction error signal may be calculated based on the filter coefficients of the reconstructed video signal. It is also possible to perform such a calculation process for the filter coefficients according to other dependency relationships and/or calculation orders.

At the encoder, the filter coefficients and the cross correlation data need to be quantized before they are coded and transmitted. In the case where the encoder represents, using a floating point, the example value "coeff_double", which can be for instance a filter coefficient or cross correlation data, the corresponding quantization is performed according to the following Expression 41. Here, it is also good to perform quantization such that the filter coefficients are transformed into integer numbers. In addition, the encoder may quantize and transmit all the filter coefficients (filter hints) respectively corresponding to the reconstructed video signal, the prediction signal, and the quantized prediction error signal.

[Math. 11]

$$coeff = \begin{cases} \left\lfloor \dfrac{coeff\_double \cdot}{Wiener\_Filter\_Precision + 0.5} \right\rfloor; & coeff\_double \geq 0 \\ -\left\lfloor \dfrac{(-coeff\_double) \cdot}{Wiener\_Filter\_Precision + 0.5} \right\rfloor; & coeff\_double < 0 \end{cases} \quad \text{Expression 41}$$

The previously described syntax, semantics and application of the filter data at the decoder are mere examples in a case. In general, the syntax elements for signaling the filter data may differ from the case. In particular, the filter data does not necessarily need to be provided on a per frame basis. The filter data may be transmitted regularly for each several frames, or the presence of the filter data in a frame may be irregularly signaled with a flag for signal communication. Moreover, the filter data may be signaled for a part of a video frame such as a slice, a predefined set of macroblocks, a macroblock, and/or a block. Local adaptation of the filter characteristics enables enhancement of image quality. In particular, the image quality is enhanced in images with parts having substantially different spatial and/or temporal characteristics.

The utilization of the statistical relationship (cross correlation) between filter coefficients (or between offsets, or between correlation information items) is not restricted to the filter coefficients of only one color component. The statistical dependency relationships (cross correlations) between the filter coefficients of different color components may be utilized as well. This is because color component signals generally have a cross correlation, and may result in correlated filter data. Thus, the filter information (data) of different color components may also be coded using these dependency relationships, for instance, by predictive coding, transform coding, or coding based on a Markov model. Other kinds of coding using the statistical relationships between color components may also be used. Examples of such coding include run-length coding and entropy coding involving codeword table switching or coding of a combination of a plurality of filter data items into a single codeword.

Furthermore, it is also good to use statistical dependency relationships (cross correlation) between the filter data of different image areas in order to code the filter data.

FIG. 31 shows blocks in the neighborhood of a current block to be coded/decoded.

In the case of determining the filter data on a per block basis, it is also good to code the filter data of the current block using the statistical relationships (cross correlation) between the current block and already decoded neighbouring blocks (such as blocks m=2, . . . , 5). However, it is also good to determine the filter data for areas other than block-based areas. Alternatively, it is also good to perform coding involving, for example, prediction and transform as described above, by using the dependency relationships between the filter data corresponding to these areas. Moreover, such image areas, the filter data of which is coded using their statistical relationships, may also be located in different images (for example, at the corresponding positions, or at the motion compensation positions).

It is also good to code the filter precision (Wiener_Filter_Precision) as quantization information of the filter data for each or all of the signals and/or color components, and transmit the coding result as "Wiener_Filter_Precision[c]" to the decoder. However, the precision may also be fixedly defined.

The signal prediction scheme for predicting the filter coefficients may also be signaled. This is advantageous especially in the cases where an adaptive prediction scheme is applied.

In general, the filter data may be determined for filtering using a finite impulse response (FIR) filter or an infinite impulse response (IIR) filter. The filter may be a two-dimensional (2D) non-separable filter or a one-dimensional (1D) separable filter.

The filters for filtering different color components and/or signals (a prediction signal, a quantized prediction error signal, and a reconstructed signal) may have the same fixed length in order not to repeat signaling the filter order therefor. However, the filter length may also be coded for each color component and individually for the quantized prediction error signal, the prediction signal, and the reconstructed video signal. The filter length may be coded using the statistical relationships (cross correlations) between the filter length for filtering the different signals and/or color components. Accordingly, predictive coding, transform coding, or Markov coding, or any other coding may be applied to the filter length information.

The filter coefficients for the prediction (video) signal and the quantized prediction error signal may be the same due to a joint encoder optimization, and thus have to be transmitted only once. In such a case, the fact that the filter coefficients are the same may be signaled.

The options of the filter data for different signals to be filtered and/or different color components may be restricted in order to reduce the size of the filter data to be signaled. One example is the restriction of using a symmetric filter for at least one of the to-be-filtered signals (a decoded signal, a prediction signal, and a quantized prediction error signal) and/or color component signals. Another example is the restriction of using equivalent filters for two or three of the three signals (a decoded signal, a prediction signal, and a quantized prediction error signal) and/or color components.

Alternatively, some of the filter coefficients may be set fixedly. The values of the fixed filter coefficients may also be signaled less frequently than the variable filter coefficients. For example, the values of the fixed filter coefficients may be included in the sequence header only.

Regarding the syntax, it is possible to add codewords to the coded video signal and filter data, and thereby to signal information indicating for which of the three signals (a decoded signal, a prediction signal, and a quantized prediction error signal), filter coefficients are coded and transmitted. For example, each of three bits which consist of a codeword signals the presence of filter data for a corresponding one of the decoded signal, the prediction signal, and the quantized prediction error signal. Such signaling may be performed, for example, by including such codeword in a sequence, a frame, or a slice header.

For future extension, the codeword "additional_extension_flag" may be included.

FIG. 32 is a diagram showing a system according to this embodiment of the present invention.

In this system, a coded video signal is transmitted from an encoder 1501 side to a decoder 1503 side. The encoder 1501 is either a video coding apparatus 500 or a video coding apparatus 700, and the decoder 1503 is either a video decoding apparatus 600 or a video decoding apparatus 800. An input video signal is coded by an encoder 1501 and provided to a channel 1502. As described above, the encoder 1501 is an encoder according to any of the embodiments of the present invention. The channel 1502 is either a storage medium or any transmission channel. Examples of such a storage medium include a volatile memory or a non-volatile memory, a magnetic medium or an optical medium, a large-capacity storage medium, etc. The transmission channel may be formed by physical resources of (i) any wireless, wired, fixed, or mobile transmission system such as xDSL, ISDN, WLAN, GPRS, UMTS, Internet, or (ii) any standardized or proprietary system. Apart from the encoder, the encoder side may also selectively include: a pre-processing unit which performs preprocessing such as format conversion on a video signal; a transmitter which transmits the coded video signal over the channel 1502; and an application program for transferring the coded video signal to the storage medium. The coded video signal is then obtained from the channel 1502 by a decoder 1503. As described above, the decoder 1503 is a decoder according to any of the embodiments of the present invention. The decoder decodes the coded video signal. Apart from the decoder, the decoder side may further selectively include: a receiver for receiving the coded video signal from a transmission channel; an application program for extracting the coded video signal from the storage medium; and a post processing unit which performs post processing such as format conversion on the decoded video signal.

The post filter design units 540 and 730 in this embodiment determine the filter data or filter coefficients using the reconstructed video signal, the prediction signal, and the quantized prediction error signal. However, the post filter design units 540 and 730 may determine the filter data or filter coefficients using at least two of these signals. In addition, the post filter design units 540 and 730 may use a prediction error signal instead of the quantized prediction error signal. Likewise, the post filters 640 and 840 in this embodiment apply the filter data or filter coefficients to the reconstructed video signal, the prediction signal, and the quantized prediction error signal. However, the post filter design units 540 and 730 may apply the filter data or filter coefficients to at least two of these signals. In addition, the post filters 640 and 840 may apply the filter data or the filter coefficients to a prediction error signal instead of the quantized prediction error signal.

Embodiment 2

The processing described in the above embodiment can be simply implemented by an independent computer system, by recording, in a recording medium, a program for implementing the configurations for the video coding method and the video decoding method described in the above embodiment. The recording medium may be any recording medium as long as the program can be recorded, such as a magnetic disk, an optical disk, a magnetic optical disk, an IC card, and a semiconductor memory.

Hereinafter, the applications to the video coding method and the video decoding method described in the above embodiment and systems using thereof will be described.

Figure 33:
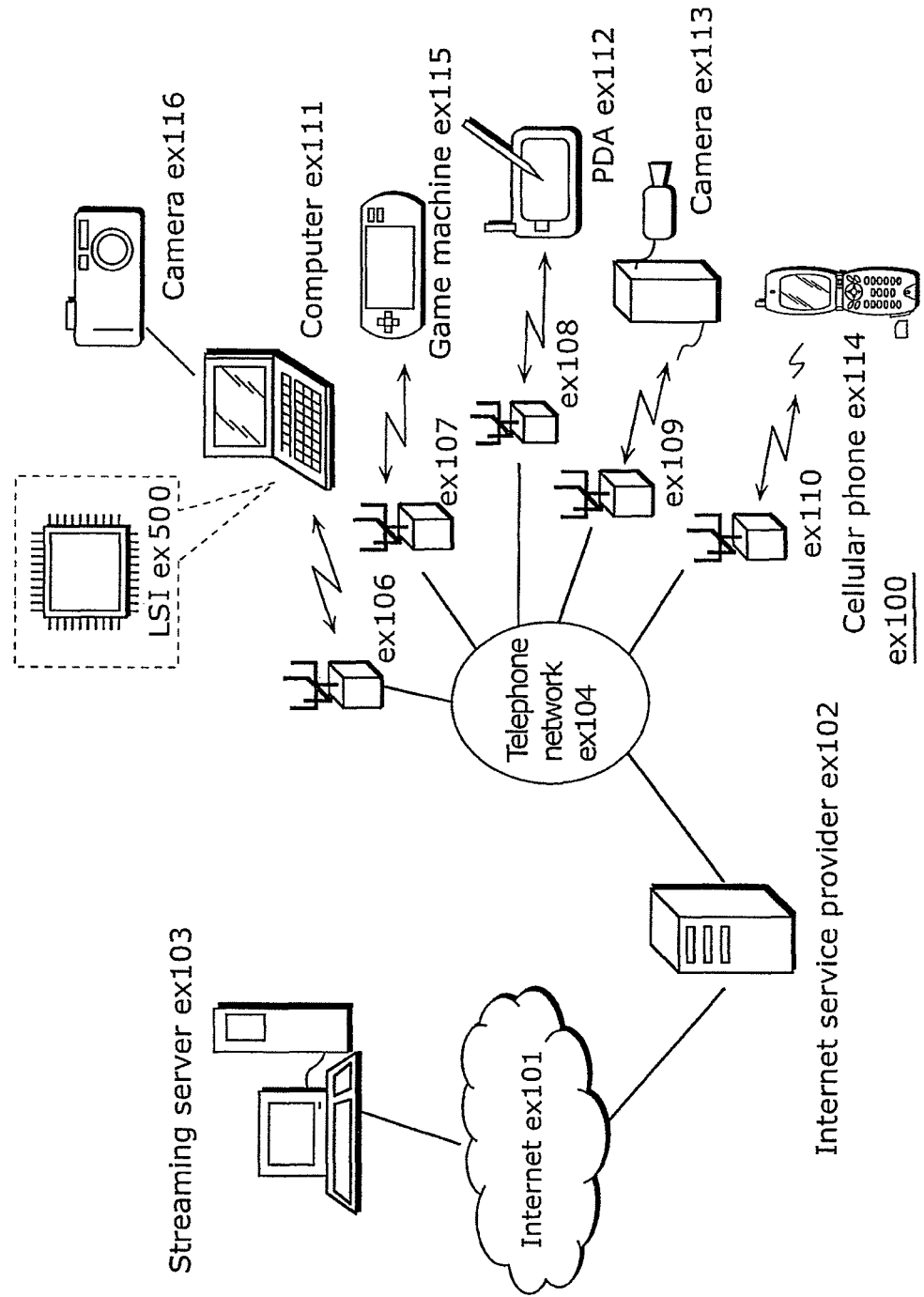
FIG. 33 is a schematic diagram showing an example of an overall configuration of a content providing system which realizes content distribution services.

FIG. 33 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 33, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in the above embodiment, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an Large Scale Integrated (LSI) circuit ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the video coding method and the video decoding method shown in the above embodiment may be used.

The cellular phone ex114 will be described as an example of such a device.

Figure 34:
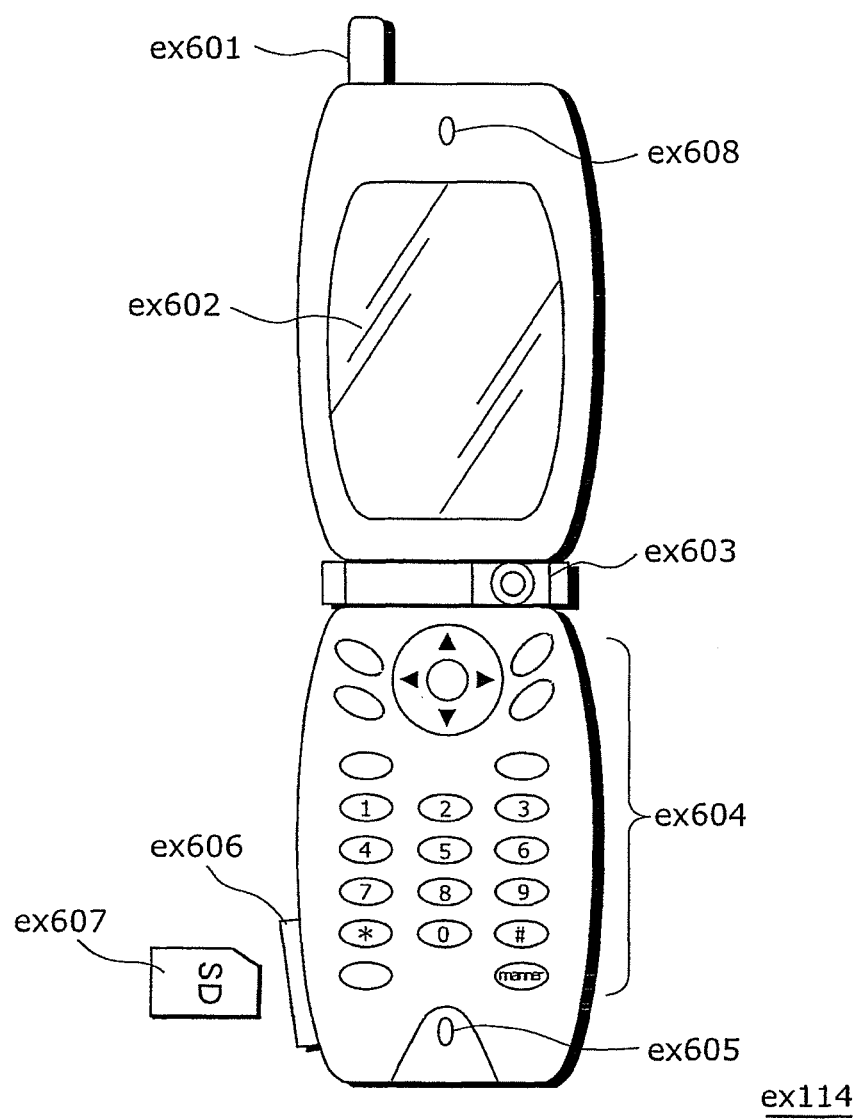
FIG. 34 is an external view of a mobile phone.

FIG. 34 illustrates the cellular phone ex114 that uses the video coding method and the video decoding method described in the above embodiment. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Next, the cellular phone ex114 will be described with reference to FIG. 35. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera I/F unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera I/F unit ex703. When the image data is not transmitted, the image data captured by the camera unit ex603 can be displayed directly on the display unit ex602 via the camera I/F unit ex703 and the LCD control unit ex702.

The image coding unit ex712 including the video coding apparatus as described in the present invention compresses and codes the image data supplied from the camera unit ex603 using the video coding method employed by the video coding apparatus as shown in the above embodiment so as to transform the data into coded image data, and sends the data out to the multiplexing/demultiplexing unit ex708. Furthermore, the cellular phone ex114 simultaneously sends out, as digital audio data, the audio received by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bitstream of image data and that of audio data, and supplies the coded image data to the image decoding unit ex709 and the audio data to the audio processing unit ex705, respectively via the synchronous bus ex713.

Next, the image decoding unit ex709 including the video decoding apparatus as described in the present invention decodes the bitstream of the image data using the video decoding method corresponding to the video coding method as shown in the above embodiment so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

The present invention is not limited to the above-mentioned system because terrestrial or satellite digital broadcasting has been in the news lately, and at least either the video coding apparatus or the video decoding apparatus described in the above embodiment can be incorporated into a digital broadcasting system as shown in FIG. 36. More specifically, a broadcast station ex201 communicates or transmits, via radio waves to a broadcast satellite ex202, audio data, video data, or a bitstream obtained by multiplexing the audio data and the video data. Upon receipt of the bitstream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bitstream and reproduces the decoded bitstream. Furthermore, a reader/recorder ex218 that reads and decodes such a bitstream obtained by multiplexing image data and audio data that are recorded on recording media ex215 and 216, such as a CD and a DVD may include the video decoding apparatus as shown in the above embodiment. In this case, the reproduced video signals are displayed on a monitor ex219. It is also possible to implement the video decoding apparatus in the set top box ex217 connected to a cable ex203 for a cable television or an antenna ex204 for satellite and/or terrestrial broadcasting, so as to reproduce the video signals on the monitor ex219 of the television ex300. The video decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the video decoding apparatus or the video coding apparatus as shown in the above embodiment can be implemented in the reader/recorder ex218 (i) for reading and decoding the video data, the audio data, or the coded bitstream obtained by multiplexing the video data and the audio data, or (ii) for coding the video data, the audio data, or the coded bitstream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bitstream is recorded. For example, another reproduction apparatus ex212 can reproduce the video signals on a monitor ex213, using a recording medium ex214 on which the coded bitstream is copied.

Furthermore, it is also possible to implement the video decoding apparatus in the set top box ex217 connected to the cable ex203 for a cable television or the antenna ex204 for satellite and/or terrestrial broadcasting, so as to reproduce the video signals on the monitor ex219 of the television ex300. The video decoding apparatus may be included not in the set top box but in the television ex300.

Figure 37:
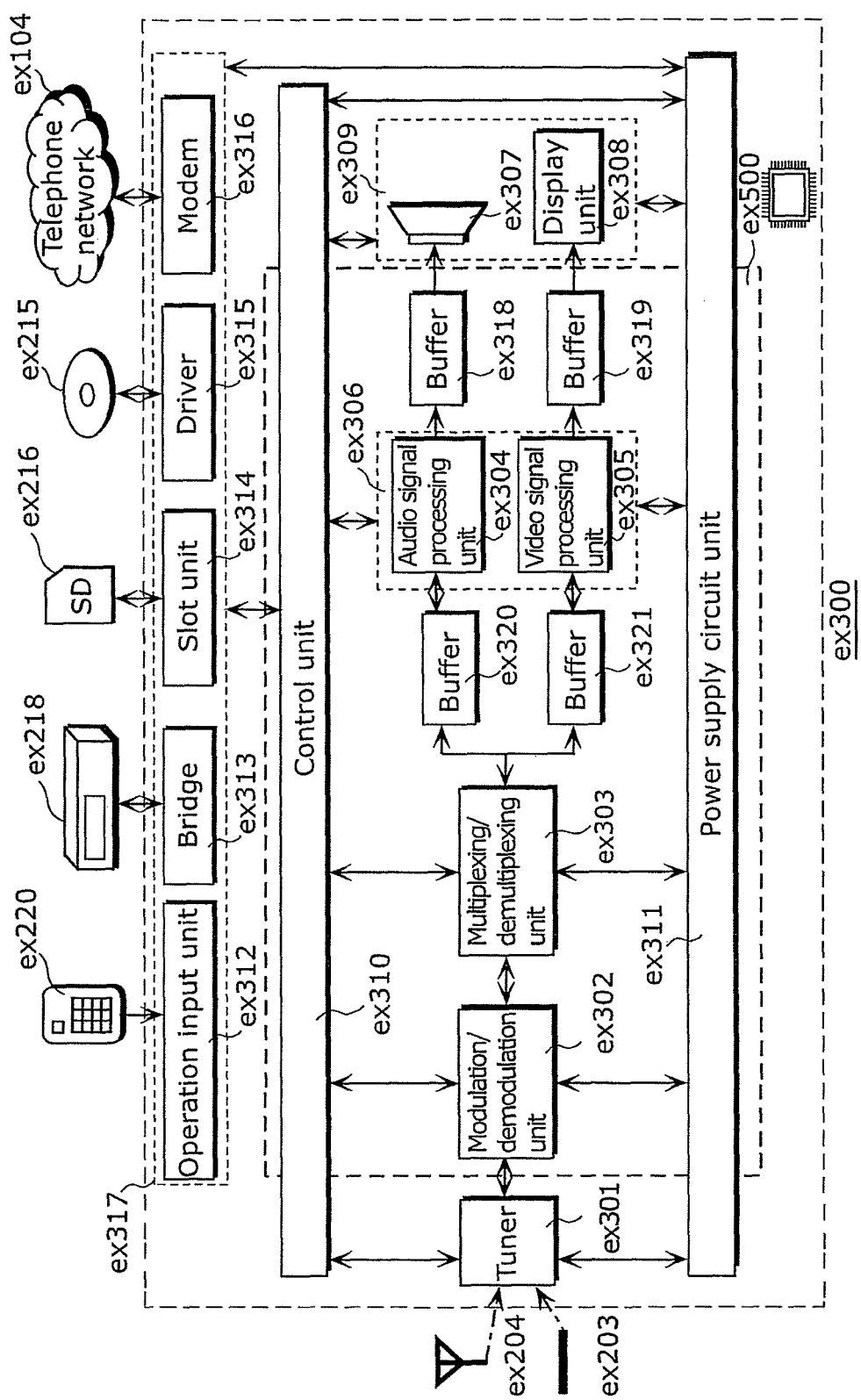
FIG. 37 is a block diagram showing an example of a structure of a television receiver.

FIG. 37 illustrates the television (receiver) ex300 that uses the video coding method and the video decoding method described in the above embodiment. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a configuration will be described in which the television ex300 decodes data obtained from outside through the antenna ex204 and others and reproduces the decoded data. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the video decoding method described in the above embodiment, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and an SD card. Next, a configuration will be described in which the television ex300 codes an audio signal and a video signal, and transmits the data outside or writes the data on a recording medium. In the television ex300, upon receipt of a user operation from the remote controller ex220 and others, the audio signal processing unit ex304 codes an audio signal, and the video signal processing unit ex305 codes a video signal, under control of the control unit ex310 using the video coding method as described in the above embodiment. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bitstream from or in a recording medium, one of the television ex300 and the reader/recorder ex218 may decode or code the coded bitstream, and the television ex300 and the reader/recorder ex218 may share the decoding or coding.

Figure 38:
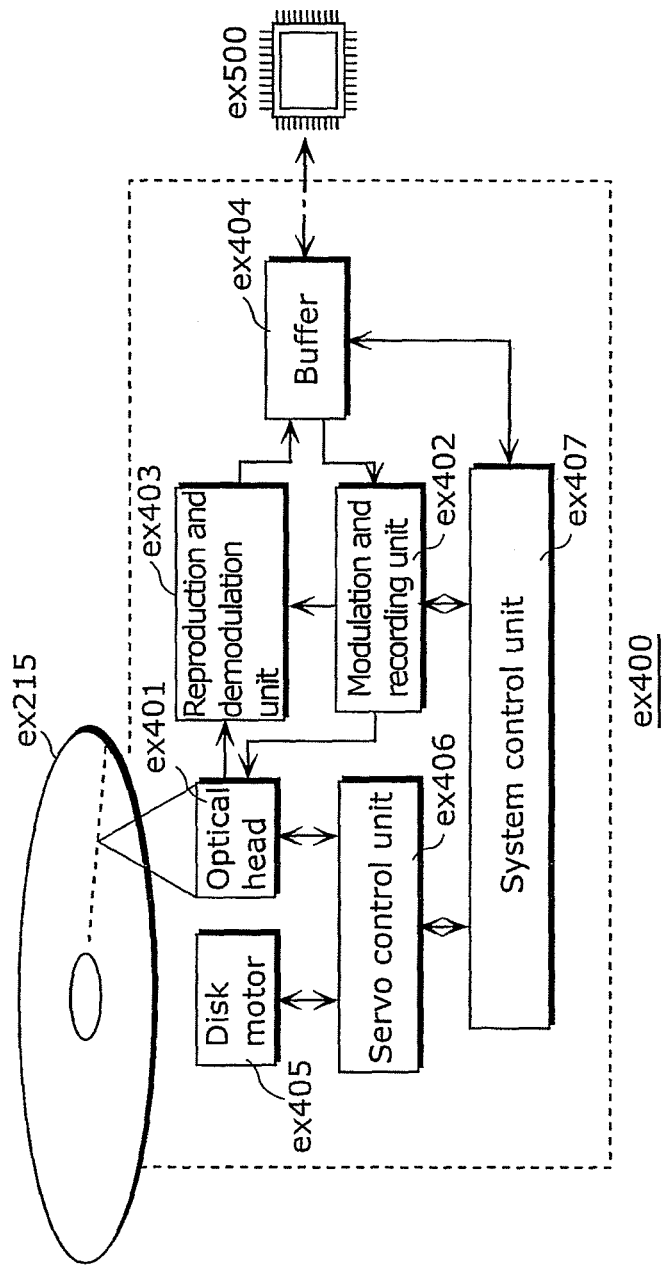
FIG. 38 is a block diagram showing an example of a configuration of an information reproducing and recording unit that reads and writes information from and on a recording medium that is an optical disk.

As an example, FIG. 38 illustrates a configuration of an information reproducing/recording unit ex400 when data is read or written from or in an optical disk. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation and recording unit ex402 electrically drives a semiconductor laser included in the optical head ex401, and modulates the laser light according to recorded data. The reproduction and demodulation unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation and recording unit ex402, the reproduction and demodulation unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 39:
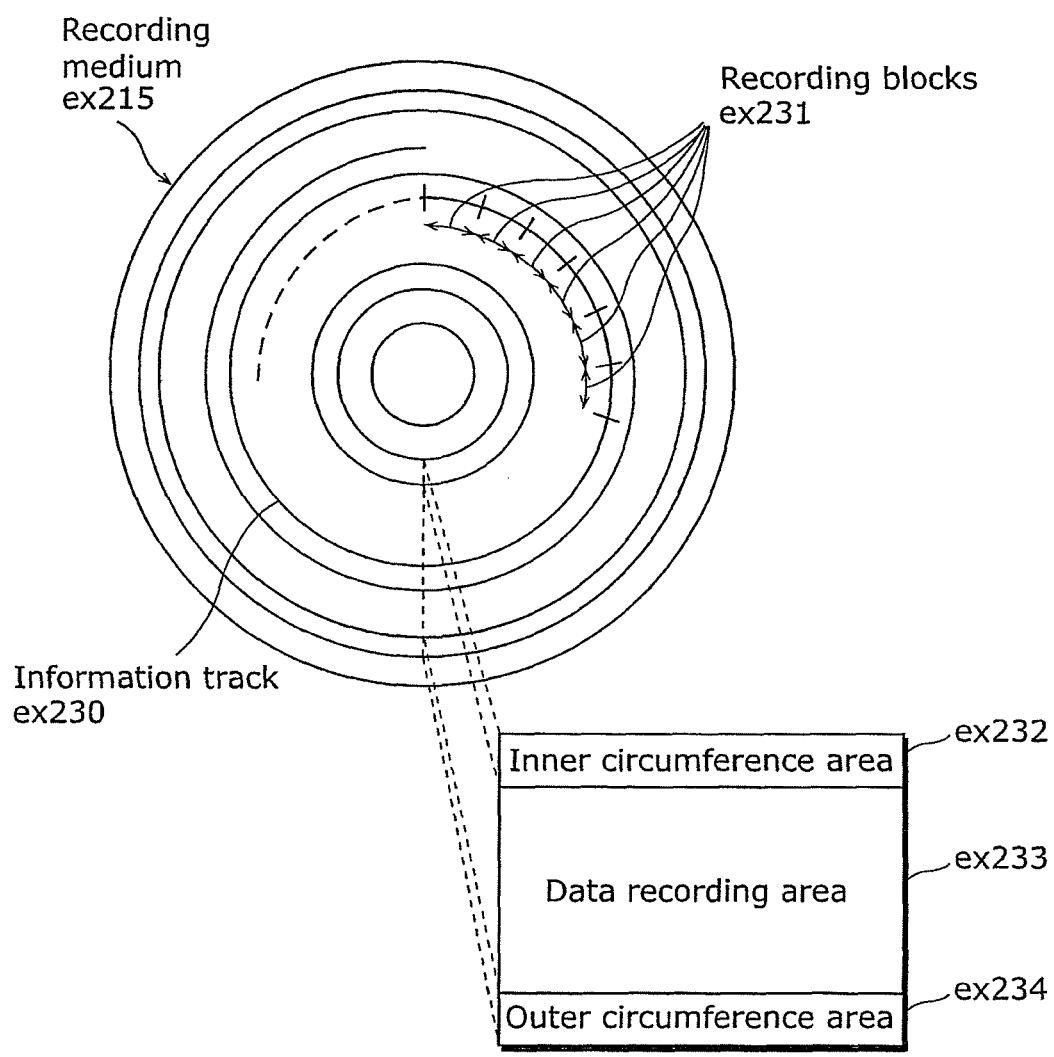
FIG. 39 is a diagram showing an example of a structure of a recording medium that is an optical disk.

FIG. 39 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 37. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the video coding method and the video decoding method in the above embodiment can be used in any of the devices and systems described. Thus, the advantages described in the above embodiment can be obtained.

Furthermore, the present invention is not limited to Embodiments, and various modifications and revisions are possible without departing from the scope of the present invention.

Embodiment 3

Figure 40:
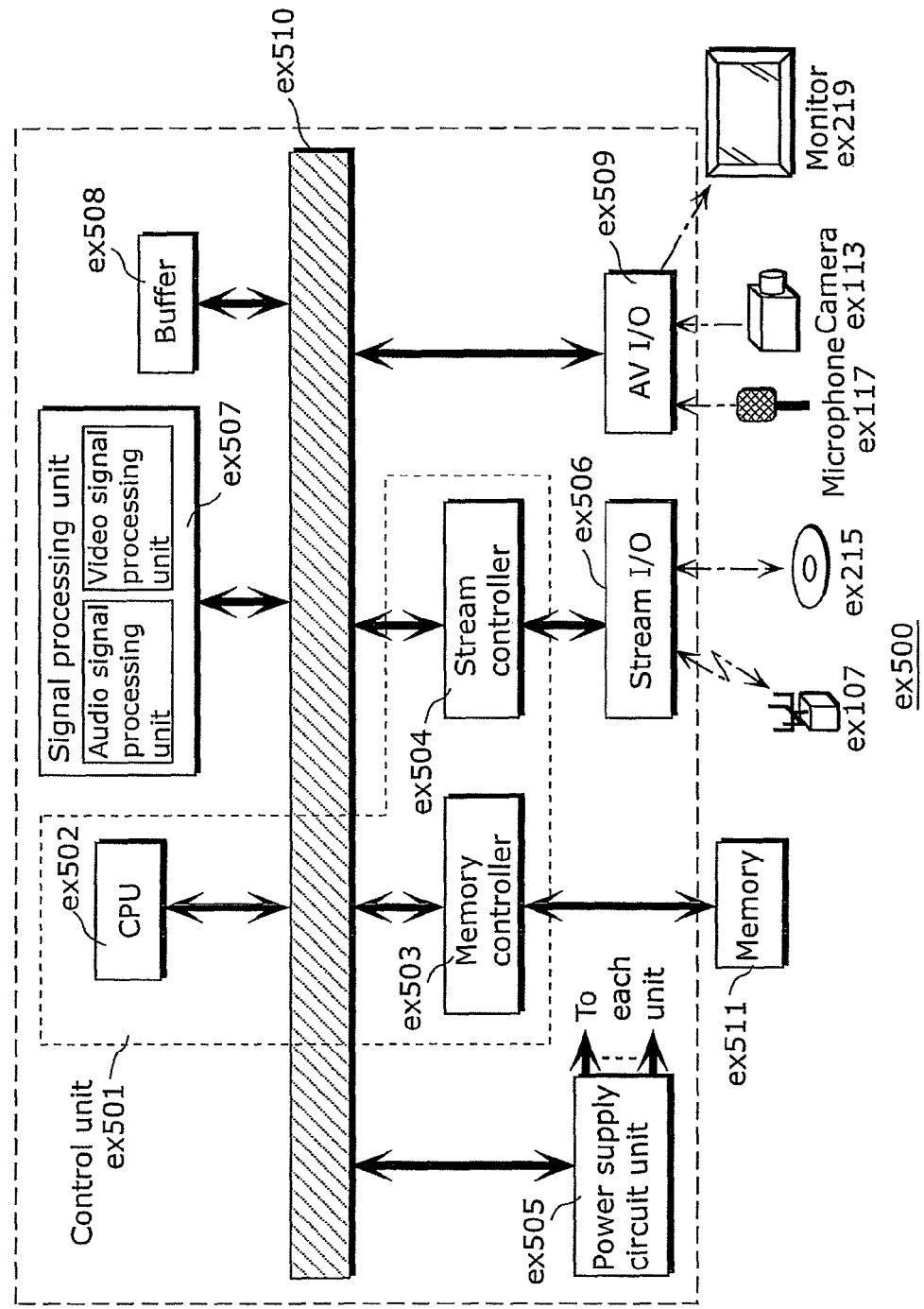
FIG. 40 is a block diagram showing an example of a configuration of an integrated circuit for performing the image coding method and the image decoding method according to each of the embodiments.

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 40 illustrates a configuration of the LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bitstream is transmitted to a base station ex107, or written on the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing reconfiguration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the video coding method, the video coding apparatus, the video decoding method, and the video decoding apparatus according to the present invention have been described based on the exemplary Embodiments, the present invention is not limited to the Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

Most of the examples have been outlined in relation to the H.264/AVC based video coding system. The terms used in the application mainly relates to the H.264/AVC terminology. However, the terms and the descriptions of the various embodiments with respect to the H.264/AVC based coding are not intended to limit the principles and ideas of the present invention to such systems. In addition, the detailed descriptions of the coding and decoding in compliance with the H.264/AVC standard are provided for better understanding of the exemplary embodiments described herein and should not be understood as limiting the present invention to the described specific implementations of processes and functions in the video coding. Nevertheless, the modifications proposed herein may be readily applied in the video coding described above. Furthermore, the concept of the present invention may be also readily used in the enhancements of H.264/AVC coding currently discussed by the JVT.

In summary, the decoding of a video signal according to the present invention involves separately filtering at least two of a prediction signal, a prediction error signal, and a reconstructed video signal, based on filter data provided from the encoder side, and coding of a video signal according to the present invention involves coding filter data by using statistical dependency relationships between the at least two of the prediction signal, the prediction error signal, and the reconstructed video signal.

A video coding method and a video decoding method provide advantageous effects of enabling reduction in the decrease of the efficiency of coding a video and enabling enhancement of the image quality of the resulting decoded video, and is applicable to, for example, video cameras, mobile phones, personal computers, and the like.

REFERENCE SIGNS LIST

105 Subtractor
110 Transform/Quantization unit
120 Inverse transform/Inverse quantization unit
125 Adder
130 Deblocking filter
140 Memory
150 Interpolation filter
160 Motion compensation prediction unit
170 Intra prediction unit
175 Intra/Inter switch
220 Inverse transform/Inverse quantization unit
225 Adder
230 Deblocking filter
240 Memory
250 Interpolation filter
260 Motion compensation prediction unit
270 Intra prediction unit
275 Intra/Inter switch
500 Video coding apparatus
540 Post filter design unit
590 Entropy coding unit
600 Video decoding apparatus
640 Post filter
690 Entropy decoding unit
700 Video coding apparatus
730 Frequency domain post filter design unit
800 Video decoding apparatus
840 Frequency domain post filter

The invention claimed is:

1. A video coding method of coding a video signal, the video coding method comprising:
   generating a prediction signal by predicting the video signal spatially or temporally;
   calculating, as a prediction error signal, a difference between the video signal and the prediction signal;
   generating a reconstructed video signal by reconstructing the video signal, based on the prediction signal and the prediction error signal;
   determining filter data items for filtering the reconstructed video signal; and
   coding the filter data items and the prediction error signal, the coding involving arithmetic coding of the filter data items and the prediction error signal performed by an arithmetic coder,
   wherein in the coding of the filter data items and the prediction error signal, the arithmetic coder is restarted after the arithmetic coding of the filter data items is completed and coding is terminated so as to start the arithmetic coding of the prediction error signal after the restart of the arithmetic coder,
   in the determining of the filter data items, filter data items for filtering at least two signals are determined, each of the at least two signals including the reconstructed video signal and at least one of the prediction signal and the prediction error signal, and
   in the coding of the filter data item, the determined filter data items are coded based on a cross-correlation between the determined filter data items.

2. The video coding method according to claim 1,
wherein in the coding of the filter data items:
prediction data of a second filter data item other than a first filter data item is identified by predicting, based on the first filter data item, the second filter data item, the second filter data item and the first filter data item being included in the determined at least two filter data items;
and the second filter data item is coded by calculating a difference between the second filter data item and the prediction data.

3. The video coding method according to claim 2,
wherein in the determining of the filter data items, the first filter data item and the second filter data item are determined, the first filter data item corresponding to the reconstructed video signal and the second filter data item corresponding to the prediction signal, and
in the coding of the filter data items:
prediction data of the second filter data item corresponding to the prediction signal is identified by predicting the second filter data item, based on the first filter data item corresponding to the reconstructed video signal; and
the second filter data item corresponding to the prediction signal is coded by calculating a difference between the second filter data item corresponding to the prediction signal and the prediction data.

4. The video coding method according to claim 3,
wherein when the prediction data of the second filter data item is identified, the first filter data item corresponding to the reconstructed video signal is identified as the prediction data.

5. The video coding method according to claim 1,
wherein in the coding of the filter data items:
the filter data items are quantized; and
precision information items are coded, each of the precision information items indicating the quantization of a corresponding one of the filter data items.

6. The video coding method according to claim 5,
wherein in the coding of the precision information items, the precision information items are coded such that a shorter codeword is assigned to a precision information item than that assigned to another precision information item.

7. The video coding method according to claim 1,
wherein, in the determining of the filter data items, when the filter data items corresponding to the at least two of the prediction signal, the prediction error signal, and the reconstructed video signal are applied to the at least two signals, the filter data items determined are filter data items which enable obtainment of an image closer to an image represented by the video signal than images represented by the two signals.

8. The video coding method according to claim 1,
wherein in the determining of the filter data items, each of the filter data items is determined for each of color components of the at least two signals, and
in the coding of the filter data items, when the color components consist of a first color component and a second color component, a filter data item of the first color component is coded based on a cross correlation between the filter data item of the first color component and a filter data item of the second color component.

9. The video coding method according to claim 1,
wherein each of the filter data items includes information that is at least one of an offset value, a size of a filter coefficient, quantization precision of the filter coefficient, and a coding type of the filter coefficient, the size of the filter coefficient representing a horizontal or a vertical size of a cross-correlation array for the reconstructed video signal, the prediction signal or the prediction error signal.

10. The video coding method according to claim 1, further comprising:
generating a coded video signal as a bitstream, based on the prediction error signal; and
including the coded filter data items into the bitstream,
wherein in the including of the coded filter data items into the bitstream, the coded filter data items are arranged, in the bitstream, before an image signal that should be subjected to filtering using the filter data items.

11. The video coding method according to claim 1, further comprising:
generating a quantization prediction error signal by quantizing and then inversely quantizing the prediction error signal,
wherein in the determining of the filter data items, the filter data items corresponding to the at least two of the prediction signal, the quantized prediction error signal, and the reconstructed video signal are determined based on the video signal.

12. The video coding method according to claim 1,
wherein in the determining of the filter data items, the filter data items corresponding to the prediction signal, a quantized prediction error signal, and the reconstructed video signal are determined, and
in the coding of the filter data items, the determined three filter data items are coded.

13. The video coding method according to claim 1,
wherein in the determining of the filter data items:
a size of a filter coefficient for each of the at least two signals is selected, the size of the filter coefficient representing a horizontal or a vertical size of a cross-correlation array for the reconstructed video signal, the prediction signal or the prediction error signal; and
the filter data item including the filter coefficient and a syntax element for identifying the selected size is determined.

14. A video decoding method of decoding a coded video signal, the video decoding method comprising:
obtaining a prediction error signal and filter data items from the coded video signal by causing an arithmetic decoder to perform arithmetic decoding of the prediction error signal and the filter data items, the prediction error signal and the filter data items being already subjected to arithmetic coding and included in the coded video signal;
generating a prediction signal by predicting the video signal spatially or temporally;
generating a reconstructed video signal by reconstructing the video signal, based on the prediction signal and the prediction error signal; and
filtering the reconstructed video signal using the obtained filter data items,
wherein in the obtaining of the prediction error signal and the filter data items, the arithmetic decoder is restarted after the arithmetic decoding of the arithmetic-coded filter data items is completed and the decoding is terminated so as to start the arithmetic decoding of the arithmetic-coded prediction error signal after the restart of the arithmetic decoder,
in the obtaining of the filter data item, filter data items determined and coded respectively for at least two signals are obtained, each of the at least two signals including the reconstructed video signal and at least one of the prediction signal and the prediction error signal,
the video decoding method further comprising
decoding the filter data items coded respectively for the at least two signals, based on the cross-correlation between the filter data items, and
in the filtering, the filter data decoded respectively for the at least two signals are filtered.

15. The video coding method according to claim 14,
wherein in the decoding of the coded filter data items:
prediction data of a second filter data item obtained by decoding a coded second filter data item other than a coded first filter data item is identified by predicting, based on the coded first filter data item, the second filter data item, the coded first filter data item being included in the at least two coded filter data items; and
the second filter data is generated by adding the prediction data to the second coded filter data to decode the second coded filter data with the prediction data.

16. The video decoding method according to claim 15,
wherein in the obtaining of the filter data items, the coded first filter data item and the coded second filter data item are obtained, the coded first filter data item corresponding to the reconstructed video signal and the coded second filter data item corresponding to the prediction signal, and
in the decoding of the coded filter data items:
prediction data of the second filter data item corresponding to the prediction signal is identified by predicting the second filter data item, based on the coded first filter data item corresponding to the reconstructed video signal; and
the second filter data item is generated by adding the prediction data to the coded second filter data item corresponding to the prediction signal to decode the coded second filter data item with the prediction data.

17. The video coding method according to claim 14,
wherein in the decoding of the coded filter data items:
precision information items are obtained by decoding coded precision information items each of which indicating precision of quantization of a corresponding one of the coded filter data items; and
inverse quantization according to the precision indicated by the precision information is performed on the coded filter data items.

18. The video coding method according to claim 14,
wherein each of the filter data items includes information that is at least one of an offset value, a size of a filter coefficient, quantization precision of the filter coefficient, and a coding type of the filter coefficient, the size of the filter coefficient representing a horizontal or a vertical size of a cross-correlation array for the reconstructed video signal, the prediction signal or the prediction error signal.

19. A video coding apparatus which codes a video signal, the video coding apparatus comprising:
- a non-transitory memory storing a program; and
- a hardware processor that executes the program and causes the video coding apparatus to:
  - generate a prediction signal by predicting the video signal spatially or temporally;
  - calculate, as a prediction error signal, a difference between the video signal and the prediction signal;
  - generate a reconstructed video signal by reconstructing the video signal, based on the prediction signal and the prediction error signal;
  - determine a filter data item for filtering the reconstructed video signal; and
  - code the filter data item and the prediction error signal, the coding involving arithmetic coding of the filter data item and the prediction error signal performed by an arithmetic coder,
- wherein the arithmetic coder is restarted after the arithmetic coding of the filter data item is completed and coding is terminated so as to start arithmetic coding of the prediction error signal after the restart of the arithmetic coder,
- the filter data items are determined for filtering at least two signals, each of the at least two signals including the reconstructed video signal and at least one of the prediction signal and the prediction error signal, and
- the determined filter data items are coded, based on a cross-correlation between the determined filter data items.

20. A video decoding apparatus which decodes a coded video signal, the video decoding apparatus comprising:
- a non-transitory memory storing a program; and
- a hardware processor that executes the program and causes the video decoding apparatus to:
  - obtain a prediction error signal and a filter data item from the coded video signal by causing an arithmetic decoder to perform arithmetic decoding of the prediction error signal and the filter data item, the prediction error signal and the filter data item being already subjected to arithmetic coding and included in the coded video signal;
  - generate a prediction signal by predicting the video signal spatially or temporally;
  - generate a reconstructed video signal by reconstructing the video signal, based on the prediction signal and the prediction error signal;
  - filter the reconstructed video signal using the obtained filter data item, and
  - wherein the arithmetic decoder is restarted after the arithmetic decoding of the arithmetic-coded filter data item is completed and decoding is terminated so as to start arithmetic decoding of the arithmetic-coded prediction error signal after the restart of the arithmetic decoder,
- the filter data items determined are obtained and coded respectively for at least two signals, each of the at least two signals including the reconstructed video signal and at least one of the prediction signal and the prediction error signal, and
- the video decoding apparatus further
- decodes the filter data items coded respectively for the at least two signals, based on a cross-correlation between the filter data items, and
- filters the filter data items decoded respectively for the at least two signals.

* * * * *